(12) United States Patent
Wise

(10) Patent No.: US 8,719,076 B2
(45) Date of Patent: May 6, 2014

(54) FINANCE DIAGNOSTIC TOOL

(75) Inventor: Charles Paul Wise, Alpharetta, GA (US)

(73) Assignee: Accenture Global Services Limited (IE)

( * ) Notice: Subject to any disclaimer, the term of this patent is extended or adjusted under 35 U.S.C. 154(b) by 1496 days.

(21) Appl. No.: 11/201,786

(22) Filed: Aug. 11, 2005

(65) Prior Publication Data
US 2007/0038536 A1 Feb. 15, 2007

(51) Int. Cl.
G06Q 10/00 (2012.01)
G06Q 30/00 (2012.01)

(52) U.S. Cl.
USPC .......... 705/7.39; 705/7.38; 705/347; 705/348

(58) Field of Classification Search
None
See application file for complete search history.

(56) References Cited

U.S. PATENT DOCUMENTS

| 5,212,635 | A | | 5/1993 | Ferriter |
| 5,365,425 | A | | 11/1994 | Torma et al. |
| 5,574,828 | A | * | 11/1996 | Hayward et al. ............... 706/45 |
| 5,875,431 | A | | 2/1999 | Heckman et al. |
| 6,119,097 | A | | 9/2000 | Ibarra |
| 6,556,974 | B1 | * | 4/2003 | D'Alessandro ............. 705/7.32 |
| 6,567,822 | B1 | * | 5/2003 | Cudahy et al. ..................... 1/1 |
| 6,877,034 | B1 | * | 4/2005 | Machin et al. ................ 709/223 |
| 6,968,316 | B1 | * | 11/2005 | Hamilton ..................... 705/36 R |
| 6,988,092 | B1 | * | 1/2006 | Tang et al. ................... 705/7.39 |
| 7,308,414 | B2 | * | 12/2007 | Parker et al. ................. 705/7.27 |
| 7,949,552 | B2 | * | 5/2011 | Korenblit et al. ............ 705/7.13 |
| 8,121,889 | B2 | * | 2/2012 | Casco-Arias et al. ........ 705/7.41 |
| 2001/0032195 | A1 | * | 10/2001 | Graichen et al. .............. 705/400 |
| 2001/0056398 | A1 | * | 12/2001 | Scheirer .......................... 705/38 |
| 2002/0035495 | A1 | * | 3/2002 | Spira et al. ......................... 705/7 |
| 2002/0042731 | A1 | * | 4/2002 | King et al. ...................... 705/10 |
| 2002/0055866 | A1 | * | 5/2002 | Dewar ............................... 705/8 |
| 2002/0069083 | A1 | * | 6/2002 | Harter et al. ...................... 705/1 |
| 2002/0082966 | A1 | * | 6/2002 | O'Brien et al. ................. 705/36 |
| 2002/0120491 | A1 | * | 8/2002 | Nelson ............................ 705/10 |
| 2002/0133368 | A1 | * | 9/2002 | Strutt et al. ....................... 705/1 |
| 2002/0138295 | A1 | * | 9/2002 | Ekrem .............................. 705/1 |
| 2002/0152148 | A1 | * | 10/2002 | Ebert ............................... 705/35 |
| 2002/0184068 | A1 | * | 12/2002 | Krishnan et al. ................. 705/8 |
| 2003/0004766 | A1 | * | 1/2003 | Sandoval et al. .................. 705/7 |
| 2003/0018487 | A1 | * | 1/2003 | Young et al. ...................... 705/1 |
| 2003/0033233 | A1 | * | 2/2003 | Lingwood et al. ............. 705/36 |
| 2003/0040823 | A1 | * | 2/2003 | Harm et al. .................... 700/97 |
| 2003/0050814 | A1 | * | 3/2003 | Stoneking et al. ................. 705/7 |
| 2003/0061141 | A1 | * | 3/2003 | D'Alessandro ................ 705/36 |
| 2003/0065543 | A1 | * | 4/2003 | Anderson .......................... 705/7 |
| 2003/0083898 | A1 | | 5/2003 | Wick et al. |
| 2003/0083912 | A1 | * | 5/2003 | Covington et al. ................ 705/7 |
| 2003/0158749 | A1 | * | 8/2003 | Olchanski et al. ................ 705/2 |

(Continued)

OTHER PUBLICATIONS

U.S. Appl. No. 11/366,168, filed Mar. 1, 2006, Relvas.

*Primary Examiner* — Gregory Johnson
(74) *Attorney, Agent, or Firm* — Brinks Gilson & Lione

(57) ABSTRACT

A method of providing financial advice that includes presenting financial related questions to a user, recording answers to the presented questions and preparing and displaying an advice report by simultaneously displaying one of the recorded answers and a benchmark that represents a predetermined level of practice corresponding to the one of the recorded answers, wherein advice on how to achieve a desired level of practice is rendered by such simultaneous displaying. Providing advice to the user based on the advice report so that the user achieves the desired level of practice.

39 Claims, 139 Drawing Sheets

(56) References Cited

U.S. PATENT DOCUMENTS

| | | | |
|---|---|---|---|
| 2003/0172002 A1* | 9/2003 | Spira et al. | 705/27 |
| 2003/0204437 A1* | 10/2003 | Flender et al. | 705/10 |
| 2003/0208388 A1* | 11/2003 | Farkas et al. | 705/7 |
| 2004/0024674 A1* | 2/2004 | Feldman | 705/36 |
| 2004/0030669 A1* | 2/2004 | Harris | 707/1 |
| 2004/0044552 A1* | 3/2004 | Marwood | 705/7 |
| 2004/0054567 A1* | 3/2004 | Bubner | 705/7 |
| 2004/0068431 A1* | 4/2004 | Smith et al. | 705/10 |
| 2004/0078796 A1* | 4/2004 | Utsumi | 718/105 |
| 2004/0102926 A1* | 5/2004 | Adendorff et al. | 702/182 |
| 2004/0102990 A1 | 5/2004 | Jones | |
| 2004/0107125 A1* | 6/2004 | Guheen et al. | 705/7 |
| 2004/0128174 A1* | 7/2004 | Feldman | 705/7 |
| 2004/0210462 A1* | 10/2004 | Wolford et al. | 705/7 |
| 2004/0220843 A1* | 11/2004 | Walter | 705/7 |
| 2004/0230471 A1* | 11/2004 | Putnam Brookes | 705/10 |
| 2004/0243462 A1* | 12/2004 | Stier | 705/11 |
| 2005/0038693 A1* | 2/2005 | Janus | 705/10 |
| 2005/0060219 A1* | 3/2005 | Deitering et al. | 705/10 |
| 2005/0071737 A1* | 3/2005 | Adendorff et al. | 715/500 |
| 2005/0108043 A1* | 5/2005 | Davidson | 705/1 |
| 2005/0154628 A1* | 7/2005 | Eckart et al. | 705/10 |
| 2005/0234767 A1* | 10/2005 | Bolzman et al. | 705/11 |
| 2005/0240467 A1* | 10/2005 | Eckart et al. | 705/10 |
| 2006/0004596 A1* | 1/2006 | Caniglia et al. | 705/1 |
| 2006/0026054 A1* | 2/2006 | Barel et al. | 705/10 |
| 2006/0074788 A1* | 4/2006 | Grizack et al. | 705/35 |
| 2006/0080119 A1* | 4/2006 | Hegmann et al. | 705/1 |
| 2006/0200358 A1* | 9/2006 | Ohnemus et al. | 705/1 |
| 2006/0235778 A1* | 10/2006 | Razvi et al. | 705/35 |
| 2007/0055564 A1* | 3/2007 | Fourman | 705/11 |
| 2007/0078831 A1* | 4/2007 | Relvas | 707/3 |
| 2007/0088601 A1* | 4/2007 | Money et al. | 705/10 |
| 2007/0239466 A1* | 10/2007 | McCullagh et al. | 705/1 |
| 2007/0250360 A1* | 10/2007 | Goddard et al. | 705/7 |
| 2008/0288889 A1* | 11/2008 | Hunt et al. | 715/810 |

\* cited by examiner

Fig. 2

Project Details

Client Name 10_18proj
Project Name 10_18proj
Project Status In Progress
Last Saved 4/26/2004 10:34:41 AM
Active Directory Group Performance_Test_Project_10

*Client Information*
Client Contact  Charles P. Wise
Title  Project Manager

*Project Leadership*
Project Lead Amy L. Gladson
Office Reston
Email amy.l.gladson@accenture.com
Phone 703-947-1000

*Project Details*
*Operating Group  Financial Services
Charge Code  AC12304
*Diagnostic Start Date  10/9/2004
*Diagnostic End Date  10/31/2004

| Summary and Categories | In Scope? | Link to Questions | Total Number of Questions | Questions In Scope | Link to KPIs | Total Number of KPIs | KPIs in Scope | Weighted Average Score |
|---|---|---|---|---|---|---|---|---|
| Summary | Y | ⇒ | 48 | 48 | ⇒ | 20 | 20 | 2.01 |
| ☐ Context | Y | ⇒ | 5 | 5 | ⇒ | 1 | 1 | |
| ☐ Finance Management | Y | ⇒ | 18 | 18 | ⇒ | 2 | 2 | 2.01 |
| ☐ Shareholder Value Targeting OR Public Sector Value | Y | ⇒ | 15 | 15 | ⇒ | 3 | 3 | |
| ☐ Business Intelligence | Y | ⇒ | 1 | 1 | ⇒ | 1 | 1 | |
| ☐ Budgeting & Forecasting | Y | ⇒ | 10 | 10 | ⇒ | 5 | 5 | |
| ☐ Financial & Business Analysis | Y | ⇒ | 10 | 10 | ⇒ | 1 | 1 | |
| ☐ Investor Relations | Y | ⇒ | 3 | 3 | ⇒ | 1 | 1 | |
| ☐ CAPEX Management | Y | ⇒ | 21 | 21 | ⇒ | 3 | 3 | |
| ☐ Working Capital Management | Y | ⇒ | 4 | 4 | ⇒ | 4 | 4 | |
| ☐ Accounting & Reporting | Y | ⇒ | 21 | 21 | ⇒ | 8 | 8 | |
| ☐ Internal Control | Y | ⇒ | 3 | 3 | ⇒ | 1 | 1 | |
| ☐ Purchasing | Y | ⇒ | 11 | 11 | ⇒ | 12 | 12 | |
| ☐ Accounts Payable | Y | ⇒ | 7 | 7 | ⇒ | 11 | 11 | |
| ☐ Payroll | Y | ⇒ | 5 | 5 | ⇒ | 2 | 2 | |
| ☐ Order-to-Cash | Y | ⇒ | 39 | 39 | ⇒ | 1 | 1 | |
| ☐ Tax Management | Y | ⇒ | 2 | 2 | ⇒ | 4 | 4 | |
| ☐ Treasury & Risk Management | Y | ⇒ | 17 | 17 | ⇒ | 14 | 14 | |
| Total for Categories | | | 192 | 192 | | 74 | 74 | 2.01 |

118 — Add selected to scope
120 — Remove selected from scope
116

Notes:
1 Includes shareholder value analysis, strategic planning and target setting
2 Includes general accounting, closing, consolidation, financial reporting and management reporting

Fig. 5A

| Category | Subcategory | In Scope? | Question | Status | Raw Score |
|---|---|---|---|---|---|
| Budgeting & Forecasting | Budgeting & Forecasting Process | Y | Summarize your planning, budgeting & forecasting process. | Not Started | |
| Budgeting & Forecasting | Budgeting & Forecasting Process | Y | Describe in detail your planning, budgeting & forecasting process - top down vs. bottom up, time horizon, time and resource requirements, level of detail, etc. | In Progress | 5 |
| Budgeting & Forecasting | Budgeting & Forecasting Process | Y | Does management have confidence in the accuracy and reliability of your forecasts and budgets? Why or why not? | Not Started | |
| Budgeting & Forecasting | Budgeting & Forecasting Process | Y | To what degree are drivers used in the budgeting and forecasting process? Which drivers, specifically? How are these used? | Not Started | |
| Budgeting & Forecasting | Budgeting & Forecasting Process | Y | How detailed is your budgeting & forecasting activity? (e.g. how many accounts, line items, etc.) | Not Started | |
| Budgeting & Forecasting | Budgeting & Forecasting Process | Y | Does your organization utilize scenario planning, and how are the scenarios stored? | Not Started | |
| Budgeting & Forecasting | Budgeting & Forecasting Process | Y | How integrated is financial planning with other planning initiatives (e.g. capital expenditure planning, strategic planning)? | Not Started | |
| Budgeting & Forecasting | Budgeting & Forecasting Process | Y | Do all employees who can impact financial results and budgets feel responsible for accepting it? | Not Started | |
| Budgeting & Forecasting | Budgeting & Forecasting Systems Architecture | Y | What technology architecture do you use for planning, budgeting, and forecasting activities? | Not Started | |
| Budgeting & Forecasting | Budgeting & Forecasting Systems Architecture | Y | To what degree are budgeting and forecasting applications integrated with other financial applications? | Not Started | |

Fig. 5B

| Category | Subcategory | In Scope? | KPI | Status | Raw Score |
|---|---|---|---|---|---|
| Budgeting & Forecasting | Budgeting & Forecasting KPI | Y | Budget cycle time | Not Started | |
| Budgeting & Forecasting | Budgeting & Forecasting KPI | Y | Work-days consumed by the annual budget | Not Started | |
| Budgeting & Forecasting | Budgeting & Forecasting KPI | Y | Number of budget line items | Not Started | |
| Budgeting & Forecasting | Budgeting & Forecasting KPI | Y | Forecast Accuracy | Not Started | |
| Budgeting & Forecasting | Budgeting & Forecasting KPI | Y | Number of budgeting / forecasting applications | Not Started | |

Diagnostic Category: Context
Sub Categories Included: Context
Note: There are no leading practices here or metrics here - only background / context questions Qualitative Questions and Leading Practices:

| Diagnostic Category | Sub Category | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| Context | Context | Describe your company's strategy and business model (business model is the company's core logic for making money) | NA | NA | NA | [Insert client answer here] | NA | NA |
| | Context | What are the company's long term / strategic objectives? | NA | NA | NA | | | |
| | Context | Describe how your company is organized - e.g. business units, degree of centralization / decentralization, etc. | NA | NA | NA | | | |
| | Context | In what countries does the company do business? Using what model (e.g. direct sales, physical presence, principal/agent, etc.)? | NA | NA | NA | | | |
| | Context | What are the key challenges your company faces (internal or external)? | NA | NA | NA | | | |

Quantitative Metrics / KPIs:

| Diagnostic Category | Metric / KPI | Formula (unit of measure) | Benchmarking Data | | | Client Value | Client Value - Lead, Avt, Lag | Score (1-5) |
|---|---|---|---|---|---|---|---|---|
| | | | Leading | Average | Lagging | | | |

Fig. 6

Diagnostic Category: Finance Management
Sub Categories Included: Role of Finance, Perception of Internal Customers, Organization Structure, Continuous Improvement, Skills Development
Note: There are fewer definitive "leading practices" in this section than in others due to the subjective nature of Finance Management

*Qualitative Questions and Leading Practices:*

| Diagnostic Category | Sub Category | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| Finance Management | Role of Finance | Describe the role Finance plays in your company and the primary activities Finance performs. What are the strengths and weaknesses of Finance. How does this contribute to your company's ability to perform at a high level? | Finance is a key part of the management team whose counsel is sought on a wide range of issues. A significant portion of Finance time is spent on (and finance excels at) high value activities including forward looking analysis, tax strategy, corporate risk management, capital planning & allocation, pricing analysis, strategic planning, etc. | Finance has gained a seat at the executive decision table, but still struggles to devote adequate time to high value added activities because of the amount of effort consumed by traditional transaction processing and accounting & reporting activities. | Finance is primarily focused on transaction processing and traditional accounting & reporting. Finance personnel are rarely involved in decision making unless "debits and credits" are involved | [Insert client answer here] | Leading | 4 |
| | Role of Finance | Describe your finance governance model? How do you manage the finance function to ensure you are supporting the company's strategic agenda and achieving your objectives? | There is no "leading finance governance model", but executives should able to clearly describe company's strategic agenda and how finance activities are directed toward this end. See also F&PM PoV document discussing Finance Strategy | TBD | TBD | | | |

Fig. 7A

Diagnostic Category: Finance Management
Sub Categories Included: Role of Finance, Perception of Internal Customers, Organization Structure, Continuous Improvement, Skills Development
Note: There are fewer definitive "leading practices" in this section than in others due to the subjective nature of Finance Management Qualitative Questions and Leading Practices:

| Diagnostic Category | Sub Category | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| | Role of Finance | Has your governance model changed over the past 3 years? In what way? What triggered those changes? | There is no "leading practice" for making changes to a finance governance model, but changes should be driven by changes in the overall strategic objectives of the company and/or a well planned finance change program | TBD | TBD | | | |
| Finance Management | Perception of Internal Customers | Have you recently measured the satisfaction of Finance's key internal customers? How satisfied are they? | Satisfaction of internal customers is periodically measured, satisfaction levels are high and/or improving, and action plans are in place to address legitimate concerns | Satisfaction of internal customers is not formally measured. Informal discussions suggest satisfaction is mixed. | Satisfaction of internal customers is not formally measured. Informal discussions suggest satisfaction is low. | | | |
| | Perception of Internal Customers | What do operations executives consider finance's strengths and weaknesses to be? | Operations executives should cite as strengths of finance those finance capabilities necessary meet overall company objectives - i.e. finance capabilities and company goals should be aligned | TBD | TBD | | | |

Fig. 7B

Diagnostic Category: Finance Management
Sub Categories Included: Role of Finance, Perception of Internal Customers, Organization Structure, Continuous Improvement, Skills Development
Note: There are fewer definitive "leading practices" in this section than in others due to the subjective nature of Finance Management

*Qualitative Questions and Leading Practices:*

| Diagnostic Category | Sub Category | Interview Question | Leading, Lagging & Most Common Practices | | | Client Response/ Practice | Client Practice– Lead, Com, Lag | Total Score (1-5) |
|---|---|---|---|---|---|---|---|---|
| | | | Leading | Most Common | Lagging | | | |
| Finance Management | Organization Structure | How is your finance organization structured? Why you are organized that way? | Leading companies will have started with the company's strategic objectives in mind, identified how finance must contribute, and then designed a structure around this. The result will likely include a) segregation of duties between transaction processing, accounting & reporting, and decision support, b) a well defined relationship between corporate and business unit finance, and c) uses of centers of skill and scale. See also F&PM PoV documents discussing Finance Organization Structure | More commonly, multiple organization design decisions will have been made independently over time and result in an organization structure which meets the basic needs of the business. Will likely have a "strained" relationship between business units and corporate, modest segregation of duties and limited use of centers of skill and scale. | Little or no thought has been given to organization structure – instead organization is a result of a series of decisions compounded over time without a long term plan. Little segregation of responsibilities, little or no use of centers of skill or scale. | | | |

Fig. 7C

Diagnostic Category: Finance Management
Sub Categories Included: Role of Finance, Perception of Internal Customers, Organization Structure, Continuous Improvement, Skills Development
Note: There are fewer definitive "leading practices" in this section than in others due to the subjective nature of Finance Management

Qualitative Questions and Leading Practices:

| Diagnostic Category | Sub Category | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| Organization. Structure | | Is this structure consistent around the globe, or do regional / country specific differences exist? | There is no definitive "leading practice" global organization structure" - see F&PM PoV discussing the Global Dimension Finance Organization Structure | TBD | TBD | | | |
| Organization. Structure | | Which organizations / positions report to the CFO? Do any finance positions not report into the CFO? What about "related" organizations such as IT, Purchasing & Payroll? | All of finance reports into the CFO organization, including BU finance personnel. The one exception is Internal Audit which should report to the Audit Committee of the Board. Related areas such as IT, Purchasing, payroll, and Investor Relations often report up through the CFO but not necessarily | TBD | TBD | | | |
| Organization. Structure | | Are any finance activities performed outside of the finance organization? Which ones? Where performed? | No finance activities should be performed outside of finance and no "shadow finance" organizations should exist | TBD | TBD | | | |

Fig. 7D

Diagnostic Category: Finance Management
Sub Categories Included: Role of Finance, Perception of Internal Customers, Organization Structure, Continuous Improvement, Skills Development
Note: There are fewer definitive "leading practices" in this section than in others due to the subjective nature of Finance Management Qualitative Questions and Leading Practices:

| Diagnostic Category | Sub Category | Interview Question | Leading, Lagging & Most Common Practices | | | Client Response/ Practice | Client Practice - Lead, Com, Lag | Total Score (1-5) |
|---|---|---|---|---|---|---|---|---|
| | | | Leading | Most Common | Lagging | | | |
| Organization. Structure | | When was the last finance restructuring? What were the reasons for and the results of this restructuring? | NA | NA | NA | | | |
| Organization. Structure | | Do you use shared services or outsourcing? If so, for what processes? | True shared services and/or outsourcing used for all transaction processing activities as well as all standard repetitive accounting, closing and reporting activities | Uses shared services for "obvious" processes such as payroll and accounts payable. Service centers may not be in low cost locations | Little or no use of shared services or outsourcing. Instead, multiple redundant organizations are likely to exist. | | | |
| Organization. Structure | | What cost savings do you derive from your shared services centers or outsourcing relationship(s)? | Shared service organizations should deliver material savings over other models - see KPIs related to finance cost for relevant metrics | TBD | TBD | | | |
| Organization. Structure | | What non-cost benefits do you derive from your shared services centers or outsourcing relationship(s)? | A true shared service model should deliver high levels of service consistent a formal service level agreement and allow BU finance to focus more time on decision support activities | TBD | TBD | | | |

Fig. 7E

Diagnostic Category: Finance Management
Sub Categories Included: Role of Finance, Perception of Internal Customers, Organization Structure, Continuous Improvement, Skills Development
Note: There are fewer definitive "leading practices" in this section than in others due to the subjective nature of Finance Management

Qualitative Questions and Leading Practices:

| Diagnostic Category | Sub Category | Interview Question | Leading, Lagging & Most Common Practices ||| Client Response/ Practice | Client Practice – Lead, Com, Lag | Total Score (1-5) |
|---|---|---|---|---|---|---|---|---|
| | | | Leading | Most Common | Lagging | | | |
| Finance Management | Continuous Improvement | What are the major finance improvement initiatives that are in progress or that you plan to work on in the next 2 years? Why? What is it about the current environment that you're seeking to improve? What benefits do you hope to gain? | Finance improvement initiatives are part of an overall finance change program, targeted at improving those high value capabilities deemed to be most critical meeting internal customer needs. Initiatives have owners, project plans, timelines, deliverables, etc. | TBD | Few formal structured initiatives are underway or planned. No overall program plan exists. Efforts are largely one-off efforts to solve a specific tactical problem. | | | |
| | Continuous Improvement | How do you identify those areas where you wish to improve or those capabilities you wish to build? | Identification of desired future capabilities is driven by the overal goals of the company and an objective analysis of existing finance capabilities | TBD | TBD | | | |
| Finance Management | Skills Development | What would you consider the most important finance skills for your organization? How do you expect this to change over the next three years? | Finance leadership has identified those capabilities necessary for finance to be effective and translated this into specific finance skills finance personnel must possess | TBD | TBD | | | |

Fig. 7F

Diagnostic Category: Finance Management
Sub Categories Included: Role of Finance, Perception of Internal Customers, Organization Structure, Continuous Improvement, Skills Development
Note: There are fewer definitive "leading practices" in this section than in others due to the subjective nature of Finance Management Qualitative Questions and Leading Practices:

| Diagnostic Category | Sub Category | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| | Skills Development | How would you rate the skills of your finance staff – both in terms of traditional accounting & reporting, as well as in terms of performance management and other value added areas? What are the primary gaps? | Finance is strong in both CPA skills (traditional accounting and control) and MBA skills (financial and business acumen) | Strong CPA type skills but inconsistent financial and business acumen | Weak or inconsistent skills across majority of skill areas | | | |
| | Skills Development | Does your company use rotational programs for finance professionals? If so, how do they work? Formal or informal? New hires only or more senior people as well? Finance only or cross-functional rotations? | Use rotational programs for junior finance staff and potentially for mid-level finance personnel as well to provide broad exposure to the entire finance function | TBD | TBD | | | |

Quantitative Metrics / KPIs:

| Diagnostic Category | Metric / KPI | Formula (unit of measure) | Benchmarking Data | | | Client Value | Client Value – Lead, Avt, Lag | Score (1-5) |
|---|---|---|---|---|---|---|---|---|
| | | | Leading | Average | Lagging | | | |
| Finance Management | Cost of finance - FTE/$B (#) | Finance FTEs / $B of revenue (#) | 63 | 107 | TBD | [Insert client value here] | Avg | 3 |
| | Cost of finance - E/R (%) | Total finance cost as % of revenue (%) | 0.76% | 1.07% | TBD | | | |

Fig. 8

Diagnostic Category: Shareholder Value Targeting
Sub Categories Included: Shareholder Value Analysis, Strategic Planning, Target Setting, and Incentive Compensation

Qualitative Questions and Leading Practices:

| Diagnostic Category | Sub Category | Interview Question | Leading, Lagging & Most Common Practices | | | Client Response/ Practice | Client Practice – Lead, Com, Lag | Total Score (1-5) |
| --- | --- | --- | --- | --- | --- | --- | --- | --- |
| | | | Leading | Most Common | Lagging | | | |
| Shareholder Value Targeting | Shareholder Value Analysis | What are the areas your company considers particularly important for driving shareholder value? | Executives have clear and consistent understanding of what drives value for their company. This perspective is consistent with SVA principles | Inconsistent understanding of what drives value. Drivers only loosely tied to shareholder value concepts | No significant SVA focus – earnings and/ or EPS are the key measures | [Insert client answer here] | Avg | 4 |
| | Shareholder Value Analysis | Does a formal enterprise valuation model exist? If so, how is this used? | A formal enterprise valuation model (the type used by sell-side equity analysts) is maintained and updated frequently. All finance executives are familiar with this model and the primary drivers of shareholder value. These concepts are incorporated into long-term/strategic planning | A valuation model is maintained and used by a small number of people but is not widely disseminated, understood, or incorporated into planning exercises | No valuation model maintained/ incorporated into planning exercises | | | |
| | Shareholder Value Analysis | How important is it for you to understand the key drivers of value (financial and non-financial) and measure/report on them in a consistent way across your portfolio | Measurement and management of key value drivers is a primary focus and does not take a back seat to traditional earnings measures and accounting ratios | TBD | TBD | | | |
| | | | Key measures focus on the critical few value drivers and are balanced and aligned with strategic objectives and value creation | TBD | TBD | | | |
| | | | Strategic objectives have financial measure associated with them | TBD | TBD | | | |

Fig. 9A

Diagnostic Category: Shareholder Value Targeting
Sub Categories Included: Shareholder Value Analysis, Strategic Planning, Target Setting, and Incentive Compensation

Qualitative Questions and Leading Practices:

| Diagnostic Category | Sub Category | Interview Question | Leading, Lagging & Most Common Practices ||| Client Response/ Practice | Client Practice – Lead, Com, Lag | Total Score (1-5) |
| --- | --- | --- | --- | --- | --- | --- | --- | --- |
| | | | Leading | Most Common | Lagging | | | |
| | Shareholder Value Analysis | What percentage of your senior management time is spent on managing current year performance and next year's budget compared to focusing on the strategic drivers of future value beyond next year? | The distinction between current value and future value is understood. Adequate management time is devoted to managing future value. | TBD | TBD | | | |
| | Shareholder Value Analysis | Describe how you measure and manage the key drivers of future value (financial and non-financial). How effective is this? | Current and future value drivers are identified, prioritized, and clearly linked to strategy; management attention is focused on most sensitive and manageable drivers | TBD | TBD | | | |
| Shareholder Value Targeting | Strategic Planning | Describe the objectives and outputs of your long-term/strategic planning process | Long term planning is focused on the financial performance necessary to achieve shareholder value objectives and options for achieving this performance. It is both financial and operational. This is not simply a "long-term forecasting" exercise. | TBD | Simply a long-term forecasting exercise assuming modest changes in basic assumptions (e.g. revenue grows 5% and margins stay constant for 5 years) | | | |
| | Strategic Planning | Describe the strategic / long term planning process - frequency, time horizon, process, inputs, and output | Maintain a 3 year strategic plan supported by value models – integrated P&L, balance sheet and cash flow planning models | TBD | TBD | | | |

Fig. 9B

Diagnostic Category: Shareholder Value Targeting
Sub Categories Included: Shareholder Value Analysis, Strategic Planning, Target Setting, and Incentive Compensation Qualitative Questions and Leading Practices:

| Diagnostic Category | Sub Category | Interview Question | Leading, Lagging & Most Common Practices ||| Client Response/ Practice | Client Practice – Lead, Com, Lag | Total Score (1-5) |
| --- | --- | --- | --- | --- | --- | --- | --- | --- |
| | | | Leading | Most Common | Lagging | | | |
| | | | Corporate level plan focuses on specific goals and measures Strategic planning should define organizational responsibility/accountability | TBD | TBD | | | |
| | | | Strategic planning should define organizational responsibility/accountability | TBD | TBD | | | |
| | | | Strategic plans should be translated into phased, actionable programs | TBD | TBD | | | |
| Strategic Planning | | How are shareholder value concepts embedded into long term / strategic planning (e.g. value drivers, current vs. future value, etc.) | Business drivers are identified, prioritized, and well-understood with clear linkage to strategy | TBD | TBD | | | |
| | | | Management agrees on the critical few key metrics (necessary and sufficient) aligned with shareholder value creation | TBD | TBD | | | |
| | | | Vision and strategy are clearly defined and consistently understood by all levels of senior management | TBD | TBD | | | |
| | | | Cause and effect linkages among business drivers are well understood and quantitatively tested to make trade-offs | TBD | TBD | | | |

Fig. 9C

Diagnostic Category: Shareholder Value Targeting
Sub Categories Included: Shareholder Value Analysis, Strategic Planning, Target Setting, and Incentive Compensation

*Qualitative Questions and Leading Practices:*

| Diagnostic Category | Sub Category | Interview Question | Leading, Lagging & Most Common Practices | | | Client Response/ Practice | Client Practice – Lead, Com, Lag | Total Score (1-5) |
| --- | --- | --- | --- | --- | --- | --- | --- | --- |
| | | | Leading | Most Common | Lagging | | | |
| | Strategic Planning | How is long term planning integrated with performance management? | Key measures of successful execution of strategy are clearly defined and consistent across the organization | TBD | TBD | | | |
| | | | Clear alignment between the performance measures reported up and those used to manage down | TBD | TBD | | | |
| | | | Periodically assess strategy against performance and refine vision, objectives and performance metrics as needed | TBD | TBD | | | |
| | | | Employ rigorous linkage from strategic plan to targets to budget | TBD | TBD | | | |
| | | | Ability to revise business plans and budgets based on changing business conditions | TBD | TBD | | | |

Fig. 9D

Diagnostic Category: Shareholder Value Targeting
Sub Categories Included: Shareholder Value Analysis, Strategic Planning, Target Setting, and Incentive Compensation

Qualitative Questions and Leading Practices:

| Diagnostic Category | Sub Category | Interview Question | Leading, Lagging & Most Common Practices | | | Client Response/ Practice | Client Practice– Lead, Com, Lag | Total Score (1-5) |
|---|---|---|---|---|---|---|---|---|
| | | | Leading | Most Common | Lagging | | | |
| Shareholder Value Targeting | Target Setting | How are financial targets set – do you use expectations of growth in your company's market/shareholder value as a starting point to set targets for key financial results measures? | Targets are driven by the financial performance necessary to meet shareholder value objectives, not "what we think we can do" under a business as usual scenario or "last year + 10%". Targets are cascaded down to individual business units/geographies and tied to capital allocation (i.e. each unit must earn an appropriate return on capital allocated to it) | TBD | TBD | | | |
| | Target Setting | Describe in detail how financial targets are set - both for the company as a whole as well as for specific BUs, geographies, etc. | Targets are driven by corporate and cascaded down to individual business units / geographies and tied to capital allocation (i.e. each unit must earn an appropriate return on capital allocated to it) | TBD | TBD | | | |
| | | | Relative targets vs. absolute targets (beat competition, not budget) | TBD | TBD | | | |

Fig. 9E

| Target Setting | What is communicated regarding targets? To whom? | Adopt a portfolio approach to target setting | TBD | TBD |
| --- | --- | --- | --- | --- |
| | | The causes, sources, and drivers of profitability are well-understood and consistently defined; the company identifies, analyzes, and manages drivers through a robust enterprise profitability model/system. | TBD | TBD |
| | | Targets and tolerances are in place for the critical few key metrics at each organization level | TBD | TBD |
| | | Target setting and forecasting are separated to de-politicize the process and improve speed and accuracy | TBD | TBD |
| | | Initial "baseline" budgets are created by applying growth rates and different calculation methods to historical data to give planners a realistic starting point | TBD | TBD |
| | | Target KPIs to measure performance against | TBD | TBD |
| | | Senior management translates strategy into targets, providing the strategic expectations downward | TBD | TBD |
| | | Internally established targets consistent with externally communicated targets with no artificial padding | TBD | TBD |

Fig. 9F

| | | Communication of targets is critical to ownership | TBD | TBD |
|---|---|---|---|---|
| Target Setting | Who ultimately owns achieving targets that have been set? What role does these people / entities have in the target setting process? | Clear alignment of target: ownership, accountability and decision rights | TBD | TBD |
| | | Corporate and business units jointly develop action plans and tactics for achieving targets | TBD | TBD |
| | | Target ownership ultimately resides with those responsible for execution | TBD | TBD |
| Target Setting | Describe how targets are linked to incentive compensation | Targets are aligned with corporate strategy and linked to compensation | TBD | TBD |
| Incentive Compensation | How is incentive compensation tied to achieving financial targets? | | TBD | TBD |
| Shareholder Value Targeting | | | | |

Fig. 9G

Quantitative Metrics / KPIs:

| Diagnostic Category | Metric / KPI | Formula (unit of measure) | Benchmarking Data ||| Client Value | Client Value = Lead, Avg, Lag | Score (1-5) |
|---|---|---|---|---|---|---|---|---|
| | | | Leading | Average | Lagging | | | |
| Shareholder Value Targeting | Spread: ROIC - WACC (%) | ROIC - WACC (%) | Positive | Zero | Negative | [Insert client value here] | Avg | 3 |
| | % of market cap attributable to future value (%) | Percent of market cap attributable to future value (%) | NA | NA | NA | | | |
| | 3 year total return to shareholders (%) | 3 year total return to shareholders (%) | Above peer group | Consistent with peer group | Below peer group | | | |

Fig. 9H

Diagnostic Category: Budgeting & Forecasting
Sub Categories Included: Budgeting & Forecasting Process and Budgeting & Forecasting Systems Architecture

*Qualitative Questions and Leading Practices:*

| Diagnostic Category | SubCategory | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| Budgeting & Forecasting | Budgeting & Forecasting Process | Summarize your planning, budgeting & forecasting process | Driver-based rolling 4-6 quarter forecast in lieu of traditional annual budget | TBD | TBD | [Insert client answer here] | Avg | 4 |
| | Budgeting & Forecasting Process | Describe in detail your planning, budgeting & forecasting p | Annual budgeting process replaced with driver-based 4-6 quarter rolling forecast | TBD | TBD | | | |
| | | | Respond quickly to changes in business conditions through rolling forecast process | TBD | TBD | | | |
| | | | Limit number of iterations enabled by top-down target setting and bottom-up resource allocation | TBD | TBD | | | |
| | | | Automated distribution of budgets and revisions (workflow capabilities) | TBD | TBD | | | |
| | | | Derive budgets for repetitive work from compatible units in the work management system | TBD | TBD | | | |

Fig. 10A

Diagnostic Category: Budgeting & Forecasting
Sub Categories Included: Budgeting & Forecasting Process and Budgeting & Forecasting Systems Architecture

*Qualitative Questions and Leading Practices:*

| Diagnostic Category | Sub Category | Interview Question | Leading Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| | | | Provide planner with access to prior year actuals and budgets/forecasts | TBD | TBD | | | |
| | | | Provide access to prior period forecasts and annual budget information | TBD | TBD | | | |
| | | | Real-time tracking of actuals against budgets and rolling forecasts | TBD | TBD | | | |
| | | | Reporting that links high-level and low-level metrics | TBD | TBD | | | |
| | | | Focus on evaluating effectiveness of action plans and corrective actions to improve future performance vs. explaining variances | TBD | TBD | | | |
| | | | Reports on real-time project cost and revenue information that provide information to aid future, predictive actions as well as to provide insight on historical information | TBD | TBD | | | |

Fig. 10B

Diagnostic Category: Budgeting & Forecasting
Sub Categories Included: Budgeting & Forecasting Process and Budgeting & Forecasting Systems Architecture

Qualitative Questions and Leading Practices:

| Diagnostic Category | Sub Category | Interview Question | Leading, Lagging & Most Common Practices | | | Client Response/ Practice | Client Practice - Lead, Com, Lag | Total Score (1-5) |
|---|---|---|---|---|---|---|---|---|
| | | | Leading | Most Common | Lagging | | | |
| | Budgeting & Forecasting Process | Does management have confidence in the accuracy and reliability of your forecasts and budgets? Why or why not? | Company consistently conducts rigorous post implementation reviews of all plans, forecasts, and major capital allocation decisions. | TBD | TBD | | | |
| | | | Forecasting has been separated from the target setting process and therefore there is no incentive to "pad" the forecasts. Executives have high degree of confidence in forecasts and forecast-to-actual variances are generally low (at least for forecast horizons of 2-3 quarters) | Significant "gamesmanship" exists in the forecasting process. Executives solicit multiple forecasts from different sources to triangulate on the real answer. | Limited forecast accuracy exists and executives rarely rely on formal forecasts to make key decisions | | | |
| | Budgeting & Forecasting Process | To what degree are drivers used in the budgeting and forecasting process? Which drivers, specifically? How are these used? | Key drivers are used in developing planning models – focus is on adjusting the drivers (other line items are calculated automatically) | TBD | TBD | | | |
| | | | Key drivers are used in forecasting process – start by evaluating the driver, then the budget | TBD | TBD | | | |
| | | | Capture all critical assumptions | TBD | TBD | | | |
| | | | Focus on revenue planning – derive expenses | | | | | |

Fig. 10C

Diagnostic Category: Budgeting & Forecasting
Sub Categories Included: Budgeting & Forecasting Process and Budgeting & Forecasting Systems Architecture Qualitative Questions and Leading Practices:

| Diagnostic Category | Sub Category | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| | Budgeting & Forecasting Process | How detailed is your budgeting & forecasting activity (e.g. how many accounts, line items, etc.)? | Vary detail for planning/forecasting over time, value and volatility of business drivers | TBD | TBD | | | |
| | | | Budget at level of detail to reflect controllability of risk and expenditures | TBD | TBD | | | |
| | | | Limit number of line items and planning levels budgeted – include KPIs in the budget | TBD | TBD | | | |
| | Budgeting & Forecasting Process | Does your company utilize scenario planning, and how are the scenarios stored? | Ability to build/store multiple scenario versions which have different organization structures within the same database tool | TBD | TBD | | | |
| | | | Employ "what if" analysis capability to produce budgets under multiple scenarios (both economic and organizational) | TBD | TBD | | | |
| | Budgeting & Forecasting Process | How integrated is financial planning with other planning initiatives (e.g. capital expenditure planning, strategic planning)? | Integration of financial, operational and capital planning | TBD | TBD | | | |
| | | | Integrate multiple forecasting efforts and other finance processes | TBD | TBD | | | |

Fig. 10D

| | | | | |
|---|---|---|---|---|
| | Budgeting & Forecasting Process | Do all employees who can impact financial results and budgets feel responsible for accepting it? | Revenue, expense, and capital financial forecasts are linked to each other through an integrated model of business performance. Collective ownership (business operations and finance) of planning, budgeting and forecasting | TBD | TBD |
| | | | Collaborative budgeting – people who are responsible for performance against budgets are the ones creating the budget | TBD | TBD |
| Budgeting & Forecasting | Budgeting & Forecasting System Architecture | What technology architecture do you use for planning, budgeting, and forecasting activities? | Single, best of breed budgeting & forecasting application used consistently throughout the organization (corp. and business units) and integrated with other relevant financial applications (ERP, reporting tools, etc.) | A best of breed solution is used at corporate to "roll-up" the numbers, but BU participants use Excel for all of their modeling and calculations and then input the numbers into the corporate model. May or not be fully integrated with ERP, reporting tools, etc. | Large Excel model maintained by corporate with templates submitted and manually uploaded into the model |

Fig. 10E

| Budgeting & Forecasting System Architecture | To what degree are budgeting and forecasting applications integrated with other financial applications | TBD | Provide an integrated and fully functional set of budget preparation tools - use of integrated planning tool set across the entire organization enables easier consolidation, analysis, and processing of revisions | TBD |
| --- | --- | --- | --- | --- |
| | | | Provide automatic feeds to budget (prior year actual, prior period forecast, etc.) to reduce reconciliations and facilitate reporting | TBD |

Fig. 10F

Quantitative Metrics / KPIs:

| Diagnostic Category | Metric / KPI | Formula (unit of measure) | Benchmarking Data | | | Client Value | Client Value - Lead, Avg, Lag | Score (1-5) |
|---|---|---|---|---|---|---|---|---|
| | | | Leading | Average | Lagging | | | |
| Budgeting & Forecasting | Budget cycle time (#) | Length of annual budget cycle in weeks (#) | TBD | TBD | TBD | [Insert client value here] | Avg | 4 |
| | Work-days consumed by the annual budget (#) | Total number of work-days consumed by the annual budget - finance and non-finance (#) | TBD | TBD | TBD | [Insert client value here] | | |
| | Number of budget line items (#) | Number of budget line items (#) | TBD | TBD | TBD | [Insert client value here] | | |
| | Forecast Accuracy | Variance to actual as a % of budget / fcst (%) | TBD | TBD | TBD | [Insert client value here] | | |
| | Number of budgeting / forecasting applications (#) | Number of budgeting / forecasting applications (#) | TBD | TBD | TBD | [Insert client value here] | | |

Fig. 10G

Diagnostic Category: Budgeting & Forecasting
Sub Categories Included: Budgeting & Forecasting Process and Budgeting & Forecasting Systems Architecture

Qualitative Questions and Leading Practices:

| Diagnostic Category | Sub Category | Interview Question | Leading, Lagging & Most Common Practices | | | Client Response/Practice | Client Practice– Lead, Com, Lag | Total Score (1-5) |
|---|---|---|---|---|---|---|---|---|
| | | | Leading | Most Common | Lagging | | | |
| Financial & Business Analysis | Analysis | Describe the types of financial and business performed analysis. Is primarily historical or is much of it forward looking? Is it focused on value drivers? | Significant portion of analysis is forward-looking analysis used to make business decisions (e.g. related to pricing, new products, geographical expansion, etc.). Tight linkage to key shareholder value drivers. | Majority of analysis is traditional, historical analysis – budget to actual, rations, etc. Only a modest amount of forward looking analysis is performed. Only a loose connection to shareholder value drivers. | TBD | [Insert client answer here] | Leading | 4 |
| | Analysis | Describe the types of financial and business performed analysis. Is primarily historical or is much of it forward looking? | Significant portion of analysis is forward-looking analysis used to make business decisions (e.g. related to pricing, new products, geographical expansion, etc.). | TBD | TBD | | | |
| | | | Analysts in the business spend relatively little time historical variance analysis, traditional ratio analysis, etc. (this is automated for the most part, and more time is spent looking forward than back) | TBD | TBD | | | |

Fig. 10H

Diagnostic Category: Budgeting & Forecasting
Sub Categories Included: Budgeting & Forecasting Process and Budgeting & Forecasting Systems Architecture Qualitative Questions and Leading Practices:

| Diagnostic Category | Sub Category | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| | Analysis | What % of time on the following types of analysis – customer related, product related, other (please describe) | No leading practice per se, but mix should match overall company objectives | TBD | TBD | | | |
| | Analysis | To what extent is the financial analysis driven by value levers (vs. traditional ratio analysis, etc.) | Tight correlation between types of analysis and shareholder value drivers | TBD | TBD | | | |
| | Performance Reporting | Describe the nature, frequency, and content of management reporting | The key result measure of financial performance should be a shareholder value measure (or a proxy thereof) incorporating cash flow, invested capital and risk | TBD | TBD | | | |
| | | | Reports are few in number and focused on a shared management understanding of what is important | TBD | TBD | | | |

Fig. 10I

Diagnostic Category: Budgeting & Forecasting
Sub Categories Included: Budgeting & Forecasting Process and Budgeting & Forecasting Systems Architecture

*Qualitative Questions and Leading Practices:*

| Diagnostic Category | Sub Category | Interview Question | Leading, Lagging & Most Common Practices | | | Client Response/ Practice | Client Practice— Lead, Com, Lag | Total Score (1-5) |
|---|---|---|---|---|---|---|---|---|
| | | | Leading | Most Common | Lagging | | | |
| | | Simple user interface to required management information (one page summary) for exceptions and root causes | TBD | TBD | | | | |
| | | Consistent performance measurement and reporting processes across the business | | TBD | TBD | | | |
| | | Management information should be timely, current and available on-line; disable non-value added reports | | TBD | TBD | | | |
| | | Reporting should be 70% historical, 30% predictive use leading indicators when appropriate | | TBD | TBD | | | |
| | | Provide an ongoing data view, rather than focus on monthly reporting | | TBD | TBD | | | |

Fig. 10J

Diagnostic Category: Budgeting & Forecasting
Sub Categories Included: Budgeting & Forecasting Process and Budgeting & Forecasting Systems Architecture

*Qualitative Questions and Leading Practices:*

| Diagnostic Category | Sub Category | Interview Question | Leading, Lagging & Most Common Practices | | | Client Response/ Practice | Client Practice= Lead, Com, Lag | Total Score (1-5) |
| --- | --- | --- | --- | --- | --- | --- | --- | --- |
| | | | Leading | Most Common | Lagging | | | |
| | Performance Reporting | To what extent are dashboards/scorecards utilized in conjunction with planning and analysis? What information is included in the dashboard? | Customized dashboards are available for all key executives and delivered directly via the financial systems. Reporting content focuses on the critical few financial and non-financial metrics/ value drivers which are aligned with overall business objectives | Limited use of dashboards, typically created manually. Performance measures are many in number and financially focused | No scorecard exists – reporting consists of basic financial statements | | | |
| | Performance Reporting | Describe in more detail the content included in executive dashboards | Reporting content focuses on the critical few financial and non-financial metrics / value drivers which are aligned with overall business objectives | TBD | TBD | | | |
| | | | Management reporting is KPI oriented | TBD | TBD | | | |
| | | | Utilize exception-based information, including alarms | TBD | TBD | | | |
| | | | Performance measurement data are focused both historical results and predictive measures and utilize exception-orientated reporting approaches. | TBD | TBD | | | |

Fig. 10K

Diagnostic Category: Budgeting & Forecasting
Sub Categories Included: Budgeting & Forecasting Process and Budgeting & Forecasting Systems Architecture Qualitative Questions and Leading Practices:

| Diagnostic Category | Sub Category | Interview Question | Leading, Lagging & Most Common Practices ||| Client Response/ Practice | Client Practice – Lead, Com, Lag | Total Score (1-5) |
| | | | Leading | Most Common | Lagging | | | |
| --- | --- | --- | --- | --- | --- | --- | --- | --- |
| | | How to finance and operating management work together to address performance issues? | Use a mix of push and pull distribution processes so users obtain reports as needed | TBD | TBD | | | |
| | Performance Reporting | | Formal periodic reviews between corporate and operating management based on critical few performance measures | TBD | TBD | | | |
| | | | Root cause analysis and corrective actions only required when key measures are out of tolerance | TBD | TBD | | | |
| | System Architecture | Describe the technology used within the management reporting and analysis departments (e.g. integrated performance management software? Excel?). Is technology an enabler or a hindrance? | Single, best of breed reporting and analysis application used consistently throughout the organization (corp. and business units) and integrated with other relevant financial applications (ERP, reporting tools, etc.). Directly accesses both financial and operational data with drill-down capability. On-line, dashboard style presentation of key data. | TBD | Multiple, non-integrated databases, data keyed into Excel for analysis, reports prepared in Excel | | | |

Fig. 10L

Diagnostic Category: Budgeting & Forecasting
Sub Categories Included: Budgeting & Forecasting Process and Budgeting & Forecasting Systems Architecture

*Qualitative Questions and Leading Practices:*

| Diagnostic Category | Sub Category | Interview Question | Leading, Lagging & Most Common Practices | | | Client Response/ Practice | Client Practice – Lead, Com, Lag | Total Score (1-5) |
|---|---|---|---|---|---|---|---|---|
| | | | Leading | Most Common | Lagging | | | |
| | System Architecture | To what extent are financial analysis and management reporting tools integrated with other financial systems | Reporting tool that is fully integrated with accounting and planning systems. | TBD | TBD | | | |
| | | | Data extracted from internal and external systems into a central repository to meet multiple reporting requirements (one version of the truth) | TBD | TBD | | | |

*Quantitative Metrics / KPIs:*

| Diagnostic Category | Metric / KPI | Formula (unit of measure) | Benchmarking Data | | | Client Value | Client Value - Lead. Avt. Lag | Score (1-5) |
|---|---|---|---|---|---|---|---|---|
| | | | Leading | Average | Lagging | | | |

Fig. 10M

Diagnostic Category: Investor Relations
Sub Categories Included: Investor Relations

*Qualitative Questions and Leading Practices:*

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| Investor Relations | Investor Relations | Describe your relationship with the investor community? What improvements could be made? | TBD | TBD | TBD | [insert client answer here] | Leading | 4 |
| | Investor Relations | Describe the nature and frequency of formal communication with investors | TBD | TBD | TBD | | | |
| | Investor Relations | Describe the content of external communications - what is presented beyond the basic requirements? | TBD | TBD | TBD | | | |

*Quantitative Metrics / KPIs:*

| Diagnostic Category | Metric / KPI | Formula (unit of measure) | Benchmarking Data | | | Client Value | Client Value - Lead, Avg, Lag | Score (1-5) |
|---|---|---|---|---|---|---|---|---|
| | | | Leading | Average | Lagging | | | |
| Investor Relations | Earnings Release Cycle Time | Days to quarterly earnings release (#) | TBD | TBD | TBD | [insert client value here] | Avg | 3 |

Fig. 11

Diagnostic Category: CAPEX Management
Sub Categories Included: Management of Intangibles, Capital Allocation / Capital Investment Management, Capital Project Management

Qualitative Questions and Leading Practices:

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| CAPEX Management | Management of Intangibles | How important are intangible assets to your company's long-term shareholder wealth creation? What is the relative mix/weight attached to intangible and tangible assets? (i.e. do you rely exclusively on tangible assets? intangibles? is it roughly 50/50?) | Distinction between intangible assets and tangible ones in well understood. Key intangible assets have been identified and their impact on shareholder value is known. Effective management of both tangible and intangible assets. | Focus is on P&L and Balance Sheet management | Focus is on P&L and tangible asset management | [Insert client answer here] | Leading | 4 |
| | Management of Intangibles | Does your company measure the performance of its intangible assets and/or intellectual capital? If so, is that measurement integrated with the tools the company uses to measure traditional financial performance? (how robust is your system? are your measures robust or more qualitative and informal?) | The value of intangible assets and their contribution to shareholder value is formally measured. This effort is integrated with the overall performance management process | TBD | TBD | | | |
| CAPEX Management | Capital Allocation / Capital Investment Management | Is there a formal capital allocation process in place? How is capital allocated between business units, etc.? | Formal, structured capital allocation process that is aligned to strategy and performance management cycle - e.g. changes in capital spending budget impact operating income targets | Some integration between strategy, capital allocation systems, and performance management. Capex not given the same weight as P&L. Spend on sustaining/ maintenance capital perceived as entitled | Capital allocation process is informal, ad-hoc, separate from strategy and performance management processes, and spreadsheet reliant. Last year's capital budget perceived as entitled | | | |

Fig. 12A

Diagnostic Category: CAPEX Management
Sub Categories Included: Management of Intangibles, Capital Allocation / Capital Investment Management, Capital Project Management

Qualitative Questions and Leading Practices:

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| | Capital Allocation / Capital Investment Management | Do you formally measure returns from capital investments? Are you satisfied with these returns? If not, what are you doing to improve? | Returns on capital investments are formally measured and tracked in a manner that is consistent across the company and across different investments | TBD | TBD | | | |
| | Capital Allocation / Capital Investment Management | Describe in the detail the capital allocation methodology | Distinction is made between different types of capital (e.g. maintenance, expansion, and new opportunity) and there is a conscious decision made on how to allocate capital between these types | TBD | TBD | | | |
| | | | View all funds as belonging to the company, not the individual divisions | TBD | TBD | | | |
| | | | The cost of capital is known and embedded in to capital spend decisions | TBD | TBD | | | |
| | | | Formal business case with adequate ROIC is prepared in advance of capital approval. The benefits are tracked against this business case | TBD | TBD | | | |
| | | | Establish standard policies and procedures to create and maintain capital plans | TBD | TBD | | | |

Fig. 12B

Diagnostic Category: CAPEX Management
Sub Categories Included: Management of Intangibles, Capital Allocation / Capital Investment Management, Capital Project Management

Qualitative Questions and Leading Practices:

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| | | | Use all-encompassing approach to determine whether to fund new capital projects, how to determine cost of ownership, migration costs to new equipment, and how to dispose of old equipment | TBD | TBD | | | |
| | | | Standardize capital appropriations request approvals practices and approval criteria | TBD | | | | |
| CAPEX Management | Capital Project Management | Describe your process for managing major capital projects | Structured, consistent approach is used to track capital project spending, percentage of completion, and value achieved throughout the life of the project. The systems used for these efforts are integrated with other financial systems | TBD | TBD | | | |

Fig. 12C

Diagnostic Category: CAPEX Management
Sub Categories Included: Management of Intangibles, Capital Allocation / Capital Investment Management, Capital Project Management

*Qualitative Questions and Leading Practices:*

| Diagnostic Category | Sub Category | Interview Question | Leading Lagging & Most Common Practices ||| Client Response / Practice | Client Practice - Lead, Com, Lag | Total Score (1-5) |
| --- | --- | --- | --- | --- | --- | --- | --- | --- |
| | | | Leading | Most Common | Lagging | | | |
| | Capital Project Management | What standardization methods are utilized in project creation? | Maintain credibility in the fixed asset ledger by dutifully tracking assets from appropriation through disposition. This would involve the integration of the capital planning process through the appropriation request/approval, acquisition, construction, activation and disposition of the asset | TBD | TBD | | | |
| | | | Establish and standardize guidelines for enterprise-wide project tracking, balancing the administrative effort with the level of cost detail required and the size of the project | TBD | TBD | | | |
| | | | Standardize other master data elements across the enterprise or business area depending on business requirements. WBS: standardize for each business area | TBD | TBD | | | |

Fig. 12D

Diagnostic Category: CAPEX Management
Sub Categories Included: Management of Intangibles, Capital Allocation / Capital Investment Management, Capital Project Management

*Qualitative Questions and Leading Practices:*

| Diagnostic Category | Sub Category | Interview Question | Leading, Lagging & Most Common Practices | | | Client Response / Practice | Client Practice - Lead, Com, Lag | Total Score (1-3) |
|---|---|---|---|---|---|---|---|---|
| | | | Leading | Most Common | Lagging | | | |
| | | | Use one central ("master") repository for creating and maintaining all project definitions and transactions. This should be the "book of record" and integrated with feeder systems to validate transactional source data. This will also provide a complete financial picture of the project from both a revenue and cost perspective throughout its lifecycle | TBD | TBD | | | |
| Capital Project Management | | What automatic triggers/notifications are utilized in the project approval process? | Notify approvers automatically upon project creation of pending project requests (e.g., workflow) | TBD | TBD | | | |
| | | | Approvals are automatically tracked by digital signature | TBD | TBD | | | |
| | | | Automate budget updates upon approval | TBD | TBD | | | |
| Capital Project Management | | How are budgets created and utilized for capex projects? | Establish guidelines to create project budget during the project creation and authorization process for performance measurement and status tracking | TBD | TBD | | | |

Fig. 12E

Diagnostic Category: CAPEX Management
Sub Categories Included: Management of Intangibles, Capital Allocation / Capital Investment Management, Capital Project Management Qualitative Questions and Leading Practices:

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| | | | Create budgets with a controllable cost emphasis (e.g., cost category, duration, task/activity) while maintaining meaningful classifications to those performing the work | TBD | TBD | | | |
| | | | The budgets should be based on "work to perform" and "initiatives to execute", not on money to be spent | TBD | TBD | | | |
| | | | Manage a project budget through to delivery, maintaining an online history of project budget changes | TBD | TBD | | | |
| | | | Tie project budgeting to GL (account and cost center) budgeting | TBD | TBD | | | |
| | | | Budget overruns need to be accounted for through supplementing existing budget with additional budget amount from GL account/cost center budget | TBD | TBD | | | |

Fig. 12F

Diagnostic Category: CAPEX Management
Sub Categories Included: Management of Intangibles, Capital Allocation / Capital Investment Management, Capital Project Management

*Qualitative Questions and Leading Practices:*

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| | Capital Project Management | How are asset categories organized and aligned with accounting systems? | The project definition and WBS is synchronized between the project accounting and project management tools to enable consistent reporting in both systems | TBD | TBD | | | |
| | | | This does not necessarily dictate that everything is captured at the same level of detail, but that they are captured at a consistent, reportable level of detail | TBD | TBD | | | |
| | | | Design a WBS which is standard yet flexible to support multiple projects across all organizational entities | TBD | TBD | | | |
| | | | The standard WBS should facilitate reporting while allowing for project management to track work and control costs at their desired level of detail | TBD | TBD | | | |

Fig. 12G

Diagnostic Category: CAPEX Management
Sub Categories Included: Management of Intangibles, Capital Allocation / Capital Investment Management, Capital Project Management Qualitative Questions and Leading Practices:

| Diagnostic Category | Sub Category | Interview Question | Leading, Lagging & Most Common Practices | | | Client Response/ Practice | Client Practice - Lead, Com, Lag | Total Score (1-5) |
|---|---|---|---|---|---|---|---|---|
| | | | Leading | Most Common | Lagging | | | |
| | Capital Project Management | How are projects reviewed and prioritized for approval? | Business community project requests should be evaluated and approved based on an enterprise view of their cost and benefits to avoid redundancy and to leverage enterprise-wide resources | TBD | TBD | | | |
| | | | Projects should have realistically estimated costs and benefits so that senior management can review them | TBD | TBD | | | |
| | | | Avoid double counting of benefits | TBD | TBD | | | |
| | | | Projects that have similar benefits should be consolidated or organized into programs to facilitate management and executive oversight | TBD | TBD | | | |
| | Capital Project Management | What project reporting exists to monitor the status of the project? | For senior executives, projects should be managed as a portfolio, with summary reporting for budgets, costs, forecasts, expected benefits, progress/status and risks/issues | TBD | TBD | | | |

Fig. 12H

Diagnostic Category: CAPEX Management
Sub Categories Included: Management of Intangibles, Capital Allocation / Capital Investment Management, Capital Project Management Qualitative Questions and Leading Practices:

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| | | | Integrate project work plan (e.g., schedule, work effort estimates) with financials for predictive forecasting and earned value reporting | TBD | TBD | | | |
| | | | Focus on updates, variances/exceptions and forecasts when analyzing a portfolio of projects | TBD | TBD | | | |
| Capital Project Management | | How is project time tracked and processed for the project? | Track project time to the level of detail required for project management, only entering timesheets once | TBD | TBD | | | |
| | | | Integrate the time tracking tool with the project accounting and project management tools. Labor units (e.g., hours) by individual resource should be tracked to facilitate integration with project management system | TBD | | | | |
| | | | Validate time and expense project charges against project team members | T | | TBD | BD | |

Fig. 121

Diagnostic Category: CAPEX Management
Sub Categories Included: Management of Intangibles, Capital Allocation / Capital Investment Management, Capital Project Management Qualitative Questions and Leading Practices:

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| | Capital Project Management | How are project costs processed? | Project transactional data should be captured and validated at the source of data (e.g., time and expense sheets, requisitions, invoices, inventory requests, bills) and integrated with project accounting | TBD | TBD | | | |
| | | | All project-related costs and revenues should be tracked for the life of the project and kept in sync with GL | TBD | | | | |
| | | | Track purchasing commitments to provide complete financial picture of project spend | TBD | TBD | | | |
| | Capital Project Management | Are projects monitored in smaller subsets of the overall project? | Use single or a small set of CIP account(s) for all CIP projects, while maintaining detail in the PA tool (not in the GL) | TBD | TBD | | | |
| | Capital Project Management | What is the approval process on the receipt of invoices? | Approval of time, expense and purchase requisition transactions by project managers and recorded with a digital signature | TBD | TBD | | | |

Fig. 12J

Diagnostic Category: CAPEX Management
Sub Categories Included: Management of Intangibles, Capital Allocation / Capital Investment Management, Capital Project Management

Qualitative Questions and Leading Practices:

| Diagnostic Category | Sub Category | Interview Question | Leading, Lagging & Most Common Practices | | | Client Response/ Practice | Client Practice - Lead, Com, Lag | Total Score (1-5) |
|---|---|---|---|---|---|---|---|---|
| | | | Leading | Most Common | Lagging | | | |
| | | | Check project budgets before approving requisitions. Automatically notify budget owners of potential overruns (e.g., based on forecasts) | TBD | TBD | | | |
| | Capital Project Management | Does the company forecast project spend once the project is initiated? | Control budget overruns through automated calculation and monitoring of forecasted amounts, variances and tolerances | TBD | TBD | | | |
| | | | Use labor rates to estimate and forecast project costs based on expected work effort required to complete the project | TBD | TBD | | | |
| | Capital Project Management | Describe the project accounting processes. | For capital expenditures, accumulate capitalized interest during construction to accurately capture the total cost of project | TBD | TBD | | | |

Fig. 12K

| | | | |
|---|---|---|---|
| Capital Project Management | | Eliminate manual entry by automating the process based on enterprise-wide business rules | TBD | TBD |
| | | Project allocations and settlements should be defined systematically and automatically executed | TBD | TBD |
| | | Most (if not all) project transactions should be automated to avoid data entry errors | TBD | TBD |
| | | Adjustments should be performed in the source system | TBD | TBD |
| Capital Project Management | What triggers that a project is complete and is put into service? | Define a stringent policy/procedure for placing under-construction assets (i.e. project costs) into service on a timely manner | TBD | TBD |
| Capital Project Management | How are projects defined for accounting classification? | Automate the asset definition process based on project definition | TBD | TBD |
| | | Key principle is to readily identify the cost basis for each asset | TBD | TBD |
| | | Track your project costs in a fashion that will allow for optimal tax benefits | TBD | TBD |
| Capital Project Management | Are post mortems performed upon completion of projects? | After completion (post-mortem), actual project benefits should be tracked and recorded for future analysis and project planning | TBD | TBD |

Fig. 12L

Quantitative Metrics / KPIs:

| Diagnostic Category | Metric / KPI | Formula (unit of measure) | Benchmarking Data | | | Client Value | Client Value - Lead, Avg, Lag | Score (1-5) |
|---|---|---|---|---|---|---|---|---|
| | | | Leading | Average | Lagging | | | |
| CAPEX Management | WACC vs. Competitors in Industry | TBD (%) | TBD | TBD | TBD | [Insert client value here] | Avg | 3 |
| | Percent of market value attributable to intangibles | TBD (%) | TBD | TBD | TBD | | | |
| | Return on invested capital | TBD (%) | TBD | TBD | TBD | | | |

Fig. 12M

Diagnostic Category: Working Capital Management
Sub Categories Included: TBD

Qualitative Questions and Leading Practices:

| Diagnostic Category | Sub Category | Interview Question | Leading, Lagging & Most Common Practices ||| Client Response / Practice | Client Practice - Lead, Com, Lag | Total Score (1-5) |
| --- | --- | --- | --- | --- | --- | --- | --- | --- |
| | | | Leading | Most Common | Lagging | | | |
| Working Capital Management | Working Capital Management | How important is managing working capital (relative to, say the importance of managing P&L)? How closely is working capital monitored? | TBD | TBD | TBD | [Insert client answer here] | Leading | 4 |
| | Working Capital Management | How is working capital monitored? | TBD | TBD | TBD | | | |
| | Working Capital Management | Who within the company is responsible for working capital management - One person / group? Multiple groups? Centralized? De-centralized? Etc. | TBD | TBD | TBD | | | |
| | Working Capital Management | What methods are currently being employed to improve working capital | TBD | TBD | TBD | | | |

Quantitative Metrics / KPIs:

| Diagnostic Category | Metric / KPI | Formula (unit of measure) | Benchmarking Data ||| Client Value | Client Value - Lead, Avg, Lag | Score (1-5) |
| --- | --- | --- | --- | --- | --- | --- | --- | --- |
| | | | Leading | Average | Lagging | | | |
| Working Capital Management | Working Capital as % of Sales | TBD (#) | TBD | TBD | TBD | [Insert client answer here] | Leading | 4 |
| | Days Sales Outstanding (DSO) | TBD (#) | TBD | TBD | TBD | | | |
| | Days Payables Outstanding | TBD (#) | TBD | TBD | TBD | | | |
| | Inventory Turns | TBD (#) | TBD | TBD | TBD | | | |

Fig. 13

Diagnostic Category: Accounting & Reporting
Sub Categories Included: Record Transaction, Closing & Consolidation, Financial Reporting, Financial Systems

Qualitative Questions and Leading Practices:

| Diagnostic Category | Sub Category | Interview Question | Leading, Lagging & Most Common Practices | | | Client Response/ Practice | Client Practice - Lead, Com, Lag | Total Score (1-5) |
|---|---|---|---|---|---|---|---|---|
| | | | Leading | Most Common | Lagging | | | |
| Accounting & Reporting | Record Transaction | Describe your chart(s) of accounts - # of COAs, number of accounts, structure, etc. | Single chart of accounts, used consistently across all business units, legal entities, etc. Fewer than ___ GL accounts. Central maintenance of COA | TBD | TBD | [Insert client answer here] | Common | 3 |
| | Record Transaction | How is transactional data entered into the system - from what sources, by whom, who validates? | Validate data at the source of input | TBD | TBD | | | |
| | | | Clear and enforced ownership over information quality responsibility for information quality lies with source provider | TBD | TBD | | | |
| | Record Transaction | Describe your approach for managing the use of accounts, cost centers, etc. | Use consistent data definitions and roll-up structures: ensure that all entities agree on what balances are included in a particular account by using worldwide data definitions | TBD | TBD | | | |
| | | | Establish and enforce a comprehensive policy for Master Data Maintenance (including CoA, profit centers, cost centers, etc.) | TBD | TBD | | | |
| | | | Standardize accounting treatments for all transactions across all legal entities | TBD | TBD | | | |
| | Record Transaction | Describe the use of sub-ledgers and their relationship to the general ledger | Keep the transaction system views in the subsidiary ledgers, not in the general ledger | TBD | TBD | | | |
| | | | Use unified and integrated systems to eliminate sub-ledgers and needless reconciliation | TBD | TBD | | | |

Fig. 14A

Diagnostic Category: Accounting & Reporting
Sub Categories Included: Record Transaction, Closing & Consolidation, Financial Reporting, Financial Systems Qualitative Questions and Leading Practices:

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| | | | Aggregate and summarize transactions from all subsidiary ledgers to the general ledger on a more frequent basis, e.g. weekly, daily, instantaneous | TBD | TBD | | | |
| | | | Provide drill-down from the general ledger to sub-ledgers for easy analysis | TBD | TBD | | | |
| | | | Use allocations to approximate specific types of information for internal reporting requirements | TBD | TBD | | | |
| Record Transaction | | How is accounting for fixed assets handled? | Fixed asset application is integrated with the purchasing/accounts payable application to eliminate re-keying of fixed asset detail | TBD | TBD | | | |
| | | | Standardized depreciation lives for assets are used to streamline depreciation reporting | TBD | TBD | | | |
| | | | Automatic depreciation calculation is based on inventory/asset records using appropriate methods | TBD | TBD | | | |
| | | | Physical assets are identified and tracked using bar-coded asset tags | TBD | TBD | | | |
| | | | Pooling of assets approach is used for capitalizing assets with multiple units that have low individual asset values | TBD | TBD | | | |

Fig. 14B

Diagnostic Category: Accounting & Reporting
Sub Categories Included: Record Transaction, Closing & Consolidation, Financial Reporting, Financial Systems Qualitative Questions and Leading Practices:

| Diagnostic Category | Sub Category | Interview Question | Leading, Lagging & Most Common Practices | | | Client Response/ Practice | Client Practice - Lead, Com, Lag | Total Score (1-5) |
|---|---|---|---|---|---|---|---|---|
| | | | Leading | Most Common | Lagging | | | |
| Accounting & Reporting | Closing & Consolidation | Describe the closing process (frequency, automated vs. manual, time/resource requirements, who is responsible, etc.) | Heavily automated process taking no more than 3-5 days | TBD | TBD | | | |
| | Closing & Consolidation | Why does the closing process take as long as it does? What are the primary drivers of delays? | No material delays due to bad source data, manual effort / lack of automation, multiple layers of roll-ups, multiple charts of accounts, etc. | TBD | TBD | | | |
| | Closing & Consolidation | Describe the use of accruals in the closing process | Automate key accruals and minimize the number of accruals | TBD | TBD | | | |
| | | | Create and post all reversals automatically | TBD | TBD | | | |
| | | | Accruals should be created dynamically when a commitment occurs (i.e. goods receipt) | TBD | TBD | | | |
| | | | Use subsystems, not people, to calculate key accruals | TBD | TBD | | | |
| | | | Introduce materiality thresholds | TBD | TBD | | | |
| | | | Use experience based estimates to calculate materially correct figures | TBD | TBD | | | |
| | Closing & Consolidation | Describe the extant to which allocations are used. How is the allocation process performed? | Limit allocations to only controllable expenses and revenues, and prohibit allocations less than a certain amount (e.g. $1,000) | TBD | TBD | | | |
| | | | Continually reassess basis, validity, usefulness, and relevance of allocations | TBD | | | | |

Fig. 14C

Diagnostic Category: Accounting & Reporting
Sub Categories Included: Record Transaction, Closing & Consolidation, Financial Reporting, Financial Systems

*Qualitative Questions and Leading Practices:*

| Diagnostic Category | Sub Category | Interview Question | Leading, Lagging & Most Common Practices | | | Client Response/ Practice | Client Practice- Lead, Com, Lag | Total Score (1-5) |
|---|---|---|---|---|---|---|---|---|
| | | | Leading | Most Common | Lagging | | | |
| | | | Apply basic rule: is the allocation adding value (e.g. different decisions without allocation) | TBD | TBD | | | |
| | | | "Receiving" manager should be able to control or influence the allocated costs | TBD | TBD | | | |
| | | | Allocations should be booked prior to the close and based on fixed-rate, budgeted rates or prior month | TBD | TBD | | | |
| | | | Run Allocation cycles automatically overnight | TBD | TBD | | | |
| | | | Limit allocations to only controllable expenses and revenue | TBD | TBD | | | |
| Closing & Consolidation | | Describe how intercompany transactions are posted and approved and how intercompany balances are reconciled | Establish a clearly defined inter-company transaction policy | TBD | TBD | | | |

Fig. 14D

| | | | |
|---|---|---|---|
| Closing & Consolidation | Describe the use of manual journal entries - nature, frequency, etc. | Reconciliation of inter-company transactions performed on a daily basis | TBD | TBD |
| | | Inter-company transactions automatically managed in the accounting systems (the credit transactions automatically generate the debit transactions in the debtor set of books) | TBD | TBD |
| | | Specific, automated tools to support the collection and reconciliation of intra-group balances | TBD | TBD |
| | | Prohibit accruals and allocations via PC spreadsheet | TBD | TBD |
| | | Only process financial adjustments at the end of accounting periods that coincide with external reporting requirements | TBD | TBD |
| | | Automatic processing of allocations and currency translations | TBD | TBD |
| | | Automatic feed of exchange rates to the reporting tool used for translation process | TBD | TBD |
| | | No reclassifications or manual correcting entries unless material | TBD | TBD |
| | | Management accounting requirements should be leading to determine reclassification need - legally required reclassification only upon hard close | TBD | TBD |
| Closing & Consolidation | Describe the process used to consolidate results from multiple business units, geographies, etc. | Transmit all data electronically | TBD | TBD |
| | | Use a common chart of accounts for all legal entities | TBD | TBD |

Fig. 14E

| | | | | |
|---|---|---|---|---|
| Accounting & Reporting | Financial Reporting | Are financial statements integrated with other reporting results? | Transmit balances directly to corporate consolidating books and, where possible, eliminate other hierarchical consolidations | TBD | TBD |
| | Financial Reporting | What types of reports are communicated to managers? | Support drill-down back to individual set of books | TBD | TBD |
| | | | Integrate plan, budget, and forecast data to facilitate validation of actual data | TBD | TBD |
| | | | Utilize automated consolidation programs to create consolidated budgets, inter-company journal entries, and consolidated financial reports | TBD | TBD |
| | | | Reporting support tool that automatically generates reconciliation adjustments when differences are below a defined threshold value | TBD | TBD |
| | Financial Reporting | Are financial statements integrated with other reporting results? | Link financial reporting into the broader performance management agenda | TBD | TBD |
| | Financial Reporting | What types of reports are communicated to managers? | Report profit/loss to managers at all levels of the organization | TBD | TBD |
| | | | A multi-dimensional profitability analysis methodology exists and is extended to all applicable dimensions - customer, product, project, geography, market, and channel. | TBD | TBD |
| | Financial Reporting | How are reports distributed? | Eliminate paper based reporting provide electronic files to appropriate departments rather than preparing reports | TBD | TBD |
| | Financial Reporting | Are there additional reporting capabilities beyond standard reports? | Provide ad hoc and drill down data exploration capabilities | TBD | TBD |

Fig. 14F

| Category | Subcategory | Question | | | |
|---|---|---|---|---|---|
| | Financial Reporting | How flexible is the accounting system to support multiple county reporting requirements? | Provide multi-country GAAP capability | TBD | TBD |
| | Financial Reporting | How do you maintain the accuracy of the numbers reported? | Manage a single set of numbers, based on a single, logical source of data | TBD | TBD |
| | | | Automate interfaces between source systems and main repository | TBD | TBD |
| | Financial Reporting | How many days does it take to close the g/l and report during off quarter months? | "Soft" close performed to support internal reporting needs on a more timely basis than required for external reporting | TBD | TBD |
| Accounting & Reporting | Financial Systems | Summarize your financial systems architecture (ERP, legacy systems, etc.) | Single ERP system used worldwide, essentially no legacy systems, best of breed extensions consistently used (e.g. data warehouse, planning / forecasting, etc.) with spreadsheets as "supplements", web connections to customers, suppliers, and other functions, automated work flow | Single ERP system, but with exceptions - some legacy systems not yet decommissioned, best of breed extensions deployed inconsistently - spreadsheets still tool of choice, web connections to other functions, automated work flow | Multiple ERP and legacy systems, large number of system interfaces, spreadsheets and/or various stand alone applications dominate planning, forecasting, data analysis, and reporting activities, no web enablement |
| | Financial Systems | Describe in detail your financial systems architecture (ERP, legacy systems, etc.) | Single ERP system used worldwide, essentially no legacy systems, | TBD | TBD |
| | | | Best of breed extensions consistently used (e.g. data warehouse, planning / forecasting, etc.) with spreadsheets as "supplements" | TBD | TBD |
| | | | Web connections to customers, suppliers, and other functions | TBD | TBD |
| | | | Automated work flow | TBD | TBD |
| | | | Data models support business requirements and are flexible to change as the business does | TBD | TBD |

Fig. 14G

Consistent and common definitions for metrics and data elements — TBD — TBD

Fig. 14H

Quantitative Metrics / KPIs:

| Diagnostic Category | Metric / KPI | Formula (unit of measure) | Benchmarking Data | | | Client Value | Client Value - Lead, Avg, Lag | Score (1-5) |
|---|---|---|---|---|---|---|---|---|
| | | | Leading | Average | Lagging | | | |
| Accounting & Reporting | Number of financial systems | Simple count (#) | TBD | TBD | TBD | [Insert client value here] | Avg | 3 |
| | Number of financial systems interfaces | Simple count (#) | TBD | TBD | TBD | Data extracted from internal and external systems into a central repository to meet multiple reporting requirements (one version of the truth) | | |
| | # of charts of accounts (#) | Simple count (#) | TBD | TBD | TBD | | | |
| | # of manual journal entries per month (#) | Simple count (#) | TBD | TBD | TBD | Simple, direct, and common access to timely accurate information with drill-down capability | | |
| | Days to close the books (#) | Include all days, pre and post qtr end (#) | TBD | TBD | TBD | | | |
| | Days to quarterly earnings release (#) | Simple count (#) | TBD | TBD | TBD | Scalability of technical solution able to accommodate future growth and enhancement to the business | | |
| | Days to financial statement filings (10Q & 10K) | Simple count (#) | TBD | TBD | TBD | | | |
| | Accounting & reporting FTEs / SB (#) | TBD (#) | | | | | | |

Fig. 14I

Diagnostic Category: Internal Control
Sub Categories Included: Internal Control, Internal Audit

Qualitative Questions and Leading Practices:

| Diagnostic Category | Sub Category | Interview Question | Leading, Lagging & Most Common Practices | | | Client Response / Client Practice | Client Practice Lead, Com, Lag | Total Score (1-5) |
|---|---|---|---|---|---|---|---|---|
| | | | Leading | Most Common | Lagging | | | |
| Internal Control | Internal Control | Describe the control environment within the company. How high of a priority is internal control? | TBD | TBD | TBD | | | |
| | Internal Control | Describe your progress in complying with Sarbanes-Oxley requirements. Are you prepared to comply with all new regulations including Rule 404? | TBD | TBD | TBD | | | |
| Internal Control | Internal Audit | Do you have an internal audit department? If so, what role does it play in the company? To whom does it report? | Internal audit reports directly to the audit committee of the board, not to the CFO or Controller. Role includes both traditional audit functions such as ... as well as ... | TBD | TBD | | | |

Qualitative Metrics / KPIs:

| Diagnostic Category | Metric / KPI | Formula (unit of measure) | Benchmarking Data | | | Client Value | Client Value - Lead, Com, Lag | Score (1-5) |
|---|---|---|---|---|---|---|---|---|
| | | | Leading | Average | Lagging | | | |
| Internal Control | Number of annual audit adjustments | Simple count (#) | 0 | TBD | TBD | | | |

Fig. 15

Diagnostic Category: Purchasing
Sub Categories Included: Purchasing

Qualitative Questions and Leading Practices:

| Diagnostic Category | Sub Category | Interview Question | Leading, Lagging & Most Common Practices ||| Client Response/ Practice | Client Practice Lead, Com, Lag | Total Score (1-5) |
|---|---|---|---|---|---|---|---|---|
| | | | Leading | Most Common | Lagging | | | |
| Purchasing | Purchasing | Summarize the purchasing process and organizational model | Treat Procurement & Accounts Payable as coordinated part of end to end procurement process<br><br>Procurement process captured in single P2P system to deliver end to end processing capability<br><br>All requisitions go through the Purchasing Group | | | | | |
| Purchasing | Purchasing | Describe the requisition process | Electronic, standard requisition process available to appropriate members of the organization<br><br>Code financial information (GL, Cost Center, Project, etc) at time of request rather than time of invoice | | | | | |
| Purchasing | Purchasing | Describe the process for approving purchases within your company. To what extent | Approval is done once - at time of order, not invoice | | | | | |

Fig. 16A

Diagnostic Category: Purchasing
Sub Categories Included: Purchasing

Qualitative Questions and Leading Practices:

| Diagnostic Category | Sub Category | Interview Question | Leading, Lagging & Most Common Practices | | | Client Response/ Practice | Client Practice Lead, Com, Lag | Total Score (1-5) |
|---|---|---|---|---|---|---|---|---|
| | | | Leading | Most Common | Lagging | | | |
| | | are formal purchase orders used? | Approval process is standardized across organization and integrated to procurement system | | | | | |
| | | | No expense pre-approval required for purchases below set tolerances | | | | | |
| | | | Utilize contract purchasing and blanket PO capabilities where possible | | | | | |
| Purchasing | | How are high volume, small $ purchases handled. Are P-Cards used? To what extent? | Purchase orders are reduced and procurement cards are used extensively where appropriate (low dollar, high volume) | | | | | |
| Purchasing | | Do suppliers have access to view status of purchase orders? | Electronic and standard RFQ process is available to external suppliers | | | | | |
| Purchasing | | How is the status of purchase orders maintained? | Maintain current and timely status of orders (via timely order entry and change orders) when necessary to facilitate down-stream processing | | | | | |

Fig. 16B

Diagnostic Category: Purchasing
Sub Categories Included: Purchasing

*Qualitative Questions and Leading Practices:*

| Diagnostic Category | Sub Category | Interview Question | Leading, Lagging & Most Common Practices | | | Client Response/ Practice | Client Practice Lead, Com, Lag | Total Score (1-5) |
|---|---|---|---|---|---|---|---|---|
| | | | Leading | Most Common | Lagging | | | |
| Purchasing | Purchasing | Is the ordering process automated? | Automate document delivery to suppliers via auto-fax, EDI, XML<br><br>Commit to e-procurement/ commerce to facilitate cross-enterprise communication<br><br>Electronic Invoicing and Payment | | | | | |
| Purchasing | Purchasing | Describe the receipt process. What enablers are utilized improve efficiency on processing receipts? | Utilize material and service receipt functionality where appropriate to facilitate downstream transaction processing<br><br>Standardized inventory receipt and accounting process across organization<br><br>Utilize Evaluated Receipt Settlement (ERS) capabilities where appropriate and with specific suppliers<br><br>Bar coding to match receiving documents with goods expected for delivery | | | | | |

Fig. 16C

Diagnostic Category: Purchasing
Sub Categories Included: Purchasing

Qualitative Questions and Leading Practices:

| Diagnostic Category | Sub Category | Interview Question | Leading, Lagging & Most Common Practices | | | Client Response/ Practice | Client Practice Lead, Com, Lag | Total Score (1-5) |
|---|---|---|---|---|---|---|---|---|
| | | | Leading | Most Common | Lagging | | | |
| Purchasing | Purchasing | What strategies are in place for purchasing/supplier negotiations? | Preferred supplier programs that leverage negotiated buying power | | | | | |
| | | | Attention is focused on strategically important suppliers; those that supply key strategic products and largest volume of materials. | | | | | |
| | | | Strategic sourcing models utilized | | | | | |
| | | | Automated tools are utilized to perform cost/benefit analysis on discounts. | | | | | |
| Purchasing | Purchasing | What data is captured in the vendor master file and how is it maintained? | Centralize vendor master record maintenance for better administration | | | | | |
| | | | Clearly defined master data processes, procedures and policies are in place across the organization | | | | | |
| | | | Vendor master file accurately reflects terms negotiated by purchasing. | | | | | |

Fig. 16D

Diagnostic Category: Purchasing
Sub Categories Included: Purchasing

*Qualitative Questions and Leading Practices:*

| Diagnostic Category | Sub Category | Interview Question | Leading, Lagging & Most Common Practices | | | Client Response/ Practice | Client Practice Lead, Com, Lag | Total Score (1-5) |
|---|---|---|---|---|---|---|---|---|
| | | | Leading | Most Common | Lagging | | | |
| | Purchasing | Are system tools utilized to facilitate information with suppliers? | Equip suppliers with self-service tools to reduce administrative tasks such as payment status inquiries | | | | | |

*Quantitative Metrics / KPIs:*

| Diagnostic Category | Metric / KPI | Formula (unit of measure) | Benchmarking Data | | | Client Value | Client Value - Lead, Avg, Lag | Score (1-5) |
|---|---|---|---|---|---|---|---|---|
| | | | Leading | Average | Lagging | | | |
| Purchasing | % of purchasing transactions using a PO | # transactions using PO / total transactions (%) | | | | | | |
| | % of purchasing dollars using a PO | spend via PO / total spend (%) | | | | | | |
| | % of purchase transactions via Pcard | # transactions using PCard / total transactions (%) | | | | | | |
| | % of purchase dollars via Pcard | spend via PCard / total spend (%) | | | | | | |
| | % of purch transactions using preferred suppliers | # of transactions with preferred suppliers / total transactions (%) | | | | | | |
| | % of purch dollars using preferred suppliers | spend with preferred suppliers / total spend (%) | | | | | | |
| | % of purch transactions managed / controlled by central procurement | # of central procurement transactions / total transactions (%) | | | | | | |

Fig. 16E

Quantitative Metrics / KPIs:

| Diagnostic Category | Metric/KPI | Formula (unit of measure) | Benchmarking Data | | | Client Value | Client Value - Lead, Avg, Lag | Score (1-5) |
|---|---|---|---|---|---|---|---|---|
| | | | Leading | Average | Lagging | | | |
| | % of purch dollars managed / controlled by central procurement | central procurement spend / total spend (%) | | | | | | |
| | % of purchase orders in electronic form | total electronic purch POs / total POs (%) | | | | | | |
| | Procurement cost as % of spend | Total cost of procurement function / total spend (%) | | | | | | |
| | Procurement FTEs / $B in revenue | Total procurement FTEs / revenue in billions (#) | | | | | | |
| | Number of active suppliers | Simple count (#) | | | | | | |

Fig. 17

Diagnostic Category: Accounts Payable
Sub Categories Included: Process Invoices, Process Payments

*Qualitative Questions and Leading Practices:*

| Diagnostic Category | Sub Category | Interview Question | Leading, Lagging & Most Common Practices | | | Client Response / Practice | Client Practice - Lead, Com, Lag | Total Score (1-5) |
|---|---|---|---|---|---|---|---|---|
| | | | Leading | Most Common | Lagging | | | |
| Accounts Payable | A/P - Organization | Describe the A/P organization structure. Is it a shared services organization or are there multiple A/P groups? Is any of A/P outsourced? | Single A/P organization utilizing a shared service model or outsourced. In a low cost location. | TBD | TBD | [Insert client answer here] | Common | 3 |
| Accounts Payable | A/P - Process | Is A/P part of an end-to-end purchase-to-pay process, or is it separate from purchasing? Where do the majority of A/P issues originate? | Accounts payable is part of an end-to-end purchase-to-pay process with front end transactional processes designed to minimize own stream error correction | TBD | TBD | | | |
| | A/P - Process | Describe in more detail the A/P process | Scan and route 100% of invoices when received by accounts payable processing center | TBD | TBD | | | |
| | | | Process all accounts payable through a single system | TBD | TBD | | | |
| | | | Centralized Account Payable responsibilities across the organization | TBD | TBD | | | |

Fig. 18A

Diagnostic Category: Accounts Payable
Sub Categories Included: Process Invoices, Process Payments

Qualitative Questions and Leading Practices:

| Diagnostic Category | Sub Category | Interview Question | Leading, Lagging & Most Common Practices | | | Client Response/ Practice | Client Practice - Lead, Com, Lag | Total Score (1-5) |
|---|---|---|---|---|---|---|---|---|
| | | | Leading | Most Common | Lagging | | | |
| | | | Consolidate multiple invoices / payments to one vendor into single EFT or check | TBD | TBD | | | |
| | | | Optimize number of check runs each month | TBD | TBD | | | |
| | | | Personnel are able to utilize imaging and drill down capabilities within ERP system to gather information regarding procurement | TBD | TBD | | | |
| | | | Review 100% of large dollar invoices and statistically sample the remainder | TBD | TBD | | | |
| | | | Request summary and consolidated invoices from key suppliers | TBD | TBD | | | |
| | | | Payments to a single vendor are combined for efficiency | TBD | TBD | | | |
| | | | Eliminate manual check request generation | TBD | TBD | | | |

Fig. 18B

Diagnostic Category: Accounts Payable
Sub Categories Included: Process Invoices, Process Payments Qualitative Questions and Leading Practices:

| Diagnostic Category | Sub Category | Interview Question | Leading, Lagging & Most Common Practices ||| Client Response / Practice | Client Practice - Lead, Com, Lag | Total Score (1-5) |
| --- | --- | --- | --- | --- | --- | --- | --- | --- |
| | | | Leading | Most Common | Lagging | | | |
| | | | Batch/Schedule supplier payments into one payment made from central Accounts Payable function | TBD | TBD | | | |
| | | | Calculate tax automatically on invoices based on information from procurement | TBD | TBD | | | |
| | A/P - Process | Are procurement cards used for small dollar purchases? Do they eliminate both purchase order and invoice processing for these items? What percentage of total purchases are procurement cards used? What is the dollar ceiling for a purchase to be considered a small purchase? | Procurement cards are used to minimize the high volume of low dollar PO's and invoices being processed. | TBD | TBD | | | |
| | | | Implement automated loading / integration of procurement card transaction data | TBD | TBD | | | |
| | A/P - Process | How aggressively are vendor discounts taken? How many are "missed" due to processing issues? | All vendor discounts that maximize the company's cash position and working capital are used | TBD | TBD | | | |
| | A/P - Process | Is EFT (Electronic Funds Transfer) used for vendor payments? | Utilize EFT for payment to eliminate use of paper checks | TBD | TBD | | | |

Fig. 18C

Diagnostic Category: Accounts Payable
Sub Categories Included: Process Invoices, Process Payments

Qualitative Questions and Leading Practices:

| Diagnostic Category | Sub Category | Interview Question | Leading, Lagging & Most Common Practices ||| Client Response / Practice | Client Practice - Lead, Com, Lag | Total Score (1-5) |
| --- | --- | --- | --- | --- | --- | --- | --- | --- |
| | | | Leading | Most Common | Lagging | | | |
| Accounts Payable | A/P - Technology | Describe the technology environment within A/P. For example, are imaging, EDI, and EFT used. If so, how extensively? | TBD | TBD | TBD | | | |

Quantitative Metrics / KPIs

| Diagnostic Category | Metric / KPI | Formula (unit of measure) | Benchmarking Data ||| Client Value | Client Value - Lead, Com, Lag | Score (1-5) |
| --- | --- | --- | --- | --- | --- | --- | --- | --- |
| | | | Leading | Average | Lagging | | | |
| Accounts Payable | Invoices processed per A/P employee (#) | Total invoices processed / A/P FTEs (#) | TBD | TBD | TBD | | | |
| | Days payable outstanding | TBD (#) | TBD | TBD | TBD | | | |
| | % of vendor discounts captured | Vendor discount $ captured / vendor discount $ available (%) | TBD | TBD | TBD | | | |
| | Average cost per invoice processed | Total cost of A/P function / # of invoices processed ($/#) | TBD | TBD | TBD | | | |
| | Number of credits issued | Simple count (#) | TBD | TBD | TBD | | | |
| | Number of active vendors | Simple count (#) | TBD | TBD | TBD | | | |
| | Percent of invoice volume paid via - EDI/EFT/ACH | (%) | TBD | TBD | TBD | | | |

Fig. 18D

Quantitative Metrics / KPIs

| Diagnostic Category | Metric / KPI | Formula (unit of measure) | Benchmarking Data | | | Client Value | Client Value - Lead, Cont, Lag | Score (1-5) |
|---|---|---|---|---|---|---|---|---|
| | | | Leading | Average | Lagging | | | |
| | Percent of invoice volume paid via - Cash | (%) | TBD | TBD | TBD | | | |
| | Percent of invoice volume paid via - Checks | (%) | TBD | TBD | TBD | | | |
| | Percent of checks issued to vendors - through automated processes | (%) | TBD | TBD | TBD | | | |
| | Percent of checks issued to vendors - through manual efforts | (%) | TBD | TBD | TBD | | | |
| Policies | | Are there formal policies and procedures established for the processes in this function? | | | | | | |
| Policies | | How often are these policies and procedures updated? | | | | | | |
| Process | | Is research/resolution performed only for disputes tied to large dollar amount invoices and statistically sampling all other invoices? | | | | Invoice and receipt matching is performed in a time-consuming and costly manual manner. | | |

Fig. 18E

| | | |
|---|---|---|
| Process | Is there a standard policy on the number of days allowed before an invoice is entered into the system? | There is no standard policy and invoices are entered haphazardly into the system |
| Process | What is the average time between the invoice receipts and entry into the system? | There is no standard policy and invoices are entered haphazardly into the system |
| Process | Does an automated system exist to answer suppliers' questions? | High percentage of vendor disbursement related calls with no automated system to answer supplier questions. |
| Process | Is EDI (Electronic Data Interchange) used for transmission of invoice information from suppliers? | Organization is not focused on e-Finance |
| Process | Is EFT (Electronic File Transfer) used for vendor payments? | Organization is not focused on e-Finance |
| similar item used above | Is there more than one Vendor Master file? If yes, are they synchronized? How is information updated and synchronized? | Multiple vendor master files exist; Payments are made at random, regardless of funds availability or putting cash flow position at risk |
| Process | Is vendor invoicing process centralized? | Invoices are tracked by many people and in various systems |
| similar item used above | | |

Fig. 18F

| Category | Question | Notes |
|---|---|---|
| Process | Are the invoices matched to a good receipt process? Is the matching process automatic in the system between the invoice and the order and/or the goods receipt? | Invoice and receipt matching is performed in a time-consuming and costly manual manner. |
| Process | Are tolerances/thresholds in place as a prerequisite factor to exception handling? | No matching tolerances exist, causing considerable exceptions processing. |
| Process | Do certain invoices need to be physically signed by the person responsible for the purchase? | |
| Process | For what type of invoices is the receipts matching process automatic? Is a workflow system used? | Invoice and receipt matching is performed in a time-consuming and costly manual manner. |
| Process | Please list the causes for exception handling? | |
| Process | What is the process of handling exceptions, including authorization levels required to handle and clear exceptions? | No matching tolerances exist, causing considerable exceptions processing. |
| Process | What percentage of invoices are processed through exception handling? | |
| Process | Identify the total number of invoices, invoice lines, and payments issued per year. | |
| Systems | Is imaging used for storage of invoices? | Paper-based supplier invoices are received; Invoices are copied and stored in a paper based format. |

Systems

Where are invoices stored? In what locations?

Paper-based supplier invoices are received; Invoices are copied and stored in a paper based format.

Diagnostic Category: Payroll
Sub Categories Included: Payroll

*Qualitative Questions and Leading Practices:*

| Diagnostic Category | Sub Category | Interview Question | Leading, Lagging & Most Common Practices | | | Client Response / Client Practice | Client Practice - Lead, Lag, Com, Leg | Total Score (1-5) |
|---|---|---|---|---|---|---|---|---|
| | | | Leading | Most Common | Lagging | | | |
| Payroll | Payroll | Describe the payroll organization structure. Is it a shared services organization or are there multiple payroll groups? Is it outsourced? | Shared services organization or outsourced | TBD | TBD | | | |
| | Payroll | How is time information recorded? | Automate collection of time at the source | TBD | TBD | | | |
| | | | Establish absence days as a means for consolidating sick days, personal days, etc. | TBD | TBD | | | |
| | Payroll | How is the payroll process and systems integrated with other processes and systems? | Consolidate payroll payment function with accounts payable subsystem | TBD | TBD | | | |
| | | | Integrate time and attendance functions with payroll and project management | TBD | TBD | | | |
| | Payroll | What controls are in place to protect against overpayment? | Perform threshold checking for amounts in regular paychecks | TBD | TBD | | | |
| | | | Utilize exception-based time entry for both salaried and hourly employees (if tied to a work scheduling system) | TBD | TBD | | | |
| | Payroll | What methods are used to make payments to personnel? (e.g. checks, direct deposit) | Eliminate issuance of paper checks, though generate check stubs as needed and provide voice response mechanisms for inquiries | TBD | TBD | | | |
| | | | Utilize direct deposit to pay all employees | TBD | TBD | | | |

Fig. 19A

Quantitative Metrics / KPIs:

| Diagnostic Category | Metric / KPI | Formula (unit of measure) | Benchmarking Data | | | Client Value | Client Value – Lead. Avg. Lag | Score (1-5) |
| --- | --- | --- | --- | --- | --- | --- | --- | --- |
| | | | Leading | Average | Lagging | | | |
| Payroll | Payroll cost / employee | Total cost of payroll function / paid employees ($#) | TBD | TBD | TBD | | | |
| | % of paychecks direct deposited | Paychecks direct deposited / total paychecks (%) | TBD | TBD | TBD | | | |

Fig. 19B

Diagnostic Category: Order-to-Cash (Billing, A/R, Credit & Collections)
Sub Categories Included: Authorize Credit, Receive & Fulfill Order, Invoice Customer, A/R / Collections, Apply Cash, Organization, Customer Data Warehouse, Exceptions
*Qualitative Questions and Leading Practices:*

| Diagnostic Category | Sub Category | Interview Question | Leading, Lagging & Most Common Practices | | | Client Response / Client Practice | Client Practice Lead, Com, Lag | Total Score (1-5) |
|---|---|---|---|---|---|---|---|---|
| | | | Leading | Most Common | Lagging | | | |
| Order-to-Cash | Authorize Credit | Describe the credit application and approval process? | Align up front credit approval processes with customer expectations of a logical straight forward process. Automated credit analysis and initial credit line approval using rules-based decision support systems. Rules database continuously updated using internal and external data and statistical analysis to reflect experience with different types of customers and business units. Separate responsibility of credit from the sales organization. Allow for immediate (instant) approval for credit of customers with good previous history. Automatic increase or decrease to credit line initiated based on information from continuous monitoring of external environment and internal activity (behavior scoring). Customer can self serve a request for increase in credit line. Establish a continuous credit risk management process across the entire customer lifecycle. | | | | | |

Fig. 20A

Diagnostic Category: Order-to-Cash (Billing, A/R, Credit & Collections)
Sub Categories Included: Authorize Credit, Receive & Fulfill Order, Invoice Customer, A/R / Collections, Apply Cash, Organization, Customer Data Warehouse, Exceptions
Qualitative Questions and Leading Practices:

| Diagnostic Category | Sub Category | Interview Question | Leading, Lagging & Most Common Practices | | | Client Response / Client Practice | Client Practice Lead, Com, Lag | Total Score (1-5) |
|---|---|---|---|---|---|---|---|---|
| | | | Leading | Most Common | Lagging | | | |
| | Authorize Credit | How does your credit scoring and approval process incorporate 3rd party information (e.g. credit bureaus, news)? | Credit policy is clearly defined, monitored, communicated, and operationalized to support sales & marketing strategy, corporate vision, and financial goals. System automatically reviews a selected set of accounts (high risk) for out of pattern activity. Bad Debtor file maintained. | Wide acceptance of the value of credit scoring by senior management who, allocate significant R&D budget for development. Use and exchange data with outside credit bureaus and 'negative databases' for credit information, bad debt exchange information, fraud, fraud alerts, etc. Fraud prevented during the credit evaluation process by identifying requests for product/service which are already in customer master file parent or child database. | | | | |

Fig. 20B

Diagnostic Category: Order-to-Cash (Billing, A/R, Credit & Collections)
Sub Categories Included: Authorize Credit, Receive & Fulfill Order, Invoice Customer, A/R / Collections, Apply Cash, Organization, Customer Data Warehouse, Exceptions
Qualitative Questions and Leading Practices:

| Diagnostic Category | Sub Category | Interview Question | Leading, Lagging & Most Common Practices | | | Client Response / Client Practice | Client Practice Lead, Com, Lag | Total Score (1-5) |
|---|---|---|---|---|---|---|---|---|
| | | | Leading | Most Common | Lagging | | | |
| | Authorize Credit | How is the credit approval aligned with the type of sales by the company or the type of a industry of a customer? | Utilize credit scoring using empirically derived scorecards in the evaluation and risk adjudication of a customers credit risk. Use waterfall methodology employing multiple credit bureaus to maximize coverage in credit scoring and updating. Include external alert notification to trigger action based on changes in customer information. Examples include credit bureau payment history, death notifications, bankruptcy notifications. Use of table driven credit decision tree to determine if sales order requires internal or external (or both) credit information. | Link performance of portfolio segments to compensation for Sales/Marketing areas. | Multiple tiers of credit approval supported. For example, basic broadband service is provided to a risky customer, but uncollectible charges are prevented by blocking premium services. | | | |

Fig. 20C

Diagnostic Category: Order-to-Cash (Billing, A/R, Credit & Collections)
Sub Categories Included: Authorize Credit, Receive & Fulfill Order, Invoice Customer, A/R / Collections, Apply Cash, Organization, Customer Data Warehouse, Exceptions
*Qualitative Questions and Leading Practices:*

| Diagnostic Category | Sub Category | Interview Question | Leading, Lagging & Most Common Practices | | | Client Response / Client Practice | Client Practice Lead, Com, Lag | Total Score (1-5) |
|---|---|---|---|---|---|---|---|---|
| | | | Leading | Most Common | Lagging | | | |
| | | | Accounts assigned a risk score to assist in overall handling providing differentiated treatment throughout the customer lifecycle. Risk adjusted pricing or market offerings in appropriate industries allows for market expansion to lesser quality credit. | | | | | |
| | Authorize Credit | How is the credit approval policy aligned with the company's sales strategy? | Optimize and balance risk vs. market share by working closely with sales and marketing to agree on appropriate credit criteria. Optimize financial risk/reward performance by balancing prevention of selling to high-risk customers in existing or new markets with solutions such as deposits, pay in advance and automatic bill payment to reach lower scoring customers. Terms defined and based on business strategy, cost to serve, sustainable customer account profitability framework and performance measures. | | | | | |

Fig. 20D

Diagnostic Category: Order-to-Cash (Billing, A/R, Credit & Collections)
Sub Categories Included: Authorize Credit, Receive & Fulfill Order, Invoice Customer, A/R / Collections, Apply Cash, Organization, Customer Data Warehouse, Exceptions
*Qualitative Questions and Leading Practices:*

| Diagnostic Category | Sub Category | Interview Question | Leading, Lagging & Most Common Practices | | | Client Response / Client Practice | Client Practice Lead, Com. Lag | Total Score (1-5) |
|---|---|---|---|---|---|---|---|---|
| | | | Leading | Most Common | Lagging | | | |
| | | Ensure all program information (e.g. advertising for new promotions) is delivered prior to campaign to front line staff. | | | | | | |

Fig. 20E

| | | |
|---|---|---|
| Authorize Credit | What system tools are utilized in the credit approval process? | Use of a "deal sheet" shared with the customer in the sales process to define promotional or special pricing to document terms, and better communicate with order management. Develop an internal positive and negative database. Quality control maintains a strong linkage with the risk scorecard development and maintenance for continuous improvement. System monitors for concurrent usage of the same access number or credit card in different geographical locations. Automated credit application tracking from beginning through the approval or rejection of a customer. Credit decisioning spans all customer acquisition channels, including points of sale not in direct control, i.e. kiosk sales. Utilize OCR to read written credit applications for order entry/credit adjudication purposes. Online applications available to field are capable of accepting credit applications and reporting status of credit granting process. Order management systems have the ability for quick and reliable price/terms updates. |

Fig. 20F

| | | | |
|---|---|---|---|
| | Authorize Credit | How is credit approval and management aligned with the credit & sales personnel's performance? | Encourage appropriate credit quality in the approval stage by incenting staff based on portfolio profitability versus number of transactions. Link sales performance compensation to net receivables collected. |
| Order-to-Cash | Receive and Fulfill Order | What sales information is communicated to the customer on it's order? | Credit application, sales receipt and other transaction documentation clearly conveys terms of sale, and disclose interest or other fees for late payment. Publish full terms of sale in product catalogs, sales sheets and other communications. Include shipping and return processes as well as payment expectations and late fees. |
| | Receive and Fulfill Order | What technologies are utilized in receiving orders? | Maximize usage of paperless order systems such as EDI, EIPP/EBPP. Provide real-time visibility to pending orders to monitor cycle times and total customer credit exposure. |
| | Receive and Fulfill Order | How current is information on customers and inventory for review when receiving orders? | Provide real-time inventory data to reduce backorders and prevent substitution issues. Participate in, or drive initiatives for automated replenishment to keep inventory levels proper. Order management maintains full and up to date vendor compliance guides. |
| | Receive and Fulfill Order | What processes or tools are in place to allow for accurate and timely fulfillment of orders? | Ensure that there is full visibility of orders in the warehouse to enable accuracy of picking, packaging and shipping. |

Fig. 20G

| | | | |
|---|---|---|---|
| Order-to-Cash | Invoice Customer | How are invoices prepared to allow for easier processing by the customer? | Provide visibility to vendor compliance, vendor preferred transport carriers, and transport carrier requirements.<br>Provide visibility of advanced shipment notices.<br>Review customer purchase order to assure terms of sale, pricing, and other information is accurately reflected, and in agreement with published standards.<br>Return policy clearly visible with an enforced process to minimize complexity.<br>Use drop shipments to speed completion of order whenever possible. |
| | Invoice Customer | What performance measures are used to track invoicing cycle? | Provide clarity of invoices, easy to read, comprehensive and legible for scanning.<br>System ability to issues invoices in multiple languages, and accommodate global requirements.<br>Customer choice for billing and payment due dates, i.e. EDI, e-billing, fax, or self serve options.<br>Assure invoicing meets customer/vendor requirements.<br>Establish cycle time metrics to track process from receipt to invoice issued. |
| Order-to-Cash | AR / Collections | Describe the company's collections strategy and approach | Focus time/best people on the earlier stages of delinquency to prevent late stage delinquency and ultimately bad debt. |

Fig. 20H

Test and Learn: Develop collection strategies that are automated. Use adaptive modeling to test results and modify on a continuous basis.

Fig. 20I

| AR/Collections | How are treatment approaches tailored to the specific needs of your business and maintained over time? | Culture communicated and supported by executive management (walk the talk). Executive management actively supports the collections vision. Call outstanding accounts at an earlier stage and at more regular intervals, use proactive customer service type calls for large invoices, and chronic late payers. Transfer collections activities between stages based on events rather than time. All attempts should try to "cure" the account, rather than focus on process. Collections should be a mix of inbound and outbound calling. Defined collection strategies and action steps, such as initial past due contact at 7 days past due second call at 15 days, etc. Use short term collection campaigns to reach medium and smaller accounts, and test reaction to differing collections strategies. Institute proactive contact, contacting on large invoices or habitual past due accounts before due to assure invoice receipt, no open issues, and in line for payment. | Treatment cycles should be tailored based on: type of customer (personal vs. corporate), risk class and other groupings (for example, industry classification). |
|---|---|---|---|

Fig. 20J

| | | |
|---|---|---|
| AR / Collections | What is the collection approach on past due accounts? | Behavioral scoring systems. Treatment based on a customer's historical (6-18 months) behavior, not based on a "grouping" of customers/accounts. Develop differentiated collection treatments based on risk (credit score) and historical behavior. Treatment cycles tailored based on the type of customer or historical behavior (behavior scoring)– segmentation (e.g. treatment based on risk, type, and size of customer). Treatment cycles for corporate customers tailored based on industry classification. Analysis and fine-tuning of treatment cycles carried out on a regular basis, at a minimum every 6 months. Utilize automated rules-based scoring to identify collections treatment strategy. | Past due exposure prioritized by percent of account versus size of total account. An automated follow-up action is created based on each outcome of a collections contact, i.e., a call is set for the next week on a promise to pay, but cleared if payment received. Outstanding debt pursued by a 'total account' approach rather than by invoice and a total account |

Fig. 20K

| AR / Collections | How are external collection agencies utilized? | Automated collection contact process for initial past due contact, by letter or email, for appropriate segments. Voice mail broadcasting capability implemented to remind customers about overdue balances. Accounts that are in an advanced collections cycle are routed directly to the collections center when the customer picks up the phone or contacts the company for product or service. Automatic write-off of uncollectible accounts up to a certain pre-determined level, if treatment unsuccessful. Automatic reinstatement of services for an account when minimum thresholds for payment or adjustment have been reached. Escalation protocol established within order to cash functions, as well as finance and sales to address collection issues. Bad debt provisioning policy is matched to revenue and charge-off experience. | Recovery operations supported by outsourced specialists where required (e.g. collection agencies, legal, remittance processing, etc.). Use "scoring" in collection agency selection to better identify which agency is most effective on which types of accounts |

Fig. 20L

Permanent feedback loop for collections agents and the collections group to other organizations.
Automatic transfer of accounts to an external debt collection agency or legal service, according to collections policy, (i.e. via an automatic interface from the receivables system to the agency system).

Fig. 20M

| | | |
|---|---|---|
| AR / Collections | How is collection performance measured & improved over time? | Automatic evaluation of collection services/agents performance.<br>Optimize and leverage use of multiple outside agencies for collections for small balances, skip tracing, and fully reserved accounts. Selection criteria includes specialized skills, regional presence, scalability, and performance.<br>Formal collections performance measures linked to departmental & corporate objectives across individuals, teams and groups.<br>Measure and monitor average days to pay or average days late for all customer segments.<br>Team and individual collections effectiveness based on "bottom line" effecting results, i.e. reduction in bad debt expense or increases in collected amounts instead of number of contacts.<br>Credit & Collections balanced scorecard should include methodology to ensure bad debt objectives are offset by non-pay churn objectives.<br>Create and execute a cascading balanced scorecard across the entire order to cash cycle.<br>Conduct external benchmarking and at least an annual basis.<br>Create "dashboard" or "scorecard" metrics for daily and/or weekly review. |

Fig. 20N

| | | |
|---|---|---|
| AR / Collections | Do invoices/statements include information for contacting the company? | Joint collections agent/management improvement teams that formulate continuous improvement plans and tasks. Invoices and statements carry 800# and name for a specific collector to contact for billing issues. High-volume operations list specific 800# to call, with rapid answer and a customer service approach. |
| AR / Collections | How are incoming communications tracked and managed in the collection process? | Utilize ANI (Automatic Number Identification) to capture telephone numbers. A history of contacts with the customer including phone calls and correspondence is maintained for both incoming and outgoing calls. Strive to minimize call transfers and callbacks. Imaging technology makes all information that is presented on the bill available on-line. The representative can see and can re-send, the same image of the bill as the customer has. Multi-lingual support provided for phone contact and correspondence. Transferring a caller to another person, includes transferring the existing state of the customer inquiry/update transaction. Full integration of voice response activities passed to agent for inquiry processing (i.e. single access of customer record required). |

Fig. 200

| | | |
|---|---|---|
| AR/ Collections | What actions are taken to maximize the effectiveness and efficiency of collections personnel | Multiple incoming phone numbers are consolidated into one servicing operation. Actual numbers can drive call handling and priorities. Automated call distribution (ACD) support with robust functionality imbedded in ACD (skill based call routing, load balancing, announcements, messaging/voice mail, and priority inquiry handling accommodated). Utilize ANI to capture potential contact phone numbers for delinquent or written off accounts. Utilization of caller identification and computer telephone integration (CTI) to automatically retrieve customer information files and route calls. Management monitors collection contact calls on a regular basis to asses interaction, approach, and performance. Use of scripting to assist by call type to assure proper steps, actions, and follow through is taken. Utilize a predictive dialer to reduce agent waiting time and use agentless jobs and answering machine detection to leave automated messages about the customers state of delinquency. |

Fig. 20P

Develop multiple channels to reach customer, including direct mail, email, voice mail, and live representatives. Use proactive customer service type contact prior to the due date for large invoices and habitually past due customers. Collection workstation utilized to organize and prioritize the collector's work (e.g. past due receivables queued in priority sequence, on-line access to customers key financial ratios with alerts, etc).

Fig. 20Q

| | | Collection empowered staff with appropriate approval authorities (e.g. Write Off Approval, Concessions, Settlements, Collection Expenses, etc). Boundaries of authority and procedures are well defined. |
|---|---|---|
| AR / Collections | What payment options does the company support? | Customers allowed to go on pre-authorized credit card payment each month or pay "one off" payments via credit card through either the IVR or enable by a representative directly.<br>Use direct debit payments from a customers bank account.<br>IVR enabled to accept PTP's (promise to pays) and update the customers account record. If the PTP is too low or the date promised is too far out, then the call should be transferred to a rep.<br>Provide technology to accept credit cards, electronic checks and other immediate alternative payment streams during the collections contact.<br>System allows for automatic charge of certain types of fees, i.e. reactivation, nsf check, late charge, etc.<br>Capture customer/vendor overpayments for potential match against outstanding accounts payable contra-accounts. |

Fig. 20R

| | | |
|---|---|---|
| | | Early pay incentives provided to customer. This can take the form of early payment discounts or non-monetary incentives such as merchandise discounts or frequent flier miles. Customers are allowed to pay on a quarterly or annual basis and can receive a discount. Provide multiple payment channels, including ABP, EIPP/EBPP, Internet, electronic check, and personal/corporate credit card. |
| AR / Collections | Are there systems/tools that customers can access to address invoicing/payment matters? | Self-service capabilities allow customer to access account information, initiate questions, resolve issues, and access imaged documentation. Provide self-service access through Internet for customers to obtain information on commonly asked OTC questions, terms of sale, account and invoice status. |
| AR / Collections | How is customer and transaction information used to support the collections process? | Automated/integrated imaging of customer documentation to allow visibility to address and resolve issues. Assure all internal data regarding customer is available to perform skip tracing if done internally. Provide a visible audit trail of all customer communications with access to order history and payment habits. |

Fig. 20S

| Process | Sub-process | Question | Notes |
|---|---|---|---|
| Order-to-Cash | Apply Cash | How are cash payments received and processed? | All customer cash receipts received through a consolidated lock box network with outsourced posting and EDI transmission. Service level agreements are established with vendor to ensure timely posting. OCR technology and automated cash application algorithms used to match check payments to invoice. |
| | Apply Cash | Are accounts swepted even when unmatched to invoices? | Allow for systematic removal of small balances (invoice or account level) due to incorrect amount remitted. Maintain edit/audit report to indicate potential abuse or internal issues. |
| | Apply Cash | How are payments applied to the customer account? | Payments, credits, and adjustments applied to customer balances in real-time. Customer short payments / deductions set up as unique new items versus short payment of open invoice. Cash application does not code exception or deduction type - all coded 'unknown' and responsibility passes to exceptions management to apply proper code. Credit card, ABP, and other payment stream receipts, electronically posted to clear A/R. Consider usage of bolt-on automation for cash posting if ERP or legacy system does not meet existing or complex needs. |

Fig. 21A

| | | | |
|---|---|---|---|
| | Apply Cash | Are reviews performed to improve lock box processing? | Automate cash discount earned/unearned process at cash application. |
| | | | Complete periodic lock box studies to assure best geographic distribution and mail times. |
| Order-to-Cash | Organization | Describe the organization structure of the order-to-cash function | Flat organizational structures with high spans of control. |
| | | | Credit & Collections operations management under one group. Credit & Collections operations aligned with other Customer Care organizations. |

Fig. 21B

| | | |
|---|---|---|
| Organization | How is AR/collections personnel aligned with other departmental employees and customers to provide service? | Align Credit & Collections operation around customer needs and segment into well defined groups by risk, attrition and value.<br>Empowered collection work teams supported by specialized work cells (e.g., risk management, skip tracing, in-house collections, etc.)<br>For in-house collection operations, staff should be centralized in a shared services environment.<br>Identify specialty group to manage vendor functions, bankruptcy and asset disposal<br>Develop in-house collections to address bankruptcy, legal, and fraud cases.<br>Centralize credit and collections functions, including exceptions management. | Maintain collector alignment by customer whenever possible, typically B2B, and skills aligned for high-volume customers, such as B2C operations.<br>Use properly experienced staff to address hard to collect accounts as a final step prior to outside collections placement. Treatment would include final escalations, initial skip tracing, final demand.<br>Encourage face to face (or tele/video conference call) interaction between point of sale personnel and Credit Operations personnel |

Fig. 21C

| | | |
|---|---|---|
| Organization | How is the performance of order-to-cash professionals measured, monitored, and rewarded? | Virtual team approach adopted between inquiry and collections where two people are responsible for the same groups of accounts -- one for the query resolution process and one for the controlling credit. |
| | | Career path defined for all Collections staff. |
| | | Incentives staff based upon acquiring or expanding skills (skill based pay). Incentive programs for collection centers. Customer Service/Credit & Collections organization a breeding ground where outstanding performers can become managers of other departments/functions outside of Credit & Collections. Compensation performance-based. Non-monetary incentives employed in maintaining morale and motivation. Select senior Credit & Collections management for their leadership ability and ensure constant visibility. Performance shortfalls promptly addressed through counseling and training. Annual turnover is below the industry norm. Representatives who are monitored are given feedback and evaluation on calls in verbal and written form. |

Fig. 21D

| | | | |
|---|---|---|---|
| | Organization | Is part-time staff utilized in the AR/Collections servicing? | Casual/part time staff utilized (30+%) in high volume front-end operations to deliver phone reminder.<br>Use high percentage (up to 30+%) of staff in part time positions in the inbound calling area. |
| | Organization | What hiring practices are utilized to match responsibilities and careers? | Design new job titles to reflect job roles.<br>Resource forecasting planned thoroughly, using analytics such as capacity management software if appropriate.<br>Flexible hiring practices implemented that seek experienced hires. |
| | Organization | What training is utilized to ensure readiness of staff in performing functions/responsibilities? | Cross-functional training to assure full coverage and a teamwork environment.<br>Heavy up-front and continued investment in extensive training, including classroom and computer based delivery. Ongoing training curriculum spans multiple disciplines (i.e., technical training, corporate strategy/direction, customer economics, product offerings, telephone etiquette, etc). |
| Order-to-Cash | Customer Data Warehouse | What information is accessible or stored in the OTC customer data warehouse? | Ability to generate historical billings/volume information on demand on line (at least 12 months).<br>Develop a customer database to capture all essential customer data, from addresses and terms to payment habits. |

Fig. 21E

Access to all required applications through single workstation with common front-end.
Receive and store credit applications electronically, including critical customer data: SSN, DL# and bank account information.

Fig. 21F

| | | |
|---|---|---|
| Customer Data Warehouse | How integrated in the OTC customer data warehouse? | Collect and store customer demographic information at time of order entry to combine with purchase, usage, payment history and other data. Additional customer identification such as driver license number, social security number, and employer information is captured for consumer driven firms. Full set of inquiry and transactional capabilities available on-line. Automated KPI / Dashboard metrics systems for management reporting. Integrated performance reporting built into application. |
| Customer Data Warehouse | What controls are utilized to standardize customer information? | Consolidated credit management customer database combining internal and external information across time. Customer service representative can use different paths to access customer data. For example: account number, phone, purchase order, or consumer data. Standard customer numbering supporting parent/child relationships between customers to build corporate exposure analysis. |

Fig. 21G

| | | | |
|---|---|---|---|
| Order-to-Cash | Exceptions | Describe the process for dealing with OTC exceptions. | Provide online entry of billing adjustments, credit memos, reversals, and corrections, with appropriate audit/edit capabilities.<br>Set clear policy and enforcement on post audit deductions for documentation and time period accepted.<br>Develop action profile routing for deduction resolution by type.<br>Credit memos should not be netted or offset against A/R without customer acknowledgement in a B2B environment. |
| | Exceptions | How are OTC exceptions reported? | Provide reporting for exceptions to identify item count and dollar exposure for root cause analysis, customer concentrations, trends, and resolution performance.<br>Implement or use third-party deduction management system (DMS) to identify, track, and route exceptions for resolution. |
| | Exceptions | Who or which group has ownership of OTC exceptions? | Establish a separate function for exceptions management and resolution.<br>Exception management function is responsible for determining proper deduction reason code based on documentation or specific actionable knowledge. |

Fig. 21H

Qualitative Metrics / KPIs:

| Diagnostic Category | Sub Category | Metric / KPI | Benchmarking Data | | | Client Value | Score |
|---|---|---|---|---|---|---|---|
| | | | Leading | Average | Lagging | | |
| Order-to-Cash | Authorize Credit | % Bad debt | | | | | |
| | | Average credit approval cycle time | | | | | |
| Order-to-Cash | Fulfill Order | Perfect order (delivery in full on time, error free) | | | | | |
| Order-to-Cash | Invoice Customer | Total Billing Dept Cost as a % of Revenue | | | | | |
| | | Total Billing Dept Cost per Customer Invoice | | | | | |
| | | Invoice Accuracy | | | | | |
| | | % Invoices requiring manual intervention | | | | | |
| Order-to-Cash | AR / Collections | Function Cost per Million of Revenue | | | | | |
| | | Total A/R Cost per Cash Receipt | | | | | |
| | | Total A/R Cost per Invoice | | | | | |
| | | % Debt Overdue | | | | | |
| | | % remittances received electronically | | | | | |

Fig. 21I

Diagnostic Category: Tax Management
Sub Categories Included: Tax Management

*Qualitative Questions and Leading Practices:*

| Diagnostic Category | Sub Category | Interview Question | Leading, Lagging & Most Common Practices | | | Client Response / Client Practice | Client Practice Lead, Com, Lag | Total Score (1-5) |
|---|---|---|---|---|---|---|---|---|
| | | | Leading | Most Common | Lagging | | | |
| Tax Management | Tax Management | Describe the role the tax organization plays in your company and the primary activities it performs. | A significant portion of tax professionals' time is spent on tax strategy with relatively little time spent on on "data translation" and tax compliance. Tax professionals are a key part of the management team whose counsel is sought upfront as new business opportunities are considered. | TBD | Primarily focused on tax compliance and a significant portion of activity relates to translating financial data into a tax-usable format. | | | |
| Tax Management | Tax Management | To what degree are your tax information systems integrated with your ERP or other financial systems? How much manual translation must occur to tax sensitize your data? | Fully integrated tax systems, tax data warehouse, limited manual activity to translate or "tax sensitize" data | TBD | TBD | | | |

Fig. 22A

Quantitative Metrics / KPIs:

| Diagnostic Category | Metric / KPI | Formula (unit of measure) | Benchmarking Data | | | Client Value | Client Value - Lead, Avg, Lag | Score (1-5) |
|---|---|---|---|---|---|---|---|---|
| | | | Leading | Average | Lagging | | | |
| Tax Management | Effective tax rate (vs. competitors) | TBD (%) | TBD | TBD | TBD | | | |
| | % of time spent in tax planning vs. (compliance) | TBD (%) | TBD | TBD | TBD | | | |
| | Interest and penalties paid | TBD (#$) | TBD | TBD | TBD | | | |
| | Audit defense expense | TBD (#$) | TBD | TBD | TBD | | | |

Fig. 22B

Diagnostic Category: Treasury & Risk Management
Sub Categories Included: Treasury Governance, Banking & Cash Management, International Treasury, Risk Management
*Qualitative Questions and Leading Practices:*

| Diagnostic Category | Sub Category | Interview Question | Leading, Lagging & Most Common Practices | | | Client Response/ Client Practice | Client Practice Lead, Com, Lag | Total Score (1-5) |
|---|---|---|---|---|---|---|---|---|
| | | | Leading | Most Common | Lagging | | | |
| Treasury & Risk Management | Treasury Governance | Describe treasury organization structure and governance model (e.g. centralized vs. decentralized, transaction authority, etc.). How effective is it? | A global treasury management model with centralized control, a formal, board approved policy, standard procedures, limited local autonomy, and internal audit review of compliance | Treasury management is decentralized with individual business units and/or geographies having significant autonomy. | TBD | | | |
| | Treasury Governance | How are responsibilities and authorities divided between central treasury and business units and / or regions | Treasury policies are clearly defined and accepted by the board. Detailed treasury policies are defined on a central and local business unit level and are regularly reviewed by the board Treasury activities are centralized through a corporate treasury function Corporate Treasury has extensive control over the cash operations of the business units Roles and responsibilities of treasury practitioners are clearly defined. All treasury practitioners understand their role and responsibilities | | | | | |

Fig. 23A

Diagnostic Category: Treasury & Risk Management
Sub Categories Included: Treasury Governance, Banking & Cash Management, International Treasury, Risk Management
Qualitative Questions and Leading Practices:

| Diagnostic Category | Sub Category | Interview Question | Leading, Lagging & Most Common Practices | | | Client Response/ Client Practice | Client Practice Lead, Com, Lag | Total Score (1-5) |
|---|---|---|---|---|---|---|---|---|
| | | | Leading | Most Common | Lagging | | | |
| | Treasury Governance | To what degree are treasury activities integrated with other parts of the business | Treasury is fully integrated with both finance and the broader business and actively participates on the front end in business decisions impacting treasury activities Treasury is regarded as an important component in strategic business decision making and is consulted before all major business decisions are made Treasury has significant interaction with the planning and budgeting process. Treasury provides cashflow and other financial information to the planning & budgeting team(s) | | | | | |
| | Treasury Governance | How is the performance of the treasury function measured? | Key Performance Indicators (KPIs) are used to track performance of treasury activities. KPIs are reported on a regular basis (e.g. monthly) and proactive steps are taken to address concerns | | | | | |

Fig. 23B

Diagnostic Category: Treasury & Risk Management
Sub Categories Included: Treasury Governance, Banking & Cash Management, International Treasury, Risk Management
*Qualitative Questions and Leading Practices:*

| Diagnostic Category | Sub Category | Interview Question | Leading, Lagging & Most Common Practices | | | Client Response / Client Practice | Client Practice Lead, Com, Lag | Total Score (1-5) |
|---|---|---|---|---|---|---|---|---|
| | | | Leading | Most Common | Lagging | | | |
| | | | External benchmarks regularly used to assess effectiveness of the treasury function and proactive steps taken to address gaps | | | | | |
| Treasury & Risk Management | Banking & Cash Management | Summarize your banking relationships and approach to cash management. Are you satisfied with this situation? | One (or a few) primary global banking banking relationship(s) for all cash management activities, central ownership and management of cash, cash swept daily from global banking partner accounts with total visibility into daily balances | Large number of separate banking relationships exist around the world, local ownership of cash, limited ability to effectively consolidate multiple cash positions and no single, transparent view | TBD | | | |
| | Banking & Cash Management | Describe in detail your banking relationships and approach to cash management. Are you satisfied with this situation? | One (or a few) primary global banking banking relationship(s) for all cash management activities with central ownership and management of cash Cash swept daily from global banking partner accounts with total visibility into daily balances and an optimized cash position Each operating unit has 1 to 2 banking relationships | | | | | |

Fig. 23C

Diagnostic Category: Treasury & Risk Management
Sub Categories Included: Treasury Governance, Banking & Cash Management, International Treasury, Risk Management
*Qualitative Questions and Leading Practices:*

| Diagnostic Category | Sub Category | Interview Question | Leading, Lagging & Most Common Practices | | | Client Response / Client Practice | Client Practice Lead, Com, Lag | Total Score (1-5) |
|---|---|---|---|---|---|---|---|---|
| | | | Leading | Most Common | Lagging | | | |
| | | | Each operating unit has 1 to 4 bank accounts (not including accounts that are required for legal purposes – e.g. accounts for productions) Banking relationships managed centrally. Treasury is responsible for all bank relationship matters (including bank account opening) Treasury manages each bank relationship proactively. Frequent bank meetings are held and there is considerable interaction The performance of each bank is measured using pre-determined and agreed KPI's through a comprehensive and well structured Service Level Agreement Treasury has a formal service management process in place. Service management processes are frequently reviewed | | | | | |

Fig. 23D

Diagnostic Category: Treasury & Risk Management
Sub Categories Included: Treasury Governance, Banking & Cash Management, International Treasury, Risk Management
Qualitative Questions and Leading Practices:

| Diagnostic Category | Sub Category | Interview Question | Leading, Lagging & Most Common Practices | | | Client Response/ Client Practice | Client Practice Lead, Com, Lag | Total Score (1-5) |
|---|---|---|---|---|---|---|---|---|
| | | | Leading | Most Common | Lagging | | | |
| | Banking & Cash Management | Describe your cash forecasting process, time horizon, accuracy, etc. | The current banking infrastructure is not based on historical needs. Proactive steps have been taken to identify the preferred banking relationship by region | Accurate and continuous cash forecasting, fully integrated with other forecasting activities, with "what-if" analysis capability. System produced cash flow statement eliminates manual involvement and provides more timely cash flow information | | | | |

Fig. 23E

- Cash flow is forecast on an on-going basis. Treasury is able to quickly assess the amount of cash available/required
- Horizon for CFF is at least one year. Allows treasury to anticipate significant surpluses/shortfalls
- The treasury organization is able to generate timely cash flow forecasts incorporating cash flows from all Bus
- Cash flow forecast covers all cash flows including for example procurement, sales, payroll etc.
- Historical cash inflows and outflows are considered for CFF. Cyclical and seasonal cash flows are incorporated
- Direct method of cash forecasting (the weekly cash flow statement) can be reconciled to the indirect method (working capital)
- Average variances between cash projections and actuals exist but are not significant
- Forecasts are kept simple; minimize the number of line items forecasted. Allow for forecasting flexibility to handle BU specific line items

Fig. 23F

| | | |
|---|---|---|
| | | Forecasting accuracy is measured (actual vs. forecast) to gauge accuracy and areas for improvement Coordination of forecasts is centralized and group wide cash flows are consolidated, allowing treasury to decrease cost of debt and increase returns |
| Banking & Cash Management | How is scenario planning utilized in planning and forecasting? | Scenario analysis used to test sensitivity of analysis for cash flow planning and forecasting (e.g. interest rates, A/R write offs, payroll costs) |
| Banking & Cash Management | For what purposes are cash flow forecasts used? | CFF is used to identify areas for operational improvement (e.g. A/R management) and to aid in strategic decision making (e.g structured debt utilization) |
| Banking & Cash Management | To what extent are your treasury systems integrated with other financial systems? | Treasury systems fully integrated with forecasting, AP, AR, project management, etc. |
| Banking & Cash Management | Describe the process for obtaining bank statements and reconciling bank accounts | Bank statements are obtained electronically Bank account reconciliations are automated using electronic bank files. Algorithms used to clear open items automatically. Exception reporting is used Bank statements are reconciled on a daily basis |

Fig. 23G

| | | Real-time updates made to GL |
|---|---|---|
| Banking & Cash Management | Describe the process for calculating cash position and using cash position information | Cash position is vital to treasury operations – information is used to define funding, investment decisions<br>Treasury has visibility of all cash balances of all operating units<br>Cash position is available online from all business units<br>System applications used to help build the cash position<br>Cash position is generated on a daily basis<br>Minimal idle balances exist; cash is effectively managed and invested across the organization<br>Treasury takes ownership for managing the intercompany loan book. Intercompany transactions are calculated and executed on virtual treasury accounts<br>Cash surpluses are pooled (ZBA or Notional)<br>In-house bank used to facilitate optimised cash management. Virtual bank accounts/In-house banks significantly reduces transaction costs<br>Cash position is managed by value date |

Fig. 23H

| Treasury & Risk Management | International Treasury | What types of international treasury issues does your company face? | NA | NA | NA |
|---|---|---|---|---|---|
| | International Treasury | What strategies are implemented to manage global treasury issues and mitigate risks? | Coordinated, comprehensive, company-wide risk management strategy with active Treasury involvement at a strategic level<br>A global foreign exchange management model with centralized control, formal policies, and limited local autonomy to make transactions<br>Effective currency hedging program resulting in immaterial foreign exchange gains/losses – both transaction and translation related<br>Consistent netting is used to reduce the amount of FX trades and consolidate the remainder into large trade with better rates | | |

Fig. 23I

| Treasury & Risk Management | | | | |
|---|---|---|---|---|
| Risk Management | How is risk measured and managed? What specific types of risk are managed? By whom? | Risk is measured and managed as part of an overall "risk portfolio" in the context of business strategy. All relevant risks are addressed including both financial (e.g. FX risk) and operational risks (e.g..) | Risk is perceived as individual hazards, primarily financial in nature. Risk management is mainly focused on identification and assessment. Responsibility for risk management is spread throughout the organization w/out formal coordination. | Neither financial nor non-financial risk is effectively measured. Haphazard quantification and measurement. |
| Risk Management | Do you use advanced business-simulation techniques to help you manage enterprise risk? How often and/or how much do you rely on them | Fully integrated, real-time, risk management tools (e.g. MTM, FX risk, Gap, VaR, Scenario analysis). Wide array of financial hedging instruments used to reduce risk (e.g. options, swaps, caps, floors) | Risk management systems are partially integrated with other systems for data gathering | Risk management is manually based and spreadsheet reliant |
| Risk Management | Describe any major "surprises" in the last two years which had a material negative impact on the financial statements | TBD | TBD | TBD |

| Diagnostic Category | Metric/KPI | Formula (unit of measure) | Benchmarking Data | | | Client Value | Lead, Avg, Lag | Score (1-5) |
|---|---|---|---|---|---|---|---|---|
| | | | Leading | Average | Lagging | | | |
| Treasury & Risk Management | Level of "un-invested cash" | TBD ($#) | | | | | | |
| | Average short-term investment yield | TBD (%) | | | | | | |
| | Cash forecast accuracy | TBD (%) | | | | | | |

Fig. 23J

| Diagnostic Category | Metric/KPI | Formula (unit of measure) | Benchmarking Data | | | Client Value | Lead, Avg, Lag | Score (1-5) |
|---|---|---|---|---|---|---|---|---|
| | | | Leading | Average | Lagging | | | |
| | Average overall investment yield | TBD (%) | | | | | | |
| | Bank fees as a % of revenue | TBD (%) | | | | | | |
| | Average size of FX transactions | TBD (#$) | | | | | | |
| | FX transaction cost as a % of gross transaction value | TBD (%) | | | | | | |
| | FX transaction cost as a % of revenue | TBD (%) | | | | | | |
| | Level of short-term debt outstanding | TBD (#$) | | | | | | |
| | % FX exposure un-hedged | TBD (%) | | | | | | |
| | Net FX gains/losses | TBD (#$) | | | | | | |
| | Debt rating(s) | NA | | | | | | |
| | Average cost of debt capital | TBD (%) | | | | | | |
| | Days operating expense held in cash | TBD (#) | | | | | | |

Fig. 23K

Summary Finance Diagnostic

Qualitative Questions and Leading Practices:

| Diagnostic Category | Sub Category | Interview Question | Comparison to Leading, Lagging & Most Common Practices/ Organizations | | | Client Response/ Practice | Client Practice – Lead, Com, Lag | Total Score (1-5) |
|---|---|---|---|---|---|---|---|---|
| | | | Leading | Most Common | Lagging | | | |
| 0. Context | Context | Describe your company's strategy and business model (business model is the company's core logic for making money) | NA | NA | NA | [Insert client answer here] | NA | NA |
| | Context | Describe how your company is organized – e.g. business units, degree of centralization/ decentralization, etc. | NA | NA | NA | [Insert client answer here] | NA | NA |
| | Context | What are the key challenges your company faces (internal or external)? | NA | NA | NA | [Insert client answer here] | NA | NA |
| 1. Finance Management | Role of Finance | Describe the role Finance plays in your company and the primary activities Finance performs. What are the strengths and weaknesses of Finance. How does this contribute to your company's ability to perform at a high level? | Finance is a key part of the management team whose counsel is sought on a wide range of issues. A significant portion of Finance time is spent on (and finance excels at) high value activities including forward looking analysis, tax strategy, corporate risk management, capital planning & allocation, pricing analysis, strategic planning, etc. | Finance has gained a seat at the executive decision table, but still struggles to devote adequate time to high value added activities because of the amount of effort consumed by traditional transaction processing and accounting & reporting activities. | Finance is primarily focused on transaction processing and traditional accounting & reporting. Finance personnel are rarely involved in decision making unless "debits and credits" are involved | [Insert client answer here] | Leading | 4 |

Fig. 24A

Qualitative Questions and Leading Practices:

| Diagnostic Category | Sub Category | Interview Question | Comparison to Leading, Lagging & Most Common Practices/ Organizations | | | Client Response/ Practice | Client Practice - Lead, Com, Lag | Total Score (1-5) |
|---|---|---|---|---|---|---|---|---|
| | | | Leading | Most Common | Lagging | | | |
| | Perception of Internal Customers | Have you recently measured the satisfaction of Finance's key internal customers? How satisfied are they? | Satisfaction of internal customers is periodically measured, satisfaction levels are high and/or improving, and action plans are in place to address legitimate concerns | Satisfaction of internal customers is not formally measured. Informal discussions suggest satisfaction is mixed. | Satisfaction of internal customers is not formally measured. Informal discussions suggest satisfaction is low. | [insert client answer here] | | |
| Org. Structure | | How is your finance organization structured? Why you are organized that way? | Leading companies will have started with the company's strategic objectives in mind, identified how finance must contribute, and then designed a structure around this. The result will likely include a) segregation of duties between transaction processing, accounting & reporting, and decision support, b) a well defined relationship between corporate and business unit finance, and c) uses of centers of skill and scale. See also F&PM PoV documents discussing Finance Organization Structure | More commonly, multiple organization design decisions will have been made independently over time and result in an organization structure which meets the basic needs of the business. Will likely have a "strained" relationship between business units and corporate, modest segregation of duties and limited use of centers of skill and scale. | Little or no thought has been given to organization structure – instead organization is a result of a series of decisions compounded over time without a long term plan. Little segregation of responsibilities, little or no use of centers of skill or scale. | [insert client answer here] | | |

Fig. 24B

Qualitative Questions and Leading Practices:

| Diagnostic Category | Sub Category | Interview Question | Comparison to Leading, Lagging & Most Common Practices/ Organizations: | | | Client Response/ Practice | Client Practice – Lead, Com, Lag | Total Score (1-5) |
|---|---|---|---|---|---|---|---|---|
| | | | Leading | Most Common | Lagging | | | |
| | Org. Structure | Do you use shared services or outsourcing? If so, for what processes? | True shared services and/or outsourcing used for all transaction processing activities as well as all standard repetitive accounting, closing and reporting activities | Uses shared services for "obvious" processes such as payroll and accounts payable. Service centers may not be in low cost locations | Little or no use of shared services or outsourcing. Instead, multiple redundant organizations are likely to exist. | [Insert client answer here] | | |
| | Continuous Improvement | What are the major finance improvement initiatives that are in progress or that you plan to work on in the next 2 years? Why? What is it about the current environment that you're seeking to improve? What benefits do you hope to gain? | Finance improvement initiatives are part of an overall finance change program, targeted at improving those high value capabilities deemed to be most critical to meeting internal customer needs. Initiatives have owners, project plans, timelines, deliverables, etc. | | Few formal structured initiatives are underway or planned. No overall program plan exists. Efforts are largely one-off efforts to solve a specific tactical problem. | [Insert client answer here] | | |
| | Skills Development | How would you rate the skills of your finance staff – both in terms of traditional accounting & reporting, as well as in terms of performance management and other value added areas? What are the primary gaps? | Finance is strong in both CPA skills (traditional accounting and control) and MBA skills (financial and business acumen) | Strong CPA type skills but inconsistent financial and business acumen | Weak or inconsistent skills across majority of skill areas | [Insert client answer here] | | |

Fig. 24C

Qualitative Questions and Leading Practices:

| Diagnostic Category | Sub Category | Interview Question | Comparison to Leading, Lagging & Most Common Practices/Organizations | | | Client Response/ Practice | Client Practice – Lead, Com, Lag | Total Score (1-5) |
| --- | --- | --- | --- | --- | --- | --- | --- | --- |
| | | | Leading | Most Common | Lagging | | | |
| 2. Shareholder Value Targeting | Shareholder Value Analysis | What are the areas your company considers particularly important for driving shareholder value? | Executives have clear and consistent understanding of what drives value for their company. This perspective is consistent with SVA principles | Inconsistent understanding of what drives value. Drivers only loosely tied to shareholder value concepts | No significant SVA focus – earnings and/ or EPS are the key measures | | | |
| | Shareholder Value Analysis | Does a formal enterprise valuation model exist? If so, how is this used? | A formal enterprise valuation model (the type used by sell-side equity analysts) is maintained and updated frequently. All finance executives are familiar with this model and the primary drivers of shareholder value. These concepts are incorporated into long-term/strategic planning | A valuation model is maintained and used by a small number of people but is not widely disseminated, understood, or incorporated into planning exercises | No valuation model maintained/ incorporated into planning exercises | | | |
| | Strategic Planning | Describe the objectives and outputs of your long-term/strategic planning process | Long term planning is focused on the financial performance necessary to achieve shareholder value objectives and options for achieving this performance. It is both financial and operational. This is not simply a "long-term forecasting" exercise. | | Simply a long-term forecasting exercise assuming modest changes in basic assumptions (e.g. revenue grows 5% and margins stay constant for 5 years) | | | |

Fig. 24D

| Qualitative Questions and Leading Practices: | | | Comparison to Leading, Lagging & Most-Common Practices/ Organizations | | | Client Response/ Practice | Client Practice - Lead, Com, Lag | Total Score (1-5) |
|---|---|---|---|---|---|---|---|---|
| Diagnostic Category | Sub Category | Interview Question | Leading | Most Common | Lagging | | | |
| | Target Setting | How are financial targets set – do you use expectations of growth in your company's market/shareholder value as a starting point to set targets for key financial results measures? | Targets are driven by the financial performance necessary to meet shareholder value objectives, not "what we think we can do" under a business as usual scenario or "last year + 10%". Targets are cascaded down to individual business units/geographies and tied to capital allocation (i.e. each unit must earn an appropriate return on capital allocated to it) | | | | | |
| | Incentive Compensation | How is incentive compensation tied to achieving financial targets? | | | | | | |
| 3. Business Intelligence | NA – Content not yet developed | | | | | | | |
| 4. Budgeting & Forecasting | Budgeting & Forecasting Process | Summarize your planning, budgeting & forecasting process | Driver-based rolling 4-6 quarter forecast in lieu of traditional annual budget | | | | | |

Fig. 24E

Qualitative Questions and Leading Practices:

| Diagnostic Category | Sub Category | Interview Question | Comparison to Leading, Lagging & Most Common Practices/ Organizations | | | Client Response/ Practice | Client Practice – Lead, Com, Lag | Total Score (1-5) |
|---|---|---|---|---|---|---|---|---|
| | | | Leading | Most Common | Lagging | | | |
| | Budgeting & Forecasting Process | Does management have confidence in the accuracy and reliability of your forecasts and budgets? Why or why not? | Forecasting has been separated from the target setting process and therefore there is no incentive to "pad" the forecasts. Executives have high degree of confidence in forecasts and forecast-to-actual variances are generally low (at least for forecast horizons of 2-3 quarters) | Significant "gamesmanship" exists in the forecasting process. Executives solicit multiple forecasts from different sources to triangulate on the real answer. | Limited forecast accuracy exists and executives rarely rely on formal forecasts to make key decisions | | | |
| | Budgeting & Forecasting System Architecture | What technology architecture do you use for planning, budgeting, and forecasting activities? | Single, best of breed budgeting & forecasting application used consistently throughout the organization (corp. and business units) and integrated with other relevant financial applications (ERP, reporting tools, etc.) | A best of breed solution is used at corporate to "roll-up" the numbers, but BU participants use Excel for all of their modeling and calculations and then input the numbers into the corporate model. May or not be fully integrated with ERP, reporting tools, etc. | Large Excel model maintained by corporate with templates submitted and manually uploaded into the model | | | |
| Metric – Budget Cycle Time | Length of annual budget cycle (# of weeks) | | Rolling forecast performed every quarter consuming no more than a few weeks (part-time) | | Multi-month annual budget process where most other effort stops for budget participants | | | |
| Metric – Budget Cost | Budgeting/forecasting FTEs/$B (#) | | | | | | | |
| Metric – Budget Cost | Number of man-days consumed by the annual budget (#) | | | | | | | |

Fig. 24F

Qualitative Questions and Leading Practices:

| Diagnostic Category | Sub Category | Interview Question | Comparison to Leading, Lagging & Most Common Practices/ Organizations | | | Client Response/ Practice | Client Practice— Lead, Com, Lag | Total Score (1-5) |
|---|---|---|---|---|---|---|---|---|
| | | | Leading | Most Common | Lagging | | | |
| 5. Financial & Business Analysis | Analysis | Describe the types of financial and business performed analysis. Is primarily historical or is much of it forward looking? Is it focused on value drivers? | Significant portion of analysis is forward-looking analysis used to make business decisions (e.g. related to pricing, new products, geographical expansion, etc.). Tight linkage to key shareholder value drivers. | Majority of analysis is traditional, historical analysis – budget to actual, rations, etc. Only a modest amount of forward looking analysis is performed. Only a loose connection to shareholder value drivers. | | | | |
| | Performance Reporting | To what extent are dashboards/scorecards utilized in conjunction with planning and analysis? What information is included in the dashboard? | Customized dashboards are available for all key executives and delivered directly via the financial systems. Reporting content focuses on the critical few financial and non-financial metrics/ value drivers which are aligned with overall business objectives | Limited use of dashboards, typically created manually. Performance measures are many in number and financially focused | No scorecard exists – reporting consists of basic financial statements | | | |

Fig. 24G

Qualitative Questions and Leading Practices:

| Diagnostic Category | Sub Category | Interview Question | Comparison to Leading, Lagging & Most Common Practices/ Organizations ||| Client Response/ Practice | Client Practice – Lead, Com, Lag | Total Score (1-5) |
|---|---|---|---|---|---|---|---|---|
| | | | Leading | Most Common | Lagging | | | |
| | System Architecture | Describe the technology used within the management reporting and analysis departments (e.g. integrated performance management software? Excel?). Is technology an enabler or a hindrance? | Single, best of breed reporting and analysis application used consistently throughout the organization (corp. and business units) and integrated with other relevant financial applications (ERP, reporting tools, etc.). Directly accesses both financial and operational data with drill-down capability. On-line, dashboard style presentation of key data. | | Multiple, non-integrated databases, data keyed into Excel for analysis, reports prepared in Excel | | | |
| 6. Investor Relations | Investor Relations | Describe your relationship with the investor community? What improvements could be made? | | | | | | |
| | Investor Relations | Describe the nature and frequency of formal communication with investors | | | | | | |
| | Investor Relations | Describe the content of external communications – what is presented beyond the basic requirements? | | | | | | |

Fig. 24H

Qualitative Questions and Leading Practices:

| Diagnostic Category | SubCategory | Interview Question | Comparison to Leading, Lagging & Most Common Practices/Organizations | | | | |
|---|---|---|---|---|---|---|---|
| | | | Leading | Most Common | Lagging | Client Response/ Practice | Client Practice– Lead, Com, Lag | Total Score (1-5) |
| 7. Capital Stewardship/ CAPEX Management | Management of Intangibles | How important are intangible assets to your company's long-term shareholder wealth creation? What is the relative mix/weight attached to intangible and tangible assets? (i.e. do you rely exclusively on tangible assets? intangibles? is it roughly 50/50?) | Distinction between intangible assets and tangible ones in well understood. Key intangible assets have been identified and their impact on shareholder value is known. Effective management of both tangible and intangible assets. | Focus is on P&L and Balance Sheet management | Focus is on P&L and tangible asset management | | | |
| | Management of Intangibles | Does your company measure the performance of its intangible assets and/or intellectual capital? If so, is that measurement integrated with the tools the company uses to measure traditional financial performance? (how robust is your system? are your measures robust or more qualitative and informal?) | The value of intangible assets and their contribution to shareholder value is formally measured. This effort is integrated with the overall performance management process | | | | | |
| | Capital Allocation/ Capital Investment Management | Is there a formal capital allocation process in place? How is capital allocated between business units, etc.? | Formal, structured capital allocation process that is aligned to strategy and performance management cycle – e.g. changes in capital spending budget impact operating income targets | Some integration between strategy, capital allocation systems, and performance management. Capex not given the same weight as P&L. Spend on sustaining/ maintenance capital perceived as entitled | Capital allocation process is informal, ad-hoc, and separate from strategy and performance management processes. Last year's capital budget perceived as entitled | | | |

Fig. 24I

Qualitative Questions and Leading Practices:

| Diagnostic Category | Sub Category | Interview Question | Comparison to Leading, Lagging & Most Common Practices/ Organizations | | | Client Response/ Practice | Client Practice – Lead, Com, Lag | Total Score (1-5) |
| --- | --- | --- | --- | --- | --- | --- | --- | --- |
| | | | Leading | Most Common | Lagging | | | |
| | Capital Allocation/ Capital Investment Management | Do you formally measure returns from capital investments? Are you satisfied with these returns? If not, what are you doing to improve? | Returns on capital investments are formally measured and tracked in a manner that is consistent across the company and across different investments | | | | | |
| | Capital Project Management | Describe your process for managing major capital projects | Structured, consistent approach is used to track capital project spending, percentage of completion, and value achieved throughout the life of the project. The systems used for these efforts are integrated with other financial systems | | | | | |
| 8. Working Capital Management | Working Capital Management | How important is managing working capital (relative to, say the importance of managing P&L)? How closely is working capital monitored? | | | | | | |
| | Working Capital Management | How is working capital monitored? | | | | | | |
| | Working Capital Management | Who within the company is responsible for working capital management – One person/group? Multiple groups? Centralized? De-centralized? Etc. | | | | | | |
| | Working Capital Management | What methods are currently being employed to improve working capital | | | | | | |

Fig. 24J

Qualitative Questions and Leading Practices:

| Diagnostic Category | Sub Category | Interview Question | Comparison to Leading, Lagging & Most Common Practices/ Organizations ||| Client Response/ Practice | Client Practice – Lead, Com, Lag | Total Score (1-5) |
| --- | --- | --- | --- | --- | --- | --- | --- | --- |
| | | | Leading | Most Common | Lagging | | | |
| 9. Accounting & Reporting | Record Transaction | Describe your chart(s) of accounts – # of COAs, number of accounts, structure, etc. | Single chart of accounts, used consistently across all business units, legal entities, etc. Fewer than ___ GL accounts. Central maintenance of COA | | | | | |
| | Closing & Consolidation | Describe the closing process (frequency, automated vs. manual, time/resource requirements, who is responsible, etc.) | Heavily automated process taking no more than 3-5 days | | | | | |
| | Closing & Consolidation | Why does the closing process take as long as it does? What are the primary drivers of delays? | No material delays due to bad source data, manual effort/ lack of automation, multiple layers of roll-ups, multiple charts of accounts, etc. | | | | | |
| | Financial Systems | Describe your financial systems architecture (ERP, legacy systems, etc.) | Single ERP system used worldwide, essentially no legacy systems, best of breed extensions consistently used (e.g. data warehouse, planning/ forecasting, etc.) with spreadsheets as "supplements", web connections to customers, suppliers, and other functions, automated work flow | Single ERP system, but with exceptions – some legacy systems not yet decommissioned, best of breed extensions spreadsheets still tool of choice, web connections to other functions, automated work flow inconsistently – deployed | Multiple ERP and legacy systems, large number of system interfaces, spreadsheets and/or various stand alone applications dominate planning, forecasting, data analysis, and reporting activities, no web enablement | | | |
| 10. Internal Control | Internal Control | Describe the control environment within the company. How high of a priority is internal control? | | | | | | |

Fig. 24K

Qualitative Questions and Leading Practices:

| Diagnostic Category | Sub Category | Interview Question | Comparison to Leading, Lagging & Most Common Practices/ Organizations | | | Client Response/ Practice | Client Practice – Lead, Com, Lag | Total Score (1-5) |
|---|---|---|---|---|---|---|---|---|
| | | | Leading | Most Common | Lagging | | | |
| | Internal Control | Describe your progress in complying with Sarbanes-Oxley requirements. Are you prepared to comply with all new regulations including Rule 404? | | | | | | |
| | Internal Audit | Do you have an internal audit department? If so, what role does it play in the company? To whom does it report? | Internal audit reports directly to the audit committee of the board, not to the CFO or Controller. Role includes both traditional audit functions such as . . . as well as . . . | | | | | |
| 11. Purchasing | NA – No purchasing summary questions – see category detail questions | | | | | | | |
| 12. Accounts Payable | AP – Organization | Describe the A/P organization structure. Is it a shared services organization or are there multiple A/P groups? Is any of A/P outsourced? | Single A/P organization utilizing a shared service model or outsourced. In a low cost location. | | | | | |
| | A/P – Process | Is A/P part of an end-to-end purchase-to-pay process, or is it separate from purchasing? Where do the majority of A/P issues originate? | Accounts payable is part of an end to end purchase-to-pay process with front end transactional processes designed to minimize own stream error correction | | | | | |

Fig. 24L

| Qualitative Questions and Leading Practices: | | | Comparison to Leading, Lagging & Most Common-Practices/ Organizations | | | Client Response/ Practice | Client Practice – Lead, Com, Lag | Total Score (1-5) |
|---|---|---|---|---|---|---|---|---|
| Diagnostic Category | Sub-Category | Interview Question | Leading | Most Common | Lagging | | | |
| | A/P – Technology | Describe the technology environment within A/P. For example, are imaging, EDI, and EFT used. If so, how extensively? | | | | | | |
| 13. Payroll | Payroll | Describe the payroll organization structure. Is it a shared services organization or are there multiple payroll groups? Is it outsourced? | Shared services organization or outsourced | | | | | |

Fig. 24M

| | | | |
|---|---|---|---|
| 14. Order-to-Cash | NA – No order-to-cash summary questions – see category detail questions | | |
| 15. Tax Management | Tax Management | Describe the role the tax organization plays in your company and the primary activities it performs. | A significant portion of tax professionals' time is spent on tax strategy with relatively little time spent on "data translation" and tax compliance. Tax professionals are a key part of the management team whose counsel is sought upfront as new business opportunities are considered. | Primarily focused on tax compliance and a significant portion of activity relates to translating financial data into a tax-usable format. |
| | Tax Management | To what degree are your tax information systems integrated with your ERP or other financial systems? How much manual translation must occur to tax sensitize your data? | Fully integrated tax systems, tax data warehouse, limited manual activity to translate or "tax sensitize" data | |
| 16. Treasury/Risk Management | Treasury Governance | Describe treasury organization structure and governance model (e.g. centralized vs. decentralized, transaction authority, etc.). How effective is it? | A global treasury management model with centralized control, a formal, board approved policy, standard procedures, limited local autonomy, and internal audit review of compliance | Treasury management is decentralized with individual business units and/or geographies having significant autonomy. |

Fig. 24N

| Diagnostic Category | Question | Leading | Average | Lagging |
|---|---|---|---|---|
| Banking & Cash Management | Summarize your banking relationships and approach to cash management. Are you satisfied with this situation? | One (or a few) primary global banking relationship(s) for all cash management activities, central ownership and management of cash, cash swept daily from global banking partner accounts with total visibility into daily balances | | Large number of separate banking relationships exist around the world, local ownership of cash, limited ability to effectively consolidate multiple cash positions and no single, transparent view |
| International Treasury | What types of international treasury issues does your company face? | NA | NA | NA |
| Risk Management | How is risk measured and managed? What specific types of risk are managed? By whom? | Risk is measured and managed as part of an overall "risk portfolio" in the context of business strategy. All relevant risks are addressed including both financial (e.g. FX risk) and operational risks (e.g.). | | Risk is perceived as individual hazards, primarily financial in nature. Risk management is mainly focused on identification and assessment. Responsibility for risk management is spread throughout the organization w/out formal coordination. |
| Risk Management | Describe any major "surprises" in the last two years which had a material negative impact on the financial statements | | | Neither financial nor non-financial risk is effectively measured. Haphazard quantification and measurement. |

Quantitative Metrics KPIs:

| Diagnostic Category | Metric/KPI | Formula (unit of measure) | Benchmarking Data | | | Client Value | Score (1-5) |
|---|---|---|---|---|---|---|---|
| | | | Leading | Average | Lagging | | |
| 1. Finance Management | Cost of finance – FTE/$B (#) | Finance FTEs/$B of revenue (#) | 63 | 107 | | [Insert client value here] | 3 |
| | Cost of finance – E/R (%) | Total finance cost as % of revenue (%) | 0.76% | 1.07% | | | Avg |

Fig. 240

Quantitative Metrics KPIs:

| Diagnostic Category | Metric/KPI | Formula (unit of measure) | Benchmarking Data | | | Client Value | Client Value – Lead, Avg, Lag | Score (1-5) |
|---|---|---|---|---|---|---|---|---|
| | | | Leading | Average | Lagging | | | |
| 2. Shareholder Value Targeting | Spread: ROIC – WACC (%) | ROIC – WACC (%) | Positive | Zero | Negative | | | |
| | % of market cap attributable to future value (%) | Percent of market cap attributable to future value (%) | NA | NA | NA | | | |
| | 3 year total return to shareholders (%) | 3 year total return to shareholders (%) | Above peer group | Consistent with peer group | Below peer group | | | |
| 3. Business Intelligence | NA – Content not yet developed | | | | | | | |
| 4. Budgeting & Forecasting | Budget cycle time (#) | Length of annual budget cycle in weeks (#) | | | | | | |
| | Work-days consumed by the annual budget (#) | Total number of work-days consumed by the annual budget – finance and non-finance (#) | | | | | | |
| 5. Financial & Business Analysis | NA – No summary metrics | | | | | | | |
| 6. Investor Relations | Earnings Release Cycle Time | Days to quarterly earnings release (#) | | | | | | |
| 7. CAPEX Management | WACC vs. Competitors in Industry | (%) | | | | | | |
| | Percent of market value attributable to intangibles | (%) | | | | | | |
| | Return on invested capital | (%) | | | | | | |
| 8. Working Capital Management | Working Capital as % of Sales | (#) | | | | | | |
| | Days Sales Outstanding (DSO) | (#) | | | | | | |
| | Days Payables Outstanding | (#) | | | | | | |

Fig. 24P

Quantitative Metrics KPIs:

| Diagnostic Category | Metric/KPI | Formula (unit of measure) | Benchmarking Data | | | Client Value | Client Value – Lead, Avg, Lag | Score (1-5) |
|---|---|---|---|---|---|---|---|---|
| | | | Leading | Average | Lagging | | | |
| | Inventory Turns | (#) | | | | | | |
| 9. Accounting & Reporting | Number of financial systems | Simple count (#) | | | | | | |
| | # of charts of accounts (#) | Simple count (#) | | | | | | |
| | # of manual journal entries per month (#) | Simple count (#) | | | | | | |
| | Days to close the books (#) | Include all days, pre and post qtr end (#) | | | | | | |
| | Days to quarterly earnings release (#) | Simple count (#) | | | | | | |
| | Days to financial statement filings (10Q & 10k) | Simple count (#) | | | | | | |
| 10. Internal Control | Number of annual audit adjustments | Simple count (#) | 0 | | | | | |
| 11. Purchasing | NA – No summary metrics | | | | | | | |
| 12. Accounts Payable | Invoices processed per A/P employee (#) | Total invoices processed/A/P FTEs (#) | | | | | | |
| | Days payable outstanding | (#) | | | | | | |
| | % of vendor discounts captured | Vendor discount $ captured/vendor discount $ available (%) | | | | | | |
| 13. Payroll | Payroll cost/ employee | Total cost of payroll function/paid employees ($#) | | | | | | |
| | % of paychecks direct deposited | Paychecks direct deposited/total paychecks (%) | | | | | | |
| 14. Order-to-Cash | Days sales outstanding | | | | | | | |
| | # of billing systems | | | | | | | |
| 15. Tax Management | Effective tax rate (vs. competitors) | (%) | | | | | | |

Fig. 24Q

*Quantitative Metrics KPIs:*

| Diagnostic Category | Metric/KPI | Formula (unit of measure) | Benchmarking Data | | | Client Value | Client Value – Lead, Avg, Lag | Score (1-5) |
|---|---|---|---|---|---|---|---|---|
| | | | Leading | Average | Lagging | | | |
| 16. Treasury & Risk Management | % of time spent in tax planning vs. (compliance) | (%) | | | | | | |
| | NA – No summary metrics | | | | | | | |

Question: What technology architecture do you use for planning, budgeting, and forecasting activities?

In Scope? ● Y ○ N

Score: -Select- ▼    Weight: -Select- ▼    Status: Not Started ▼

Answer:

| Leading Practice | Most Common Practice | Lagging Practice | Client's Practice Type: |
|---|---|---|---|
| Single, best of breed budgeting & forecasting application used consistently throughout the organization (corp. and business/organization units) and integrated with other relevant financial applications (ERP, reporting tools, etc.) | A best of breed solution is used at corporate to "roll-up" the numbers, but BU participants use Excel for all of their modeling and calculations and then input the numbers into the corporate model. May or may not be fully integrated with ERP, reporting tools, etc. | Large Excel model maintained by corporate with templates submitted and manually uploaded into the model | -Select- ▼ |

Areas for Improvement / Comments:

Fig. 25B

KPI: Forecast Accuracy

Formula Definition: Variance to actual as a % budget / fcst

In Scope? ●Y ○N        Score: -Select- ▼   Weight: -Select- ▼ ~130   Status: Not Started ▼

Client Value:         Unit of Measure: percent ~128

| Leading Value | Most Common Practice | Lagging Practice | Client's Value Type: |
|---|---|---|---|
| Data Not Available | Data Not Available | Data Not Available | -Select- ▼ ~126 |

~132

Areas for Improvement / Comments:

Below is a list of reports organized by category. Click the appropriate link to execute the desired report.

Core Data
Interview Questions - Download. Complete list of interview questions.
Summary Level Interview Questions - Download. List of only the summary level interview questions.
Leading Practices - Download. Complete list of leading practices.
Summary Level Leading Practices - Download. List of only the summary level leading practices.
Interview Questions and Leading Practices - Download. Complete list of leading, common, and lagging practices mapped to interview questions.
Summary Level Questions and Leading Practices - Download. List of only the summary level leading, common, and lagging practices mapped to interview questions.
KPIs - Download. Complete list of KPIs.
Summary Level KPIs - Download. List of only the summary level KPIs.
KPIs w/ Benchmarking Data - Download. Complete list of KPIs with benchmarking data where available.
Summary Level KPIs w/ Benchmarking Data - Download. List of only the summary level KPIs with benchmarking data where available.
# of Questions, Leading Practices and KPIs - Read Only. Table listing the # of questions, leading practices, and KPIs for each category and subcategory.

Project Specific Data
In-Scope Questions - Read Only. List of those questions designated as in-scope.
In-Scope KPIs - Read Only. List of those KPIs designated as in-scope.
Questions and Client Responses - Download. Questions and client responses.
In-Scope Questions and Client Responses - Download. In-scope questions and client responses.
Leading Practices w/ Client Practice Type - Download. Leading, common, and lagging practices with designation of client practice type.
In-Scope Leading Practices w/ Client Practice Type - Download. In-scope leading, common and lagging practices with designation of client practice type.
Questions and Leading Practices w/ Client Practice Type - Download. Questions mapped to leading, common, and lagging practices with designation of client practice type.
In-Scope Questions and Leading Practices w/ Client Practice Type - Download. In-scope questions mapped to leading, common, and lagging practices with designation of client practice type.
Project Specific KPIs w/ Client Value & Related Benchmarking Data - Download. KPIs including client value and related benchmarking data.
In-Scope KPIs w/ Client Value & Related Benchmarking Data - Download. In-scope KPIs including clienty value and related benchmarking data.

Project Specific Scope
Category Summary (Download) - Download. Table listing the # of in-scope questions, # of in-scope KPIs and total score for each category.
Category Summary (Read Only) - Read Only. Table listing the # of in-scope questions, # of in-scope KPIs and total score for each category.
# of In-Scope Questions, Leading Practices, and KPIs - Read Only. Table listing the # of in-scope questions, leading practices and KPIs for each category and subcategory.

Project Specific Scoring
Score by Category (Download) - Download. Score for each category.
Score by Category (Read Only) - Read Only. Score for each category.
Score by Question - Download. List of all in-scope questions, client responses, raw score and weight.
Score by KPI - Read Only. List of all in-scope KPIs, client values, raw score and weight.

FINANCE DIAGNOSTIC TOOL

BACKGROUND OF THE INVENTION

1. Field of the Invention

The present invention relates to devices and processes that evaluate the strengths and weaknesses of an organization, such as a business.

2. Related Art

It is a well known for an organization, such as a business, to hire an outside consultant to perform an assessment of the current state of the organization's processes, technologies, and organization structure and to identify specific improvement opportunities. Such an assessment typically involves having the consultant visit the organization to interview key employees, to review existing organizational charts and documentation of processes, and conduct workshops. The assessment also can involve having the consultant observe the inner workings of the organization, such as the accounting process, the billing process, the shipping process and the power structure of the organization.

A critical element of the assessment is to interview various individuals of the organization in order to learn from them what they believe are the strengths and weaknesses of the organization. The interview can also be used to learn of various ideas from the individuals on how to improve the organization. Such interviews can be problematic. For example, the interviews need to be given at a convenient time for both the interviewer and the interviewee. That can be difficult based on the time of year, the business cycle of the organization and time intensive projects being launched at the time, for example.

A related problem is that the interviews usually result in the interviewee taking time off from his or her job in order to attend the interview. Obviously, this leads to lost productivity for the organization.

Besides the time issues, another problem of the process is the types of questions asked. The success of the interviews is highly dependent on the interviewer asking the right type of questions to the interviewee. An inexperienced interviewer may miss a key question to ask that may skew the results or lead to a follow up interview to ask the question. This obviously can be inefficient and costly. In addition, the interviewer may ask questions in a haphazard manner so that it is hard to assess the answers as a whole.

SUMMARY OF THE INVENTION

One aspect of the present invention regards a finance diagnostic system including a processor and a memory electrically connected to the processor, wherein the memory comprises a database having a plurality of diagnostic questions stored therein. A visual display electrically connected to the processor, wherein the processor prepares an advice screen to be shown on the visual display, the advice screen displaying a response to one of the plurality of diagnostic questions and a benchmark that represents a predetermined level of practice corresponding to the one of said plurality of diagnostic questions. The response and benchmark are displayed simultaneously so that advice on how to achieve a desired level of practice is rendered by such simultaneous display.

A second aspect of the present invention regards a method of providing financial advice that includes presenting financial related questions to a user, recording answers to the presented questions and preparing and displaying an advice report by simultaneously displaying one of the recorded answers and a benchmark that represents a predetermined level of practice corresponding to the one of the recorded answers. Advice is rendered on how to achieve a desired level of practice via the simultaneous displaying. Providing advice to the user based on the advice report so that the user achieves the desired level of practice.

One or more aspects of the present invention provide the advantage of allowing for more flexible scheduling of interviews during an evaluation process. I'm not sure this is true—the interview will be more efficient and more effective, but not necessarily scheduled in a more flexible manner.

One or more aspects of the present invention provide the advantage of being less disruptive of the work schedules of an individual.

One or more aspects of the present invention provides the advantage of providing an evaluation process that is more effective, more efficient and less costly—allowing the engagement team to more quickly get to an accurate picture of the current state and develop more targeted improvement recommendations.

One or more aspects of the present invention provides the advantage of accumulating data from various clients and using the accumulated data to easily compare one client's practices with either another client's practices or with leading practices that have been determined based on the accumulated data.

BRIEF DESCRIPTION OF THE DRAWINGS

FIG. 2 shows an embodiment of a project details screen that can be displayed by the finance diagnostic system of FIG. 1;

FIG. 3 schematically shows an embodiment of a status screen that can be used by the finance diagnostic system of FIG. 1;

FIG. 5A shows a screen displayed by the finance diagnostic system of FIG. 1 that lists questions for a particular diagnostic category;

FIG. 5B shows a screen displayed by the finance diagnostic system of FIG. 1 that lists KPI metric questions for a particular diagnostic category;

FIG. 6 shows one embodiment of various possible diagnostic categories, subcategories, questions and metric questions that can be employed in the finance diagnostic system of FIG. 1;

FIGS. 7A-7F show one embodiment of various possible diagnostic categories, subcategories. questions and metric questions that can be employed in the finance diagnostic system of FIG. 1;

FIG. 8 shows another embodiment of various possible diagnostic categories, subcategories, questions and metric questions that can be employed in the finance diagnostic system of FIG. 1;

FIGS. 9A-9H show further another embodiment of various possible diagnostic categories, subcategories, questions and metric questions that can be employed in the finance diagnostic system of FIG. 1;

FIGS. 10A-10L show further another embodiment of various possible diagnostic categories, subcategories, questions and metric questions that can be employed in the finance diagnostic system of FIG. 1;

FIG. 11 shows further another embodiment of various possible diagnostic categories, subcategories, questions and metric questions that can be employed in the finance diagnostic system of FIG. 1;

FIGS. 12A-12M show further another embodiment of various possible diagnostic categories, subcategories, questions and metric questions that can be employed in the finance diagnostic system of FIG. 1;

FIG. 13 shows further another embodiment of various possible diagnostic categories, subcategories, questions and metric questions that can be employed in the finance diagnostic system of FIG. 1;

FIGS. 14A-14I show 11 further another embodiment of various possible diagnostic categories, subcategories, questions and metric questions that can be employed in the finance diagnostic system of FIG. 1;

FIG. 15 shows further another embodiment of various possible diagnostic categories, subcategories, questions and metric questions that can be employed in the finance diagnostic system of FIG. 1;

FIGS. 16A-16E show further another embodiment of various possible diagnostic categories, subcategories, questions and metric questions that can be employed in the finance diagnostic system of FIG. 1;

FIG. 17 shows further another embodiment of various possible diagnostic categories, subcategories, questions and metric questions that can be employed in the finance diagnostic system of FIG. 1;

FIGS. 18A-18H show further another embodiment of various possible diagnostic categories, subcategories, questions and metric questions that can be employed in the finance diagnostic system of FIG. 1;

FIGS. 19A-19B show further another embodiment of various possible diagnostic categories, subcategories, questions and metric questions that can be employed in the finance diagnostic system of FIG. 1;

FIGS. 20A-20S show further another embodiment of various possible diagnostic categories, subcategories, questions and metric questions that can be employed in the finance diagnostic system of FIG. 1;

FIGS. 21A-21I 17 show further another embodiment of various possible diagnostic categories, subcategories, questions and metric questions that can be employed in the finance diagnostic system of FIG. 1;

FIGS. 22A-22B show further another embodiment of various possible diagnostic categories, subcategories, questions and metric questions that can be employed in the finance diagnostic system of FIG. 1;

FIGS. 23A-23K show flirther another embodiment of various possible diagnostic categories, subcategories, questions and metric questions that can be employed in the finance diagnostic system of FIG. 1;

FIGS. 24A-24R show a summary of the questions and metric questions of FIGS. 6-23K that are deemed most important;

FIG. 25A schematically shows an embodiment of a question screen that can be used by the finance diagnostic system of FIG. 1;

FIG. 25B schematically shows an embodiment of a metric question screen that can be used by the finance diagnostic system of FIG. 1;

FIG. 26 schematically shows an embodiment of a list of reports screen that can be used by the finance diagnostic system of FIG. 1.

DETAILED DESCRIPTION OF THE DRAWINGS AND THE PRESENTLY PREFERRED EMBODIMENTS

Figure 1:
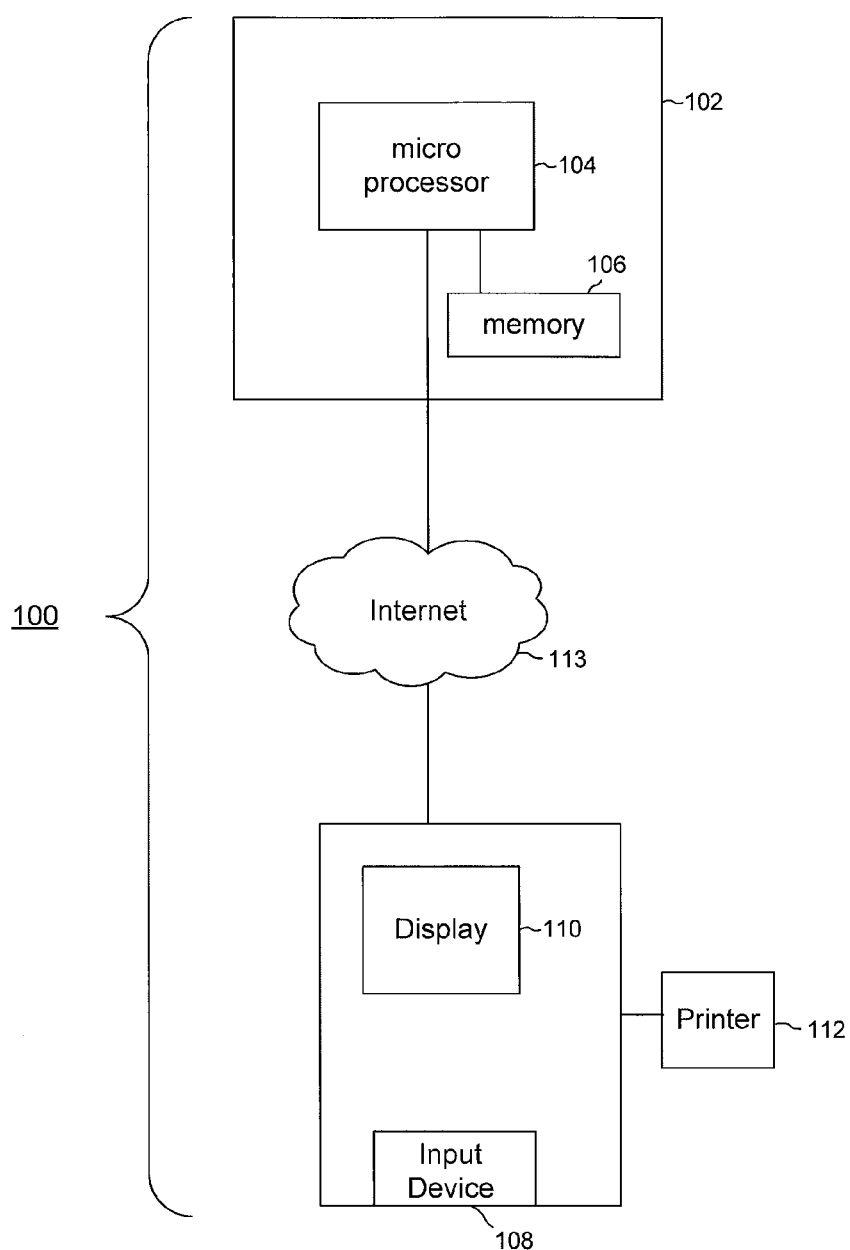
FIG. 1 schematically shows an embodiment of a finance diagnostic system in accordance with the present invention.

An embodiment of the present invention is shown in FIG. 1. In particular, FIG. 1 schematically shows a finance diagnostic system 100 that includes a finance processor 102 that includes a microprocessor 104 electrically connected to a memory 106. The memory 106 stores a finance program that includes a database, the contents of which will be discussed below.

Data is input indirectly into the microprocessor 104 via an input device 108. Examples of possible input devices 108 are a keyboard, a microphone, a touch screen or a mouse that are part of computer hardware system, such as a laptop computer 109. A display 110 and a printer 112 can be electrically connected to or form part of the computer hardware system.

As shown in FIG. 1, the laptop computer 109 is connected to the finance processor 102 via the Internet 113. Thus, the finance processor 102 can be located at a different site than where the laptop computer 109 is located. This allows for flexibility in conducting the evaluation process. Of course, it is possible to have the laptop computer 109 directly connected to the finance processor 102 via a hardwire connection. In another alternative, the finance processor 102 is incorporated in the computer hardware system itself.

In general, once data is input into the microprocessor 104, the finance program takes the data and places the data in the database in memory 106. The contents of the database can be observed via the visual display 110 or can be printed out via the printer 112.

With the above mentioned structure of the finance diagnostic system 100 described, operation of the finance diagnostic system 100 will be described hereinafter. As shown in FIG. 2, the finance diagnostic system 100 is activated and a "Project Details" screen 114 pops up on visual display 110. The screen 114 sets forth various fields to be filled in by the user, such as the administrator of the system 100, via input device 108 as to the project details such as project name, project status, and the identity of the project leader and project operating group. The use also inputs information regarding the client and the client contact. The administrator will provide access to the system 100 to authorized personnel and will upgrade the contents of the "Project Details" screen 114 when needed.

Note that an access tool bar also is displayed on screen 114 and all screens mentioned hereafter. The access tool bar can include the following buttons: "Home", "Contact Us", "Help", "Project", "Team Members", "Diagnostic", "Reports" and "Search." The "Home" button, when activated, sends the user to an opening/welcome screen. The "Contact Us" button provides contact information when a user has a question regarding the system 100. The "Help" button provides access to common questions asked regarding the system 100. The "Project" button sends the user to screen 114. When a user activates the "Team Members" button, a screen is displayed that provides a list of other individuals that are a team member of the user regarding the client project for which the user has access to. The list includes the names, locations and contact information for all team members of the client project.

Once the "Project Details" screen 114 is completed, the user activates the diagnostic tool of system 100 by activating the "Diagnostic" button on the access tool bar. Upon activating the button, a status screen 116 will be shown on visual display 110, as shown in FIG. 3. The status screen 116 includes a column of diagnostic categories that include, but are not limited, to the following:

1) Context
2) Finance Management;
3) Shareholder Value Targeting or Public Sector Value;
4) Business Intelligence;
5) Budgeting & Forecasting;
6) Financial & Business Analysis;
7) Investor Relations;
8) CAPEX Management;
9) Working Capital Management
10) Accounting & Reporting;
11) Internal Control;
12) Purchasing;
13) Accounts Payable;
14) Payroll;
15) Order-to-Cash;
16) Tax Management;
17) Treasury & Risk Management.

These categories represent the entire scope of responsibility for the typical Chief Finance Officer (CFO) in a large public company and are defined to represent discrete portions of the CFO's organization that can be analyzed individually. In addition, there is a "summary category" which covers the entire finance function broadly and includes selected content from each of the individual categories. The user can select any or all of these categories as in-scope. Once selected as being "In Scope," the user uses the links to move to the content for the selected category.

Besides the diagnostic categories, a summary is available which covers the entire finance function broadly and includes selected content from each of the individual categories. As will be shown later, the summary provides a snapshot of the most important questions and answers of the entire diagnostic process and so gives the user a convenient way to obtain a feel for the strengths and weaknesses of an organization. Accordingly, on those engagements where the focus of the investigation is broad rather than deep, the summary is used. Where a more in-depth analysis of one or more categories is required, then the detail categories are used. In addition, a "Total for Categories" row is available which provides the total number of questions asked in all diagnostic categories the total number of questions in scope in all diagnostic categories, the total number of KPIs asked in all diagnostic categories, the total number of KPIs in scope for all diagnostic categories and the weighted average score for all diagnostic categories (excluding "Summary" total).

The diagnostic tool categories cover all aspects of evaluating the effectiveness and efficiency of the CFO's organization. In accordance with the present invention, the diagnostic tool categories also have the property of being flexible in scope so that each can be mapped to Accenture's proprietary High Performance Business (HPB) framework or other financial evaluation frameworks. In the case of the HPB framework, it breaks the financial diagnostic research for all businesses into five categories. Each one of the various diagnostic categories shown in FIG. 3 correspond to or can be mapped to one of the HPB categories. Thus, the results of using the finance diagnostic system 100 can be translated in terms of other financial evaluation frameworks. Note that Accenture's High Performance Business framework is the result of extensive research into what drives high performance across multiple industries and over an entire business cycle. The framework identifies those capabilities that most directly contribute to high performance and describes what mastery of these capabilities looks like.

The status screen 116 serves several functions. First, it summarizes the diagnostic tools available and/or used during a particular evaluation of an organization. For example, the "In Scope?" column designates by a "Y" those diagnostic categories to be used during the evaluation and an "N" denotes diagnostic categories not to be used.

The "Total Number of Questions" column denotes the number of questions available to be asked in each diagnostic category while the "Questions in Scope" column denotes the actual number of questions that will be asked for each diagnostic category for the evaluation in question (each individual question can be selected as in scope or out of scope). Similarly, the "Total Number of KPIs" column denotes the number of metric questions or Key Performance Indexes (KPIs) available to be asked in each diagnostic category while the "KPIs in Scope" column denotes the actual number of metric questions that will be asked for each diagnostic category for the evaluation in question. The "Weighted Average Score" column presents the weighted average score for the organization in each diagnostic category (as calculated based on inputs to the individual date input screens).

The status screen 116 is also proactive in function in that it allows the user to select which of the diagnostic categories will be the subject of the evaluation. A diagnostic category is selected or omitted by first checking the box to the left of the particular category. If the diagnostic category is initially designated to be in the evaluation as denoted by the letter "Y", but the category is to be omitted from the evaluation, then the "Remove selected from scope" button 120 is activated resulting in an "N" replacing the "Y" in the "In Scope?" column. If the diagnostic category is initially designated to be omitted from the evaluation as denoted by the letter "N", but the category is to be included in the evaluation, then the "Add selected to scope" button 118 is activated resulting in a "Y" replacing the "N" in the "In Scope?" column.

In summary, for each category selected, a "Y" appears in the "In Scope?" column. For each category removed from the evaluation, an "N" will appear in the same column. This selection process help to focus the user on the evaluation process.

The status screen 116 also allows the user to go to the questions and the metric questions of the evaluation by clicking on the appropriate arrow in the "Link to Questions" and "Link to KPIs" columns. For example, suppose the user wishes to ask questions to the client regarding the diagnostic category "Budgeting & Forecasting." In this scenario, the user would click on either the "Links to Questions" arrow for asking diagnostic questions or the "Link to KPIs" arrow for entering numerical data asking questions regarding KPIs. If the "Links to Questions" arrow is clicked, the screen 119 appears with a list of questions as shown in FIG. 5A. The number of questions appearing on screen 119 corresponds to the number displayed on screen 116 in the corresponding "Total Number of Questions" box. The screen 119 organizes the questions by diagnostic category and subcategory. The screen 119 also indicates whether a question is to be used in the evaluation process by having a "Y" present in the "In Scope?" column. Otherwise an "N" is present indicating that the question is not to be asked during the evaluation process.

The screen 119 also includes a "Status" column that indicates whether or not a question has been asked. The entry "Not Started" indicates that the question is to be asked and the entry "In Progress" indicates that the question is being asked or has been asked. The column "Raw Score" provides a score for the client's answer that is determined and entered into by the user. The user can assign a score from 1-5 (5 is highest and 1 is lowest) indicating how effective the client is in this area and the degree to which leading practices (to be explained later) are utilized. Scoring is based on the qualitative judgment of the user.

If the "Links to KPIs" arrow is clicked on screen 116 for the "Budgeting & Forecasting" category, screen 121 appears with a list of parameters to be filled in the "KPI" column as shown in FIG. 5B. The function of screen 121 is similar to that of screen 119 and so no further discussion is needed.

Each diagnostic category is composed of one or more subcategories as shown in FIGS. 6 to 23K. In the case of the category of "Budgeting and Forecasting," (see FIGS. 10A to 10L) the category includes the subcategories of: "Budgeting and Forecasting Process," "Budgeting and Forecasting Systems Architecture" and "Budgeting & Forecasting KPI." For each subcategory, there are one or more questions to be answered by the client. In the case of the subcategory "Budgeting and Forecasting Systems Architecture" there are two questions to be answered by the client: 1) "What technology architecture do you use for planning, budgeting, and forecasting activities?" and 2) "To what degree are budgeting and forecasting applications integrated with other financial applications?" Note that the various questions, answers and scores for the diagnostic categories and the KPIs are filtered/edited in a "Summary" file that is accessed at the top row of the screen 116 of FIG. 3. As shown in FIGS. 24A-24R, the "Summary" file only shows the questions, answers and scores from the diagnostic categories and KPIs that are most important in providing a diagnostic analysis of an organization.

The evaluation process can be fine tuned further by selecting certain ones of the available questions to be answered or to be "in scope." This is done by displaying screen 116 and clicking on either the "Link to Questions" or "Link to KPIs" arrows for a particular diagnostic category that contains the question to be fine tuned. In the case of the "Budgeting & Forecasting" category, either screen 119 (FIG. 5A) or screen 121 (FIG. 5B) will be displayed. Should the ninth question "What technology architecture do you use for planning, budgeting, and forecasting activities?" need to be removed from the evaluation process, then the question is clicked and screen 122 is revealed as shown in FIG. 25. The screen includes the designations "Y" and "N" next to the question "In Scope." If the circle next to the "Y" is clicked, then a dot appears in the circle and the question is part of the evaluation process. If the circle next to the "N" is clicked, then a dot appears in the circle and the question is not part of the evaluation process. A similar process is used to fine tune the KPI questions.

Once all of the diagnostic categories and questions are selected for a particular evaluation, the user is ready to begin the evaluation of the client's business. The evaluation involves the user in asking the client each one of the questions and KPIs that are in scope for the evaluation as indicated on screen 116. The client's answers are recorded on corresponding advice screens 122 and a raw score is given for each answer given. For example, in the case of the question "What technology architecture do you use for planning, budgeting, and forecasting activities?", screen 116 (FIG. 3) is displayed and the "Link to Questions" arrow corresponding to the Budget & Forecasting category is clicked so that screen 119 (FIG. 5A) is displayed. Next, the question "What technology architecture do you use for planning, budgeting, and forecasting activities?" is clicked so that processor 104 enables an advice screen 122 to be revealed as shown in FIG. 25A.

At this stage, the user/interviewer poses to the interviewee representing the client the question "What technology architecture do you use for planning, budgeting, and forecasting activities?" that is shown on advice screen 122. The interviewee's response is then entered into the "Answer" box 124 by the interviewer via input device 108, such as a keyboard.

Note that the various diagnostic categories, subcategories, questions and metric questions are stored in the memory 106 and are accessed by the diagnostic tool. The various responses to the questions and the evaluations performed by the interviewer as discussed below are stored in memory 106 as well so as to be accessed by the user and subsequent users of the tool.

Once the question is answered and the response entered, the interviewer can activate a "save" button on the advice screen 122 (not shown) which results in the response being saved along with other items present on the screen at the time. At this point in the process or any time in the future, the user/interviewer can enter a raw score. The user can assign a score from 1-5 (5 is highest and 1 is lowest) indicating how effective the client is in this area. While the scoring is based on the judgment of the user, there are present on the advice screen 122 criteria that aid the user in determining the score. As shown in FIG. 25A, three criteria are preferably given for each question under the labels of: 1) "Leading Practice", 2) "Most Common Practice" and 3) "Lagging Practice." The "Leading Practice" benchmark provides one or more parameters or characteristics theoretically possessed by a leading practitioner in the area of interest associated with the question. The "Most Common Practice" benchmark provides one or more parameters or characteristics theoretically possessed by most practitioners in the area of interest associated with the question. The "Lagging Practice" benchmark provides one or more negative parameters or characteristics that would raise concerns to the interviewer if the interviewee was currently practicing such parameter or characteristics. Note that the practices are chosen so as to be applicable for all industries and so are not industry specific.

Under each label, one or more criteria are listed that need to be attained by an organization before it can be deemed to have attained the status presented in the label. The interviewer compares the answers in answer box 124 with the three leading practices. Based on the comparison, the interviewer selects which of the three leading practices is nearest the answer and records that selection by scrolling to the appropriate leading practice in drop down menu box 126.

In other words, if an organization attained all of the criteria under the "Leading Practice" label, then that organization would probably earn a score of 5 or 4. If the organization attained all of the criteria under the "Most Common Practice" label, then the organization would probably earn a score of 3 or 2. If the organization attained all of the criteria under the "Lagging Practice" label, then the organization would probably earn a score of 2 or 1. The score is entered in score box 128 of advice screen 122. In addition, the closest label fitting the organization's level of achievement, such as "Leading Practice", would be entered in the "Client's Practice Type:" column via entry box 126.

Besides entering the raw score, the weighting of the importance of the score/question in the evaluation of the organization can be determined by picking one of the weightings "High," "Medium" and "Low" at the "weight" box 130 of advice screen 122. If the "High" is selected, then the raw score is multiplied by 1.0 via microprocessor 104 and the product is stored in memory 106. If "Medium" is selected, then the raw score is multiplied by 0.67 and the product is stored in memory 106. If "Low" is selected, then the raw score is multiplied by 0.33 and the product stored in memory 106. Based on the raw scores and the weightings, a weighted average score can be calculated for each diagnostic category. The weighted average score (WAS) being equal to the sum of the stored products for both diagnostic questions and KPIs divided by the sum of the weightings. In other words, WAS= $(\Sigma[(\text{raw score})_i*(\text{weight})_i])/\Sigma\text{weight}_i$ wherein i=1, 2, . . . , the number of questions and KPIs for a particular diagnostic category. The weighted average score is displayed on screen 116 of FIG. 3.

In addition to the scoring process, the user can type in various comments/impressions that the interviewer has regarding the client's answer to the question. The comments can be typed in box 132 and can include suggestions as to how the client can improve its score regarding the question.

A similar evaluation is performed for each of the metric KPI questions asked in each subcategory shown on screen 121. In this case, an advice screen 130 is prepared and displayed by processor 104,on visual display 110 and shows three benchmarks for metric questions which are: 1) the "Leading Value" benchmark, 2) the "Most Common Value" benchmark and 3) the "Lagging Value" benchmark as shown in FIG. 25B. The benchmarks represent various predetermined levels of practice in the area of inquiry when compared with other organizations. The "Leading Value" benchmark defines a minimum or maximum value to the metric question that represents excellence has been achieved regarding the metric in question. The "Leading Value" benchmark represents a level of practice that all organizations would ultimately like to achieve. The "Most Common Value" benchmark provides the average value for organizations. The "Lagging Value" benchmark defines a minimum or maximum value to the metric question that represents unacceptable results have been achieved regarding the metric in question.

Figure 4:
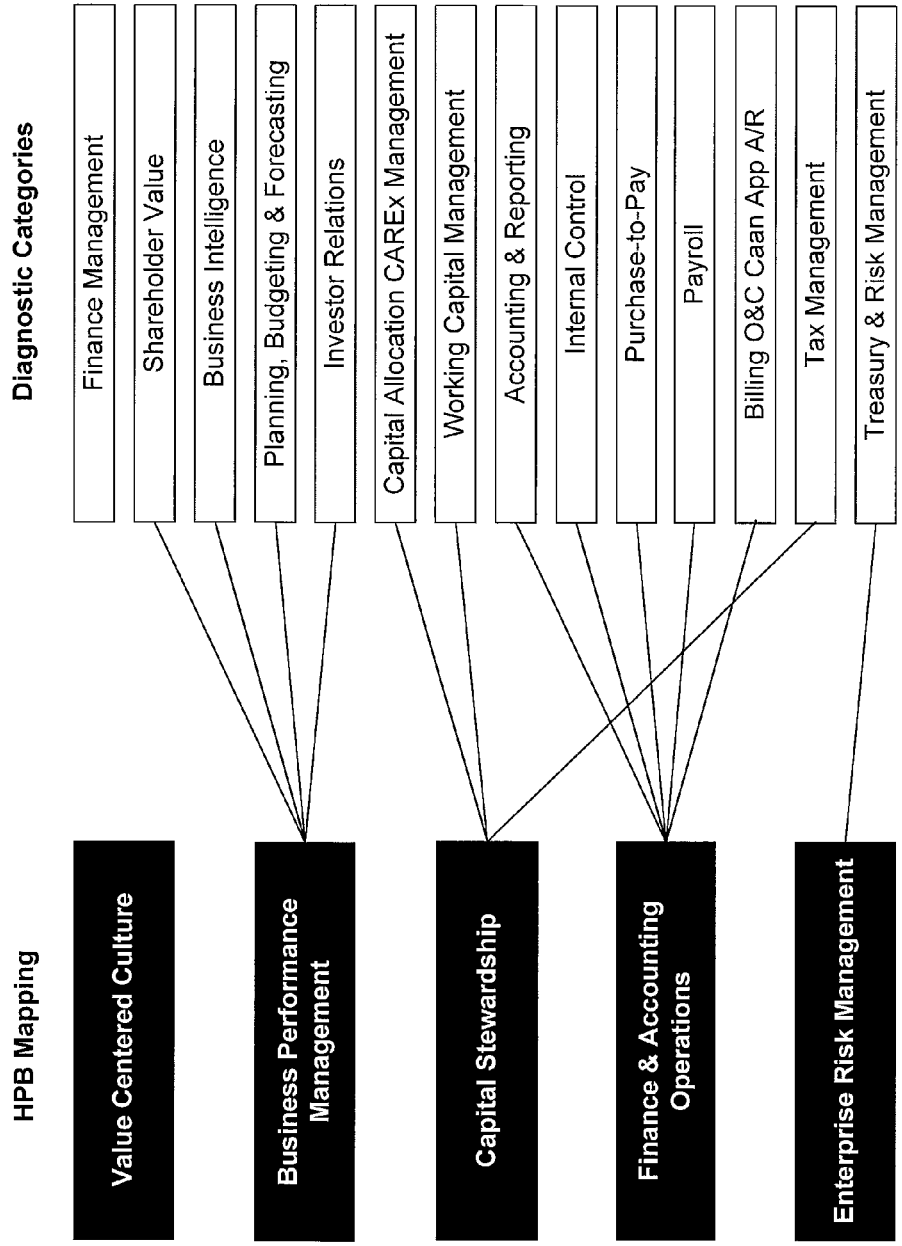
FIG. 4 schematically shows mapping between diagnostic tool categories used with the finance diagnostic system of FIG. 1 and multiple financial evaluation frameworks.

After the question in the subcategory is answered, weighted and scored in the manner described above, the interviewer returns to screen 119 and repeats the above process for another question. Once all questions on screen 119 are answered and scored, the interviewer goes to screen 121 of FIG. 4B and repeats the process for the various KPIs. After all of the questions and KPIs are answered and scored, the system automatically sums up all of the weighted products stored in memory 106 regarding the questions and KPIs of the category and calculates a weighted average score for that particular category. The weighted average score is automatically shown in the "Weighted Average Score" column.

The above process is very efficient for the interviewer in that the questions are preselected and stored so that the interviewer will not forget to ask a particular question. In addition, the order and scope of the questions are structured in a logical manner. For example, the initial question in a subcategory is designed to be a general question, the next question is more focused and the next question is even more focused. In addition, the questions themselves are selected from a database of questions that have been compiled and identified by Accenture Global Systems GmbH to be of particular relevance for a particular subcategory. In particular, the order of the questions presented and the subject matter of the presented questions are such that they optimize the amount of detail obtained from the answers in a minimum amount of time.

Note that all questions and metric questions are mapped to the "leading practice" and "leading value" benchmarks which provides the advantage of being able to ask insightful follow on questions and/or probe into the use of relevant leading practices immediately following the client's initial response. For example if the question "describe your financial systems architecture" was answered with "We use SAP as our ERP system", the user would know, based on the text or value of the benchmarks, to ask the follow on questions "is it a single instance?" (one of the leading practices) and "what legacy systems remain?" (leading practice is to have few if any remaining legacy financial systems, common practice is to retain multiple legacy financial systems).

All answers and scores for a client are stored in memory 106 of the finance diagnostic system 100. The answers and scores for other clients are stored in memory 106 as well so that all answers and scores are permanently stored and associated with each client. Based on the scoring process, the client's scores for each question and metric question can be compared with other organizations that have participated/completed a similar financial analysis using the finance diagnostic system 100. Based on the scores and comparisons, the interviewer can rank the client in the diagnostic categories and subcategories with respect to other organizations.

Figure 27:
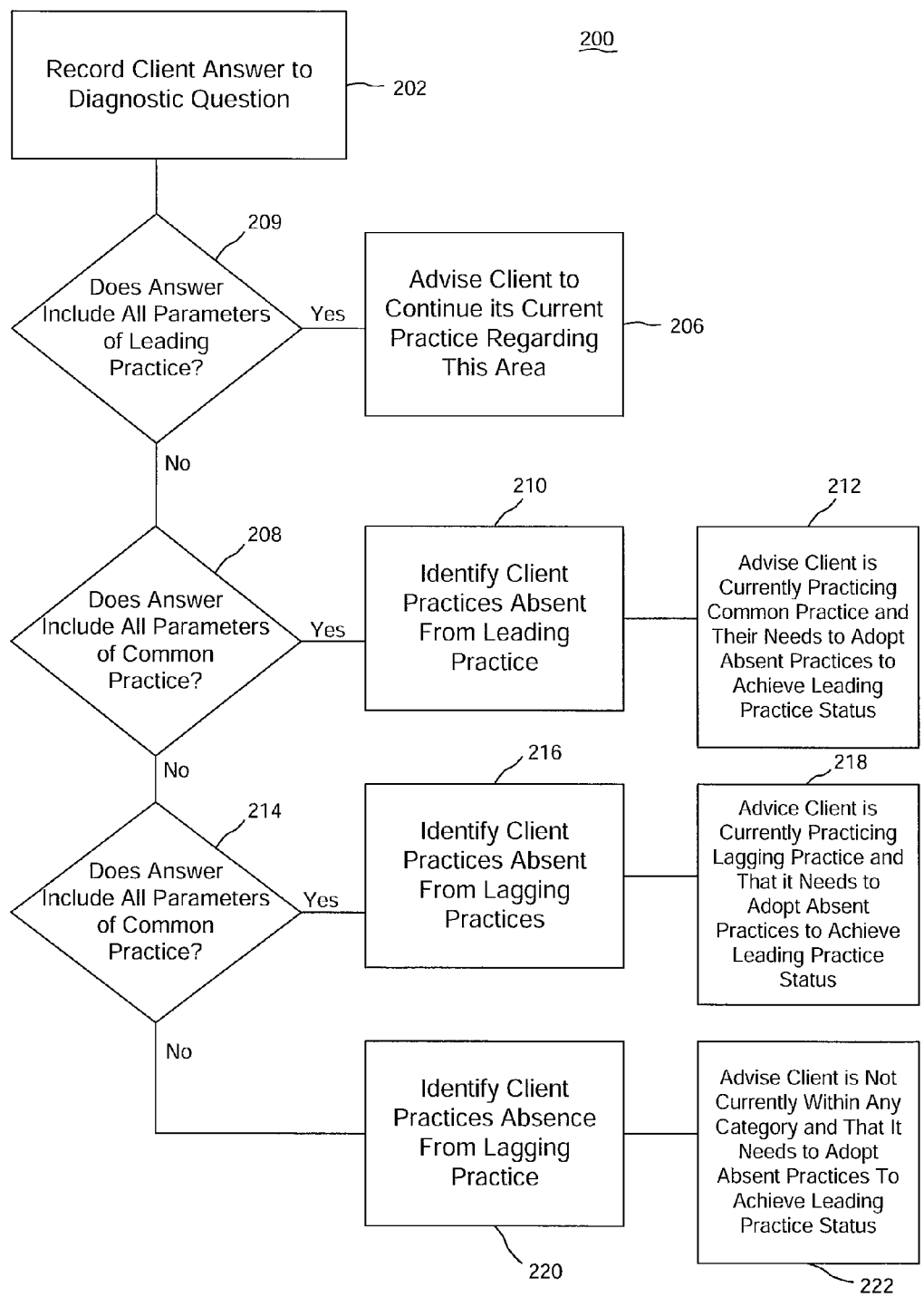
FIG. 27 shows a flow chart of how advice can be provided to a client using the finance diagnostic system of FIG. 1.

The answers given by a client also aid in the finance diagnostic system 100 in providing advice to the client. A possible process for providing advice to a client is illustrated in the flow chart shown in FIG. 27. In particular, the process 200 involves recording the client's answer to a diagnostic or metric question on the appropriate advice screen of FIGS. 25A and 25B per process 202 in the manner described previously. The interviewer will have the advice screen before him or her and will be able to simultaneously view the client's answer and the benchmarks associated with the question corresponding to the answer. (Of course a hard copy of the advice report shown on the advice screen can be printed out via printer 112). The simultaneous display of the answer and the benchmarks and their side-by-side format on the advice screen allows the advice screen to function as a comparator from which advice is implicitly generated. For example, if the recorded answer on the advice screen includes all of the parameters listed in the leading practice benchmark shown on the same advice screen per process 204, then the finance diagnostic system 100, via the advice screen, implicitly generates the advice per step 206 that the client is deemed a leading practitioner in this area of inquiry and should continue its current practice. If the answer shown on the advice screen does not contain all of the criteria displayed on the advice screen as a leading practice, then the system 100, via the advice screen, provides a side-by-side comparison of the answer and the common and lagging practices per processes 208 and 214. In either case, the advice screen acts as a visual comparator that visually illustrates/determine the differences between the answer and the leading practice via processes 210, 216 and 220. Such a comparison allows the advice screen to generate implicit advice regarding the status of the client and what steps need to be taken by the client in order to be considered to be a leading practitioner in a particular area. For example, if the recorded answer on the advice screen includes all (or a subset) of the parameters listed in the common practice benchmark per process 208, then the advice screen implicitly advises the user that: 1) the client is deemed to be practicing what is common among other organizations and 2) the client needs to implement those practices listed on the advice screen regarding the leading practice that are lacking in the client's answer so that the client can be regarded in the future as having attained leading practice status in the area of inquiry per process 212. Similarly, if the recorded answer on the advice screen includes all (or a subset) of the parameters listed in the lagging practice benchmark per process 214, then the advice screen implicitly advises the client that: 1) the client is deemed to be lagging in its practices when compared with other organizations and 2) the client needs to implement those practices listed on the advice screen regarding the leading practice that are lacking in the client's answer so that the client can be regarded in the future as having attained leading practice status in the area of inquiry per process 218. If a comparison of the benchmarks and the answer on the advice screen have no common attributes, then the advice screen implicitly advises that the client is deemed not to be practicing any of the components listed on the display for the three benchmarks and the client needs to implement all practices listed on the advice screen regarding the leading practice so that the client can be regarded in the future as having attained leading practice status in the area of inquiry per process 222. Note that there may instances where the. answer on the advice screen is a hybrid containing attributes that are common to two or more of the leading, common and lagging practices. In this instance, the advice screen implicitly advises the client that the client needs to implement those practices listed on the advice screen regarding the leading practice that are lacking in the client's answer so that the client can be regarded in the future as having attained leading practice status in the area of inquiry.

The advice screens can also provide implicit advice when compared with one another. For example, suppose the advice screen for the "Budgeting & Forecasting" diagnostic category has a majority of answers that fall within the common or lagging practices area while the advice screen for the "Accounts Payable" diagnostic category has a majority of answers that fall within the leading practices area. In this case, a comparison of the two screens would implicitly advise the user that a client with limited resources should concentrate those resources in the "Budgeting & Forecasting" area rather than "Accounts Payable."

Based on the process described above, it is evident that the financial diagnostic system 100 provides a format on the advice screens of FIGS. 25A-25B that by itself implicitly provides advice to the client based on the contents of one or more of the advice screens.

In summary, based on the scores and comparisons, the system 100 via the advice screen can identify strengths and weaknesses in the organization. Furthermore, the advice screen implicitly provides suggestions on how the organization can improve its scores. This advice is based on the fact that the advice screen 1) always shows the ideal or leading practice that an organization strives to achieve, 2) simultaneously shows the real condition of the client via its answer and 3) provides a side-by-side visual comparison of the ideal or leading practice with the answer that implicitly provides advice on how to make corrections so that the leading practice can be achieved. A common follow on discussion of the interviewer with the client would be to summarize the results of the diagnostic, and then discuss those leading practices that are not being followed as a way to identify improvement opportunities. The user then can offer services that can cure the deficiencies. Note that as an aid to the interviewer, it is possible to display on visual display 110 and print out on printer 112 a number of reports organized by diagnostic category. These reports can be used as an interview guide when conducting the interviews as well as a summary of results of those interviews. A screen 134 can be brought up on visual display 110 that provides a list of possible reports that can be accessed. A report is accessed by clicking on the report on the screen 134. A sample screen 134 is shown in FIG. 26. In addition, a word search tool (not shown) can be employed so as to easily locate questions, answers or data.

Besides being memorialized in reports, the questions to the answers and the scores can be stored in a general database that contains answers and scores of other organizations. This allows for comparing between organizations. Furthermore, it allows for adjusting the parameters of the evaluation process so as to be more current. For example, analyzing the answers can lead to the changing of benchmarks or the initial definitions of the benchmarks. In one scenario, some leading benchmarks in one year may become commonplace later in time and so would be relegated to the "Most Common Practice" benchmark. In another scenario, the diagnostic tool may initially have no leading benchmarks since it has no previous data to base them on. However, as more and more clients are interviewed and their information is stored, the information can be used to define the leading benchmarks over time.

Note that there a number of possible ways of implementing the finance diagnostic system 100 describe above. For example, the finance processor 102, input device 108 and display 110 can be taken in the form of a laptop computer to the interview by the interviewer. At the interview, the interviewer asks the various questions and enters them as described previously. The interviewer can evaluate the answers directly on the laptop computer or the results can be sent offsite to an offsite central computer 136 via the internet 138 where they can be evaluated.

In another scenario, the finance program is loaded on the interviewee's computer, wherein the interviewer has previously selected the diagnostic categories, subcategories and questions to be answered. The interviewee answers all of the questions without the presence of the interviewer. This allows the interviewer to respond to the questions at times that are convenient for him or her. Once all of the questions have been answered, the responses can be relayed to the off site central computer 136 of the interviewer via the internet 138. At the off-site computer, 136, the interviewer can then weight and score the answers in the manner discussed previously.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A finance diagnostic system for providing advice regarding an organization run by a financial officer of a company, the finance diagnostic system comprising:

a processor;

a memory electrically connected to said processor, wherein said memory comprises a database having a plurality of diagnostic questions stored therein, said plurality of diagnostic questions regard said organization run by said financial officer; and a visual display electrically connected to said processor, wherein said processor prepares an advice screen to be shown on said visual display, said advice screen displaying 1) a response to one of said plurality of diagnostic questions, 2) a benchmark that represents a predetermined level of practice corresponding to said one of said plurality of diagnostic questions, and 3) a score that is generated by comparing said response to said benchmark and represents how close said organization is to said benchmark, said response, benchmark and score are displayed simultaneously so that advice on how to achieve a desired level of practice is rendered by such simultaneous display;

wherein the visual display further comprises a text box configured to accept an improvement suggestion comprising the advice on how to achieve the desired level of practice while simultaneously displaying the response, the benchmark and the score.

2. The finance diagnostic system of claim 1, further comprising an input device electrically connected to said processor, wherein said input device accesses one or more of said plurality of diagnostic questions and said processor controls said accessing so that consecutive questions are always accessed based on breadth from general to more specific.

3. The finance diagnostic system of claim 2, wherein said input device sends signals to said processor so that certain ones of said plurality of diagnostic questions cannot be displayed by said visual display.

4. The finance diagnostic system of claim 2, wherein said score is a numerical factor and said processor generates said numerical factor based on an input signal from said input device, wherein said numerical factor is coupled to one of said accessed diagnostic questions.

5. The finance diagnostic system of claim 1, wherein said memory stores said benchmark which is mapped with said one of said plurality of diagnostic questions.

6. The finance diagnostic system of claim 1, wherein said predetermined level corresponds to a leading practice and said leading practice is said desired level of practice.

7. The finance diagnostic system of claim 6, wherein said advice screen simultaneously displays with said benchmark, said score and said response a second benchmark that represents a common practice corresponding to said one of said plurality of diagnostic questions, wherein said second benchmark comprises a textual statement that represents a criterion for achieving said common practice.

8. The finance diagnostic system of claim 6, wherein said advice screen simultaneously displays with said benchmark, said score and said response a second benchmark that represents a lagging practice corresponding to said one of said plurality of diagnostic questions, wherein said second benchmark comprises a textual statement that represents a criterion for achieving said lagging practice.

9. The finance diagnostic system of claim 7, wherein said advice screen simultaneously displays with said benchmark, said second benchmark, said score and said response a third benchmark that represents a lagging practice corresponding to said one of said plurality of diagnostic questions, wherein said third benchmark comprises a textual statement that represents a criterion for achieving said lagging practice.

10. The finance diagnostic system of claim 7, wherein said advice screen simultaneously displays with said response, said benchmark, said score and said second benchmark a first heading associated with said benchmark and identifying said textual statement as being part of said benchmark and a second heading associated with said second benchmark and identifying said second textual statement as being part of said common practice.

11. The finance diagnostic system of claim 8, wherein said advice screen simultaneously displays with said response, said benchmark, said score, and said second benchmark a first heading associated with said benchmark and identifying said textual statement as being part of said benchmark and a second heading associated with said second benchmark and identifying said second textual statement as being part of said lagging practice.

12. The finance diagnostic system of claim 9, wherein said advice screen simultaneously displays with said response, said benchmark, said score, said second benchmark and said third benchmark a first heading associated with said benchmark and identifying said textual statement as being part of said benchmark, a second heading associated with said second benchmark and identifying said second textual statement as being part of said common practice and a third heading associated with said third benchmark and identifying said third textual statement as being part of said lagging practice.

13. The finance diagnostic system of claim 1, further comprising a printer that is electrically connected to said processor, wherein said processor sends instructions to said printer to print the contents shown on said advice screen.

14. The finance diagnostic system of claim 1, wherein said advice screen simultaneously displays with said benchmark, said score and said response a weighting value that represents a relative value of said response.

15. The finance diagnostic system of claim 1, further comprising an input device electrically connected to said processor, wherein said input device accesses said plurality of diagnostic questions and said input device sends signals to said processor so that certain ones of said plurality of diagnostic questions cannot be displayed by said visual display.

16. The finance diagnostic system of claim 1, wherein said benchmark comprises a second textual statement that represents a second criterion for achieving said predetermined level of practice.

17. The finance diagnostic system of claim 1, wherein said score is subjectively determined by a user of said finance diagnostic system.

18. A method for displaying on an advice screen financial advice on how to achieve a desired level of practice for an organization run by a financial officer of a company, the method comprising:
  storing a plurality of diagnostic questions regarding said organization;
  transmitting the plurality of diagnostic questions regarding said organization to a user;
  recording answers to said diagnostic questions and storing the answers;
  preparing and displaying an advice screen that simultaneously displays 1) one of said recorded answers, 2) a benchmark that represents a predetermined level of practice corresponding to said one of said recorded answers, and 3) a score that is generated by comparing said one of said recorded answers to said benchmark and represents how close said organization is to said benchmark, wherein advice on how to achieve a desired level of practice is rendered by such simultaneous displaying, thereby providing a visual advice guide to said user based on said advice screen; and
  displaying on the advice screen with the visual display a text box configured to accept an improvement suggestion comprising the advice on how to achieve the desired level of practice while simultaneously displaying the response, the benchmark and the score.

19. The method of claim 18, wherein said advice report provides a visual comparison of said benchmark, said score and said one of said recorded answers and said providing advice is based on said visual comparison.

20. The method of claim 19, wherein said benchmark and said desired level of practice are the same and are a leading level of practice.

21. The method of claim 20, wherein said visual comparison of said benchmark, said score and said one of said recorded answers comprises identifying at least one factor in said one of said recorded answers that is absent from said benchmark.

22. The method of claim 20, wherein said simultaneously displaying comprises simultaneously displaying with said benchmark, said score and said one of said recorded answers a second benchmark that represents a common practice corresponding to said one of said recorded answers, wherein said second benchmark comprises a textual statement that represents a criterion for achieving said common practice.

23. The method of claim 20, wherein said simultaneously displaying comprises simultaneously displaying with said benchmark, said score and said one of said recorded answers a second benchmark that represents a lagging practice corresponding to said one of said recorded answers, wherein said second benchmark comprises a textual statement that represents a criterion for achieving said lagging practice.

24. The method of claim 22, wherein said simultaneously displaying comprises simultaneously displaying with said benchmark, said second benchmark, said score and said one of said recorded answers a third benchmark that represents a lagging practice corresponding to said one of said recorded answers, wherein said third benchmark comprises a textual statement that represents a criterion for achieving said lagging practice.

25. The method of claim 22, wherein said simultaneously displaying comprises simultaneously displaying with said one of said recorded answers, said benchmark, said score and said second benchmark a first heading associated with said benchmark and identifying said textual statement as being part of said benchmark and a second heading associated with said second benchmark and identifying said second textual statement as being part of said common practice.

26. The method of claim 23, wherein said simultaneously displaying comprises simultaneously displaying with said one of said recorded answers, said benchmark, said score, and said second benchmark a first heading associated with said benchmark and identifying said textual statement as being part of said benchmark and a second heading associated with said second benchmark and identifying said second textual statement as being part of said lagging practice.

27. The method of claim 24, wherein said simultaneously displaying comprises simultaneously displaying with said one of said recorded answers, said benchmark, said score, said second benchmark and said third benchmark a first heading associated with said benchmark and identifying said textual statement as being part of said benchmark, a second heading associated with said second benchmark and identifying said second textual statement as being part of said common practice and a third heading associated with said third benchmark and identifying said third textual statement as being part of said lagging practice.

28. The method of claim 18, wherein said presenting financial related questions is done in an order so that each presented question is more specific in scope when compared with the scope of a previously presented question.

29. The method of claim 18, wherein each of said presented questions is mapped to said benchmarks or other benchmarks from which the quality of said recorded answers can be ascertained.

30. The method of claim 29, wherein the order of presented questions and the subject matter of said presented questions are such that they optimize the amount of detail obtained from said recorded answers in a minimum amount of time.

31. The method of claim 18, wherein said score for said one of said recorded answers is weighted depending on which of said financial related questions corresponds to said one of said recorded answers.

32. The method of claim 18, wherein said predetermined level corresponds to a said leading practice and said leading practice is said desired level of practice.

33. The method of claim 32, wherein said simultaneously displaying comprises simultaneously displaying with said benchmark, said score and said one of said recorded answers a second benchmark that represents a common practice corresponding to said one of said recorded answers; and
    wherein said presenting a score is based on a comparison with said second benchmark.

34. The method of claim 33, wherein said simultaneously displaying comprises simultaneously displaying with said benchmark, said second benchmark, said score and said one of said recorded answers a third benchmark that represents a lagging practice corresponding to said one of said recorded answers; and
    wherein said presenting a score is based on a comparison with said third benchmark.

35. The method of claim 18, further comprising generating a hard copy of said advice report shown on said advice screen.

36. The method of claim 18, wherein said simultaneously displaying comprises simultaneously displaying a weighting value that represents a relative value of said one of said recorded answers.

37. The method of claim 18, further comprising preventing presentation to said user of certain financial related questions regarding said organization.

38. The method of claim 18, wherein said benchmark comprises a second textual statement that represents a second criterion for achieving said predetermined level of practice.

39. The method of claim 18, wherein said score is subjectively determined by a user of said finance diagnostic system.

* * * * *